(12) United States Patent
Lovberg et al.

(10) Patent No.: US 9,779,502 B1
(45) Date of Patent: *Oct. 3, 2017

(54) SYSTEMS, DEVICES, AND METHODS FOR TRACKING MOVING TARGETS

(71) Applicant: KINETICOR, INC., Honolulu, HI (US)

(72) Inventors: John Arthur Lovberg, San Diego, CA (US); Xiaojiang Jason Pan, San Diego, CA (US)

(73) Assignee: Kineticor, Inc., Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,495

(22) Filed: Feb. 9, 2017

Related U.S. Application Data

(63) Continuation of application No. 14/837,554, filed on Aug. 27, 2015, now Pat. No. 9,607,377, which is a
(Continued)

(51) Int. Cl.
*G06K 9/00* (2006.01)
*G06T 7/00* (2017.01)
(Continued)

(52) U.S. Cl.
CPC .......... *G06T 7/0012* (2013.01); *G06K 9/4661* (2013.01); *G06K 9/52* (2013.01);
(Continued)

(58) Field of Classification Search
CPC .......................................... G06T 2207/10016
See application file for complete search history.

(56) References Cited

U.S. PATENT DOCUMENTS

| 3,811,213 A | 5/1974 | Eaves |
| 4,689,999 A | 9/1987 | Shkedi |

(Continued)

FOREIGN PATENT DOCUMENTS

| CN | 105392423 | 3/2016 |
| DE | 29519078 | 3/1996 |

(Continued)

OTHER PUBLICATIONS

Forman et al (Non-Patent Literature "Self-encoded marker for optical prospective head motion correction in MRI", p. 24, 2011, Med Image Anal. Oct. 2011 ; 15(5): 708-719. oi:10-1016/j.media.).*
(Continued)

*Primary Examiner* — Oneal R Mistry
(74) *Attorney, Agent, or Firm* — Knobbe Martens Olson & Bear, LLP

(57) ABSTRACT

A system for tracking a moving target having up to six degrees of freedom and rapidly determining positions of the target, said system includes an easy to locate precision optical target fixed to the target. This system includes at least two cameras positioned so as to view the optical camera from different directions with each of the at least two cameras being adapted to record two dimensional images of the precision optical target defining precise target point. A computer processor is programmed to determine the target position of x, y and z and pitch, roll and yaw. In an embodiment, the system can be configured to utilize an iteration procedure whereby an approximate first-order solution is proposed and tested against the identified precise target points to determine residual errors which can be divided by the local derivatives with respect to each component of rotation and translation, to determine an iterative correction.

20 Claims, 14 Drawing Sheets

Related U.S. Application Data continuation of application No. 13/831,115, filed on Mar. 14, 2013, now Pat. No. 9,305,365.

(60) Provisional application No. 61/849,338, filed on Jan. 24, 2013.

(51) Int. Cl.

| | | |
|---|---|---|
| *G06T 7/246* | (2017.01) | |
| *G06T 7/73* | (2017.01) | |
| *G06T 7/60* | (2017.01) | |
| *G06K 9/52* | (2006.01) | |
| *H04N 7/18* | (2006.01) | |
| *H04N 5/247* | (2006.01) | |
| *G06K 9/46* | (2006.01) | |

(52) U.S. Cl.
CPC .............. *G06T 7/246* (2017.01); *G06T 7/248* (2017.01); *G06T 7/60* (2013.01); *G06T 7/73* (2017.01); *G06T 7/74* (2017.01); *H04N 5/247* (2013.01); *H04N 7/18* (2013.01); *G06T 2207/10016* (2013.01); *G06T 2207/10021* (2013.01); *G06T 2207/10088* (2013.01); *G06T 2207/30168* (2013.01); *G06T 2207/30196* (2013.01); *G06T 2207/30204* (2013.01)

(56) References Cited

U.S. PATENT DOCUMENTS

| | | |
|---|---|---|
| 4,724,386 A | 2/1988 | Haacke et al. |
| 4,894,129 A | 1/1990 | Leiponen et al. |
| 4,923,295 A | 5/1990 | Sireul et al. |
| 4,953,554 A | 9/1990 | Zerhouni et al. |
| 4,988,886 A | 1/1991 | Palum et al. |
| 5,075,562 A | 12/1991 | Greivenkamp et al. |
| 5,318,026 A | 6/1994 | Pelc |
| 5,515,711 A | 5/1996 | Hinkle |
| 5,545,993 A | 8/1996 | Taguchi et al. |
| 5,615,677 A | 4/1997 | Pelc et al. |
| 5,687,725 A | 11/1997 | Wendt |
| 5,728,935 A | 3/1998 | Czompo |
| 5,802,202 A | 9/1998 | Yamada et al. |
| 5,835,223 A | 11/1998 | Zawemer et al. |
| 5,886,257 A | 3/1999 | Gustafson et al. |
| 5,889,505 A | 3/1999 | Toyama |
| 5,936,722 A | 8/1999 | Armstrong et al. |
| 5,936,723 A | 8/1999 | Schmidt et al. |
| 5,947,900 A | 9/1999 | Derbyshire et al. |
| 5,987,349 A | 11/1999 | Schulz |
| 6,031,888 A | 2/2000 | Ivan et al. |
| 6,044,308 A | 3/2000 | Huissoon |
| 6,057,680 A | 5/2000 | Foo et al. |
| 6,061,644 A | 5/2000 | Leis |
| 6,088,482 A | 7/2000 | He |
| 6,144,875 A | 11/2000 | Schweikard et al. |
| 6,236,737 B1 | 5/2001 | Gregson et al. |
| 6,246,900 B1 | 6/2001 | Cosman et al. |
| 6,279,579 B1 | 8/2001 | Riaziat et al. |
| 6,285,902 B1 | 9/2001 | Kienzle, III et al. |
| 6,289,235 B1 | 9/2001 | Webber |
| 6,292,683 B1 | 9/2001 | Gupta et al. |
| 6,298,262 B1 | 10/2001 | Franck et al. |
| 6,381,485 B1 | 4/2002 | Hunter et al. |
| 6,384,908 B1 | 5/2002 | Schmidt et al. |
| 6,390,982 B1 | 5/2002 | Bova et al. |
| 6,402,762 B2 | 6/2002 | Hunter et al. |
| 6,405,072 B1 | 6/2002 | Cosman |
| 6,421,551 B1 | 7/2002 | Kuth et al. |
| 6,467,905 B1 | 10/2002 | Stahl et al. |
| 6,474,159 B1 | 11/2002 | Foxlin et al. |
| 6,484,131 B1 | 11/2002 | Amoral-Moriya et al. |
| 6,490,475 B1 | 12/2002 | Seeley et al. |
| 6,501,981 B1 | 12/2002 | Schweikard et al. |
| 6,587,707 B2 | 7/2003 | Nehrke et al. |
| 6,621,889 B1 | 9/2003 | Mostafavi |
| 6,650,920 B2 | 11/2003 | Schaldach et al. |
| 6,662,036 B2 | 12/2003 | Cosman |
| 6,687,528 B2 | 2/2004 | Gupta et al. |
| 6,690,965 B1 | 2/2004 | Riaziat et al. |
| 6,711,431 B2 | 3/2004 | Sarin et al. |
| 6,731,970 B2 | 5/2004 | Schlossbauer et al. |
| 6,758,218 B2 | 7/2004 | Anthony |
| 6,771,997 B2 | 8/2004 | Schaffer |
| 6,794,869 B2 | 9/2004 | Brittain |
| 6,856,827 B2 | 2/2005 | Seeley et al. |
| 6,856,828 B2 | 2/2005 | Cossette et al. |
| 6,876,198 B2 | 4/2005 | Watanabe et al. |
| 6,888,924 B2 | 5/2005 | Claus et al. |
| 6,891,374 B2 | 5/2005 | Brittain |
| 6,892,089 B1 | 5/2005 | Prince et al. |
| 6,897,655 B2 | 5/2005 | Brittain et al. |
| 6,913,603 B2 | 7/2005 | Knopp et al. |
| 6,937,696 B1 | 8/2005 | Mostafavi |
| 6,959,266 B1 | 10/2005 | Mostafavi |
| 6,973,202 B2 | 12/2005 | Mostafavi |
| 6,980,679 B2 | 12/2005 | Jeung et al. |
| 7,007,699 B2 | 3/2006 | Martinelli et al. |
| 7,107,091 B2 | 9/2006 | Jutras et al. |
| 7,110,805 B2 | 9/2006 | Machida |
| 7,123,758 B2 | 10/2006 | Jeung et al. |
| 7,171,257 B2 | 1/2007 | Thomson |
| 7,176,440 B2 | 2/2007 | Cofer et al. |
| 7,191,100 B2 | 3/2007 | Mostafavi |
| 7,204,254 B2 | 4/2007 | Riaziat et al. |
| 7,209,777 B2 | 4/2007 | Saranathan et al. |
| 7,209,977 B2 | 4/2007 | Acharya et al. |
| 7,260,253 B2 | 8/2007 | Rahn et al. |
| 7,260,426 B2 | 8/2007 | Schweikard et al. |
| 7,295,007 B2 | 11/2007 | Dold |
| 7,313,430 B2 | 12/2007 | Urquhart et al. |
| 7,327,865 B2 | 2/2008 | Fu et al. |
| 7,348,776 B1 | 3/2008 | Aksoy et al. |
| 7,403,638 B2 | 7/2008 | Jeung et al. |
| 7,494,277 B2 | 2/2009 | Setala |
| 7,498,811 B2 | 3/2009 | Macfarlane et al. |
| 7,505,805 B2 | 3/2009 | Kuroda |
| 7,535,411 B2 | 5/2009 | Falco |
| 7,551,089 B2 | 6/2009 | Sawyer |
| 7,561,909 B1 | 7/2009 | Pai et al. |
| 7,567,697 B2 | 7/2009 | Mostafavi |
| 7,573,269 B2 | 8/2009 | Yao |
| 7,602,301 B1 | 10/2009 | Stirling et al. |
| 7,603,155 B2 | 10/2009 | Jensen |
| 7,623,623 B2 | 11/2009 | Raanes et al. |
| 7,657,300 B2 | 2/2010 | Hunter et al. |
| 7,657,301 B2 | 2/2010 | Mate et al. |
| 7,659,521 B2 | 2/2010 | Pedroni |
| 7,660,623 B2 | 2/2010 | Hunter et al. |
| 7,668,288 B2 | 2/2010 | Conwell et al. |
| 7,689,263 B1 | 3/2010 | Fung et al. |
| 7,702,380 B1 | 4/2010 | Dean |
| 7,715,604 B2 | 5/2010 | Sun et al. |
| 7,742,077 B2 | 6/2010 | Sablak et al. |
| 7,742,621 B2 | 6/2010 | Hammoud et al. |
| 7,742,804 B2 | 6/2010 | Faul et al. |
| 7,744,528 B2 | 6/2010 | Wallace et al. |
| 7,760,908 B2 | 7/2010 | Curtner et al. |
| 7,766,837 B2 | 8/2010 | Pedrizzetti et al. |
| 7,769,430 B2 | 8/2010 | Mostafavi |
| 7,772,569 B2 | 8/2010 | Bewersdorf et al. |
| 7,787,011 B2 | 8/2010 | Zhou et al. |
| 7,787,935 B2 | 8/2010 | Dumoulin et al. |
| 7,791,808 B2 | 9/2010 | French et al. |
| 7,792,249 B2 | 9/2010 | Gertner et al. |
| 7,796,154 B2 | 9/2010 | Senior et al. |
| 7,798,730 B2 | 9/2010 | Westerweck |
| 7,801,330 B2 | 9/2010 | Zhang et al. |
| 7,805,987 B1 | 10/2010 | Smith |
| 7,806,604 B2 | 10/2010 | Bazakos et al. |
| 7,817,046 B2 | 10/2010 | Coveley et al. |
| 7,817,824 B2 | 10/2010 | Liang et al. |
| 7,819,818 B2 | 10/2010 | Ghajar |
| 7,833,221 B2 | 11/2010 | Voegele |

(56) References Cited

U.S. PATENT DOCUMENTS

| | | |
|---|---|---|
| 7,834,846 B1 | 11/2010 | Bell |
| 7,835,783 B1 | 11/2010 | Aletras |
| 7,839,551 B2 | 11/2010 | Lee et al. |
| 7,840,253 B2 | 11/2010 | Tremblay et al. |
| 7,844,094 B2 | 11/2010 | Jeung et al. |
| 7,844,320 B2 | 11/2010 | Shahidi |
| 7,850,526 B2 | 12/2010 | Zalewski et al. |
| 7,860,301 B2 | 12/2010 | Se et al. |
| 7,866,818 B2 | 1/2011 | Schroeder et al. |
| 7,868,282 B2 | 1/2011 | Lee et al. |
| 7,878,652 B2 | 2/2011 | Chen et al. |
| 7,883,415 B2 | 2/2011 | Larsen et al. |
| 7,889,907 B2 | 2/2011 | Engelbart et al. |
| 7,894,877 B2 | 2/2011 | Lewin et al. |
| 7,902,825 B2 | 3/2011 | Bammer et al. |
| 7,907,987 B2 | 3/2011 | Dempsey |
| 7,908,060 B2 | 3/2011 | Basson et al. |
| 7,908,233 B2 | 3/2011 | Angell et al. |
| 7,911,207 B2 | 3/2011 | Macfarlane et al. |
| 7,912,532 B2 | 3/2011 | Schmidt et al. |
| 7,920,250 B2 | 4/2011 | Robert et al. |
| 7,920,911 B2 | 4/2011 | Hoshino et al. |
| 7,925,066 B2 | 4/2011 | Ruohonen et al. |
| 7,925,549 B2 | 4/2011 | Looney et al. |
| 7,931,370 B2 | 4/2011 | Prat Bartomeu |
| 7,944,354 B2 | 5/2011 | Kangas et al. |
| 7,944,454 B2 | 5/2011 | Zhou et al. |
| 7,945,304 B2 | 5/2011 | Feinberg |
| 7,946,921 B2 | 5/2011 | Ofek et al. |
| 7,962,197 B2 | 6/2011 | Rioux et al. |
| 7,971,999 B2 | 7/2011 | Zinser |
| 7,977,942 B2 | 7/2011 | White |
| 7,978,925 B1 | 7/2011 | Souchard |
| 7,988,288 B2 | 8/2011 | Donaldson |
| 7,990,365 B2 | 8/2011 | Marvit et al. |
| 8,005,571 B2 | 8/2011 | Sutherland et al. |
| 8,009,198 B2 | 8/2011 | Alhadef |
| 8,019,170 B2 | 9/2011 | Wang et al. |
| 8,021,231 B2 | 9/2011 | Walker et al. |
| 8,022,982 B2 | 9/2011 | Thorn |
| 8,024,026 B2 | 9/2011 | Groszmann |
| 8,031,909 B2 | 10/2011 | Se et al. |
| 8,031,933 B2 | 10/2011 | Se et al. |
| 8,036,425 B2 | 10/2011 | Hou |
| 8,041,077 B2 | 10/2011 | Bell |
| 8,041,412 B2 | 10/2011 | Glossop et al. |
| 8,048,002 B2 | 11/2011 | Ghajar |
| 8,049,867 B2 | 11/2011 | Bridges et al. |
| 8,055,020 B2 | 11/2011 | Meuter et al. |
| 8,055,049 B2 | 11/2011 | Stayman et al. |
| 8,060,185 B2 | 11/2011 | Hunter et al. |
| 8,063,929 B2 | 11/2011 | Kurtz et al. |
| 8,073,197 B2 | 12/2011 | Xu et al. |
| 8,077,914 B1 | 12/2011 | Kaplan |
| 8,085,302 B2 | 12/2011 | Zhang et al. |
| 8,086,026 B2 | 12/2011 | Schulz |
| 8,086,299 B2 | 12/2011 | Adler et al. |
| RE43,147 E | 1/2012 | Aviv |
| 8,094,193 B2 | 1/2012 | Peterson |
| 8,095,203 B2 | 1/2012 | Wright et al. |
| 8,095,209 B2 | 1/2012 | Flaherty |
| 8,098,889 B2 | 1/2012 | Zhu et al. |
| 8,113,991 B2 | 2/2012 | Kutliroff |
| 8,116,527 B2 | 2/2012 | Sabol |
| 8,121,356 B2 | 2/2012 | Friedman |
| 8,121,361 B2 | 2/2012 | Ernst et al. |
| 8,134,597 B2 | 3/2012 | Thorn |
| 8,135,201 B2 | 3/2012 | Smith et al. |
| 8,139,029 B2 | 3/2012 | Boillot |
| 8,139,896 B1 | 3/2012 | Ahiska |
| 8,144,118 B2 | 3/2012 | Hildreth |
| 8,144,148 B2 | 3/2012 | El Dokor |
| 8,150,063 B2 | 4/2012 | Chen |
| 8,150,498 B2 | 4/2012 | Gielen et al. |
| 8,160,304 B2 | 4/2012 | Rhoads |
| 8,165,844 B2 | 4/2012 | Luinge et al. |
| 8,167,802 B2 | 5/2012 | Baba et al. |
| 8,172,573 B2 | 5/2012 | Sonenfeld et al. |
| 8,175,332 B2 | 5/2012 | Harrington |
| 8,179,604 B1 | 5/2012 | Prada Gomez et al. |
| 8,180,428 B2 | 5/2012 | Kaiser et al. |
| 8,180,432 B2 | 5/2012 | Sayeh |
| 8,187,097 B1 | 5/2012 | Zhang |
| 8,189,869 B2 | 5/2012 | Bell |
| 8,189,889 B2 | 5/2012 | Pearlstein et al. |
| 8,189,926 B2 | 5/2012 | Sharma |
| 8,190,233 B2 | 5/2012 | Dempsey |
| 8,191,359 B2 | 6/2012 | White et al. |
| 8,194,134 B2 | 6/2012 | Furukawa |
| 8,195,084 B2 | 6/2012 | Xiao |
| 8,199,983 B2 | 6/2012 | Qureshi |
| 8,206,219 B2 | 6/2012 | Shum |
| 8,207,967 B1 | 6/2012 | El Dokor |
| 8,208,758 B2 | 6/2012 | Wang |
| 8,213,693 B1 | 7/2012 | Li |
| 8,214,012 B2 | 7/2012 | Zuccolotto et al. |
| 8,214,016 B2 | 7/2012 | Lavallee et al. |
| 8,216,016 B2 | 7/2012 | Yamagishi et al. |
| 8,218,818 B2 | 7/2012 | Cobb |
| 8,218,819 B2 | 7/2012 | Cobb |
| 8,218,825 B2 | 7/2012 | Gordon |
| 8,221,399 B2 | 7/2012 | Amano |
| 8,223,147 B1 | 7/2012 | El Dokor |
| 8,224,423 B2 | 7/2012 | Faul |
| 8,226,574 B2 | 7/2012 | Whillock |
| 8,229,163 B2 | 7/2012 | Coleman |
| 8,229,166 B2 | 7/2012 | Teng |
| 8,229,184 B2 | 7/2012 | Benkley |
| 8,232,872 B2 | 7/2012 | Zeng |
| 8,235,529 B1 | 8/2012 | Raffle |
| 8,235,530 B2 | 8/2012 | Maad |
| 8,241,125 B2 | 8/2012 | Huges |
| 8,243,136 B2 | 8/2012 | Aota |
| 8,243,269 B2 | 8/2012 | Matousek |
| 8,243,996 B2 | 8/2012 | Steinberg |
| 8,248,372 B2 | 8/2012 | Saila |
| 8,249,691 B2 | 8/2012 | Chase et al. |
| 8,253,770 B2 | 8/2012 | Kurtz |
| 8,253,774 B2 | 8/2012 | Huitema |
| 8,253,778 B2 | 8/2012 | Atsushi |
| 8,259,109 B2 | 9/2012 | El Dokor |
| 8,260,036 B2 | 9/2012 | Hamza et al. |
| 8,279,288 B2 | 10/2012 | Son |
| 8,284,157 B2 | 10/2012 | Markovic |
| 8,284,847 B2 | 10/2012 | Adermann |
| 8,287,373 B2 | 10/2012 | Marks et al. |
| 8,289,390 B2 | 10/2012 | Aggarwal |
| 8,289,392 B2 | 10/2012 | Senior et al. |
| 8,290,208 B2 | 10/2012 | Kurtz |
| 8,290,229 B2 | 10/2012 | Qureshi |
| 8,295,573 B2 | 10/2012 | Bredno et al. |
| 8,301,226 B2 | 10/2012 | Csavoy et al. |
| 8,306,260 B2 | 11/2012 | Zhu |
| 8,306,267 B1 | 11/2012 | Gossweiler, III |
| 8,306,274 B2 | 11/2012 | Grycewicz |
| 8,306,663 B2 | 11/2012 | Wickham |
| 8,310,656 B2 | 11/2012 | Zalewski |
| 8,310,662 B2 | 11/2012 | Mehr |
| 8,311,611 B2 | 11/2012 | Csavoy et al. |
| 8,314,854 B2 | 11/2012 | Yoon |
| 8,315,691 B2 | 11/2012 | Sumanaweera et al. |
| 8,316,324 B2 | 11/2012 | Boillot |
| 8,320,621 B2 | 11/2012 | McEldowney |
| 8,320,709 B2 | 11/2012 | Aratani et al. |
| 8,323,106 B2 | 12/2012 | Zalewski |
| 8,325,228 B2 | 12/2012 | Mariadoss |
| 8,330,811 B2 | 12/2012 | Maguire, Jr. |
| 8,330,812 B2 | 12/2012 | Maguire, Jr. |
| 8,331,019 B2 | 12/2012 | Cheong |
| 8,334,900 B2 | 12/2012 | Qu et al. |
| 8,339,282 B2 | 12/2012 | Noble |
| 8,351,651 B2 | 1/2013 | Lee |
| 8,368,586 B2 | 2/2013 | Mohamadi |
| 8,369,574 B2 | 2/2013 | Hu |

(56) References Cited

U.S. PATENT DOCUMENTS

| | | |
|---|---|---|
| 8,374,393 B2 | 2/2013 | Cobb |
| 8,374,411 B2 | 2/2013 | Ernst et al. |
| 8,374,674 B2 | 2/2013 | Gertner |
| 8,376,226 B2 | 2/2013 | Dennard |
| 8,376,827 B2 | 2/2013 | Cammegh |
| 8,379,927 B2 | 2/2013 | Taylor |
| 8,380,284 B2 | 2/2013 | Saranathan et al. |
| 8,386,011 B2 | 2/2013 | Wieczorek |
| 8,390,291 B2 | 3/2013 | Macfarlane et al. |
| 8,390,729 B2 | 3/2013 | Long |
| 8,395,620 B2 | 3/2013 | El Dokor |
| 8,396,654 B1 | 3/2013 | Simmons et al. |
| 8,400,398 B2 | 3/2013 | Schoen |
| 8,400,490 B2 | 3/2013 | Apostolopoulos |
| 8,405,491 B2 | 3/2013 | Fong |
| 8,405,656 B2 | 3/2013 | El Dokor |
| 8,405,717 B2 | 3/2013 | Kim |
| 8,406,845 B2 | 3/2013 | Komistek et al. |
| 8,411,931 B2 | 4/2013 | Zhou |
| 8,427,538 B2 | 4/2013 | Ahiska |
| 8,428,319 B2 | 4/2013 | Tsin et al. |
| 8,571,293 B2 | 10/2013 | Ernst et al. |
| 8,615,127 B2 | 12/2013 | Fitzpatrick |
| 8,744,154 B2 | 6/2014 | Van Den Brink |
| 8,848,977 B2 | 9/2014 | Bammer et al. |
| 8,862,420 B2 | 10/2014 | Ferran et al. |
| 8,953,847 B2 | 2/2015 | Moden |
| 8,996,094 B2 | 3/2015 | Schouenborg et al. |
| 9,076,212 B2 | 7/2015 | Ernst et al. |
| 9,082,177 B2 | 7/2015 | Sebok |
| 9,084,629 B1 | 7/2015 | Rosa |
| 9,103,897 B2 | 8/2015 | Herbst et al. |
| 9,138,175 B2 | 9/2015 | Ernst et al. |
| 9,173,715 B2 | 11/2015 | Baumgartner |
| 9,176,932 B2 | 11/2015 | Baggen et al. |
| 9,194,929 B2 | 11/2015 | Siegert et al. |
| 9,305,365 B2 | 4/2016 | Lovberg et al. |
| 9,395,386 B2 | 7/2016 | Corder et al. |
| 9,451,926 B2 | 9/2016 | Kinahan et al. |
| 9,606,209 B2 | 3/2017 | Ernst et al. |
| 9,607,377 B2 | 3/2017 | Lovberg et al. |
| 2002/0082496 A1 | 6/2002 | Kuth |
| 2002/0091422 A1 | 7/2002 | Greenberg et al. |
| 2002/0115931 A1 | 8/2002 | Strauss et al. |
| 2002/0180436 A1 | 12/2002 | Dale et al. |
| 2002/0188194 A1 | 12/2002 | Cosman |
| 2003/0063292 A1 | 4/2003 | Mostafavi |
| 2003/0088177 A1 | 5/2003 | Totterman et al. |
| 2003/0116166 A1 | 6/2003 | Anthony |
| 2003/0130574 A1 | 7/2003 | Stoyle |
| 2004/0071324 A1 | 4/2004 | Norris et al. |
| 2004/0116804 A1 | 6/2004 | Mostafavi |
| 2004/0140804 A1 | 7/2004 | Polzin et al. |
| 2004/0171927 A1 | 9/2004 | Lowen et al. |
| 2005/0027194 A1 | 2/2005 | Adler et al. |
| 2005/0054910 A1 | 3/2005 | Tremblay et al. |
| 2005/0105772 A1 | 5/2005 | Voronka et al. |
| 2005/0107685 A1 | 5/2005 | Seeber |
| 2005/0137475 A1 | 6/2005 | Dold et al. |
| 2005/0148854 A1 | 7/2005 | Ito et al. |
| 2005/0283068 A1 | 12/2005 | Zuccolotto et al. |
| 2006/0004281 A1 | 1/2006 | Saracen |
| 2006/0045310 A1 | 3/2006 | Tu et al. |
| 2006/0074292 A1 | 4/2006 | Thomson et al. |
| 2006/0241405 A1 | 10/2006 | Leitner et al. |
| 2007/0093709 A1 | 4/2007 | Abernathie |
| 2007/0206836 A1* | 9/2007 | Yoon ............... G06K 9/00362 382/104 |
| 2007/0239169 A1 | 10/2007 | Plaskos et al. |
| 2007/0280508 A1 | 12/2007 | Ernst et al. |
| 2008/0039713 A1 | 2/2008 | Thomson et al. |
| 2008/0181358 A1 | 7/2008 | Van Kampen et al. |
| 2008/0183074 A1 | 7/2008 | Carls et al. |
| 2008/0212835 A1 | 9/2008 | Tavor |
| 2008/0221442 A1 | 9/2008 | Tolkowsky et al. |
| 2008/0273754 A1 | 11/2008 | Hick et al. |
| 2008/0287728 A1 | 11/2008 | Mostafavi |
| 2008/0287780 A1 | 11/2008 | Chase et al. |
| 2008/0317313 A1 | 12/2008 | Goddard et al. |
| 2009/0028411 A1 | 1/2009 | Pfeuffer |
| 2009/0052760 A1 | 2/2009 | Smith et al. |
| 2009/0185663 A1 | 7/2009 | Gaines, Jr. |
| 2009/0209846 A1 | 8/2009 | Bammer |
| 2009/0253985 A1 | 10/2009 | Shachar et al. |
| 2009/0304297 A1 | 12/2009 | Adabala et al. |
| 2009/0306499 A1 | 12/2009 | Van Vorhis et al. |
| 2010/0054579 A1* | 3/2010 | Okutomi ............... G01C 11/06 382/154 |
| 2010/0057059 A1 | 3/2010 | Makino |
| 2010/0059679 A1 | 3/2010 | Albrecht |
| 2010/0069742 A1 | 3/2010 | Partain et al. |
| 2010/0091089 A1 | 4/2010 | Cromwell et al. |
| 2010/0099981 A1 | 4/2010 | Fishel |
| 2010/0125191 A1 | 5/2010 | Sahin |
| 2010/0137709 A1 | 6/2010 | Gardner et al. |
| 2010/0148774 A1 | 6/2010 | Kamata |
| 2010/0149099 A1 | 6/2010 | Elias |
| 2010/0149315 A1 | 6/2010 | Qu |
| 2010/0160775 A1 | 6/2010 | Pankratov |
| 2010/0164862 A1 | 7/2010 | Sullivan |
| 2010/0165293 A1 | 7/2010 | Tanassi et al. |
| 2010/0167246 A1 | 7/2010 | Ghajar |
| 2010/0172567 A1 | 7/2010 | Prokoski |
| 2010/0177929 A1 | 7/2010 | Kurtz |
| 2010/0178966 A1 | 7/2010 | Seydoux |
| 2010/0179390 A1 | 7/2010 | Davis |
| 2010/0179413 A1 | 7/2010 | Kadour et al. |
| 2010/0183196 A1 | 7/2010 | Fu et al. |
| 2010/0191631 A1 | 7/2010 | Weidmann |
| 2010/0194879 A1 | 8/2010 | Pasveer |
| 2010/0198067 A1 | 8/2010 | Mahfouz |
| 2010/0198101 A1 | 8/2010 | Song |
| 2010/0198112 A1 | 8/2010 | Maad |
| 2010/0199232 A1 | 8/2010 | Mistry |
| 2010/0210350 A9 | 8/2010 | Walker |
| 2010/0214267 A1 | 8/2010 | Radivojevic |
| 2010/0231511 A1 | 9/2010 | Henty |
| 2010/0231692 A1 | 9/2010 | Perlman |
| 2010/0245536 A1 | 9/2010 | Huitema |
| 2010/0245593 A1 | 9/2010 | Kim |
| 2010/0251924 A1 | 10/2010 | Taylor |
| 2010/0253762 A1 | 10/2010 | Cheong |
| 2010/0268072 A1 | 10/2010 | Hall et al. |
| 2010/0277571 A1 | 11/2010 | Xu |
| 2010/0282902 A1 | 11/2010 | Rajasingham |
| 2010/0283833 A1 | 11/2010 | Yeh |
| 2010/0284119 A1 | 11/2010 | Coakley |
| 2010/0289899 A1 | 11/2010 | Hendron |
| 2010/0290668 A1 | 11/2010 | Friedman |
| 2010/0292841 A1 | 11/2010 | Wickham |
| 2010/0295718 A1 | 11/2010 | Mohamadi |
| 2010/0296701 A1 | 11/2010 | Hu |
| 2010/0302142 A1 | 12/2010 | French |
| 2010/0303289 A1 | 12/2010 | Polzin |
| 2010/0311512 A1 | 12/2010 | Lock |
| 2010/0321505 A1 | 12/2010 | Kokubun |
| 2010/0328055 A1 | 12/2010 | Fong |
| 2010/0328201 A1 | 12/2010 | Marbit |
| 2010/0328267 A1 | 12/2010 | Chen |
| 2010/0330912 A1 | 12/2010 | Saila |
| 2011/0001699 A1 | 1/2011 | Jacobsen |
| 2011/0006991 A1 | 1/2011 | Elias |
| 2011/0007939 A1 | 1/2011 | Teng |
| 2011/0007946 A1 | 1/2011 | Liang |
| 2011/0008759 A1 | 1/2011 | Usui |
| 2011/0015521 A1 | 1/2011 | Faul |
| 2011/0019001 A1 | 1/2011 | Rhoads |
| 2011/0025853 A1 | 2/2011 | Richardson |
| 2011/0038520 A1 | 2/2011 | Yui |
| 2011/0043631 A1 | 2/2011 | Marman |
| 2011/0043759 A1 | 2/2011 | Bushinsky |
| 2011/0050562 A1 | 3/2011 | Schoen |
| 2011/0050569 A1 | 3/2011 | Marvit |
| 2011/0050947 A1 | 3/2011 | Marman |

(56) References Cited

U.S. PATENT DOCUMENTS

| | | |
|---|---|---|
| 2011/0052002 A1 | 3/2011 | Cobb |
| 2011/0052003 A1 | 3/2011 | Cobb |
| 2011/0052015 A1 | 3/2011 | Saund |
| 2011/0054870 A1 | 3/2011 | Dariush |
| 2011/0057816 A1 | 3/2011 | Noble |
| 2011/0058020 A1 | 3/2011 | Dieckmann |
| 2011/0069207 A1 | 3/2011 | Steinberg |
| 2011/0074675 A1 | 3/2011 | Shiming |
| 2011/0081000 A1 | 4/2011 | Gertner |
| 2011/0081043 A1 | 4/2011 | Sabol |
| 2011/0085704 A1 | 4/2011 | Han |
| 2011/0092781 A1 | 4/2011 | Gertner |
| 2011/0102549 A1 | 5/2011 | Takahashi |
| 2011/0105883 A1 | 5/2011 | Lake et al. |
| 2011/0105893 A1 | 5/2011 | Akins et al. |
| 2011/0115793 A1 | 5/2011 | Grycewicz |
| 2011/0115892 A1 | 5/2011 | Fan |
| 2011/0116683 A1 | 5/2011 | Kramer et al. |
| 2011/0117528 A1 | 5/2011 | Marciello et al. |
| 2011/0118032 A1 | 5/2011 | Zalewski |
| 2011/0133917 A1 | 6/2011 | Zeng |
| 2011/0142411 A1 | 6/2011 | Camp |
| 2011/0150271 A1 | 6/2011 | Lee |
| 2011/0157168 A1 | 6/2011 | Bennett |
| 2011/0157358 A1 | 6/2011 | Bell |
| 2011/0157370 A1 | 6/2011 | Livesey |
| 2011/0160569 A1 | 6/2011 | Cohen et al. |
| 2011/0172060 A1 | 7/2011 | Morales |
| 2011/0172521 A1 | 7/2011 | Zdeblick et al. |
| 2011/0175801 A1 | 7/2011 | Markovic |
| 2011/0175809 A1 | 7/2011 | Markovic |
| 2011/0175810 A1 | 7/2011 | Markovic |
| 2011/0176723 A1 | 7/2011 | Ali et al. |
| 2011/0180695 A1 | 7/2011 | Li |
| 2011/0181893 A1 | 7/2011 | MacFarlane |
| 2011/0182472 A1 | 7/2011 | Hansen |
| 2011/0187640 A1 | 8/2011 | Jacobsen |
| 2011/0193939 A1 | 8/2011 | Vassigh |
| 2011/0199461 A1 | 8/2011 | Horio |
| 2011/0201916 A1 | 8/2011 | Duyn et al. |
| 2011/0201939 A1 | 8/2011 | Hubschman et al. |
| 2011/0202306 A1 | 8/2011 | Eng |
| 2011/0205358 A1 | 8/2011 | Aota |
| 2011/0207089 A1 | 8/2011 | Lagettie |
| 2011/0208437 A1 | 8/2011 | Teicher |
| 2011/0216002 A1 | 9/2011 | Weising |
| 2011/0216180 A1 | 9/2011 | Pasini |
| 2011/0221770 A1 | 9/2011 | Kruglick |
| 2011/0229862 A1 | 9/2011 | Parikh |
| 2011/0230755 A1 | 9/2011 | MacFarlane et al. |
| 2011/0234807 A1 | 9/2011 | Jones |
| 2011/0234834 A1 | 9/2011 | Sugimoto |
| 2011/0235855 A1 | 9/2011 | Smith |
| 2011/0237933 A1 | 9/2011 | Cohen |
| 2011/0242134 A1 | 10/2011 | Miller |
| 2011/0244939 A1 | 10/2011 | Cammegh |
| 2011/0250929 A1 | 10/2011 | Lin |
| 2011/0251478 A1 | 10/2011 | Wieczorek |
| 2011/0255845 A1 | 10/2011 | Kikuchi |
| 2011/0257566 A1 | 10/2011 | Burdea |
| 2011/0260965 A1 | 10/2011 | Kim |
| 2011/0262002 A1 | 10/2011 | Lee |
| 2011/0267427 A1 | 11/2011 | Goh |
| 2011/0267456 A1 | 11/2011 | Adermann |
| 2011/0275957 A1 | 11/2011 | Bhandari |
| 2011/0276396 A1 | 11/2011 | Rathod |
| 2011/0279663 A1 | 11/2011 | Fan |
| 2011/0285622 A1 | 11/2011 | Marti |
| 2011/0286010 A1 | 11/2011 | Kusik et al. |
| 2011/0291925 A1 | 12/2011 | Israel |
| 2011/0293143 A1 | 12/2011 | Narayanan et al. |
| 2011/0293146 A1 | 12/2011 | Grycewicz |
| 2011/0298708 A1 | 12/2011 | Hsu |
| 2011/0298824 A1 | 12/2011 | Lee |
| 2011/0300994 A1 | 12/2011 | Verkaaik |
| 2011/0301449 A1 | 12/2011 | Maurer, Jr. |
| 2011/0301934 A1 | 12/2011 | Tardis |
| 2011/0303214 A1 | 12/2011 | Welle |
| 2011/0304541 A1 | 12/2011 | Dalal |
| 2011/0304650 A1 | 12/2011 | Canpillo |
| 2011/0304706 A1 | 12/2011 | Border |
| 2011/0306867 A1 | 12/2011 | Gopinadhan |
| 2011/0310220 A1 | 12/2011 | McEldowney |
| 2011/0310226 A1 | 12/2011 | McEldowney |
| 2011/0316994 A1 | 12/2011 | Lemchen |
| 2011/0317877 A1 | 12/2011 | Bell |
| 2012/0002112 A1 | 1/2012 | Huang |
| 2012/0004791 A1 | 1/2012 | Buelthoff |
| 2012/0007839 A1 | 1/2012 | Tsao et al. |
| 2012/0019645 A1 | 1/2012 | Maltz |
| 2012/0020524 A1 | 1/2012 | Ishikawa |
| 2012/0021806 A1 | 1/2012 | Maltz |
| 2012/0027226 A1 | 2/2012 | Desenberg |
| 2012/0029345 A1 | 2/2012 | Mahfouz et al. |
| 2012/0032882 A1 | 2/2012 | Schlachta |
| 2012/0033083 A1 | 2/2012 | Horvinger |
| 2012/0035462 A1 | 2/2012 | Maurer, Jr. et al. |
| 2012/0039505 A1 | 2/2012 | Vastide |
| 2012/0044363 A1 | 2/2012 | Lu |
| 2012/0045091 A1 | 2/2012 | Kaganovich |
| 2012/0049453 A1 | 3/2012 | Morichau-Beauchant et al. |
| 2012/0051588 A1 | 3/2012 | McEldowney |
| 2012/0051664 A1 | 3/2012 | Gopalakrishnan et al. |
| 2012/0052949 A1 | 3/2012 | Weitzner |
| 2012/0056982 A1 | 3/2012 | Katz |
| 2012/0057640 A1 | 3/2012 | Shi |
| 2012/0065492 A1 | 3/2012 | Gertner et al. |
| 2012/0065494 A1 | 3/2012 | Gertner et al. |
| 2012/0072041 A1 | 3/2012 | Miller |
| 2012/0075166 A1 | 3/2012 | Marti |
| 2012/0075177 A1 | 3/2012 | Jacobsen |
| 2012/0076369 A1 | 3/2012 | Abramovich |
| 2012/0081504 A1 | 4/2012 | Ng |
| 2012/0083314 A1 | 4/2012 | Ng |
| 2012/0083960 A1 | 4/2012 | Zhu |
| 2012/0086778 A1 | 4/2012 | Lee |
| 2012/0086809 A1 | 4/2012 | Lee |
| 2012/0092445 A1 | 4/2012 | McDowell |
| 2012/0092502 A1 | 4/2012 | Knasel |
| 2012/0093481 A1 | 4/2012 | McDowell |
| 2012/0098938 A1 | 4/2012 | Jin |
| 2012/0101388 A1 | 4/2012 | Tripathi |
| 2012/0105573 A1 | 5/2012 | Apostolopoulos |
| 2012/0106814 A1 | 5/2012 | Gleason et al. |
| 2012/0108909 A1 | 5/2012 | Slobounov et al. |
| 2012/0113140 A1 | 5/2012 | Hilliges |
| 2012/0113223 A1 | 5/2012 | Hilliges |
| 2012/0116202 A1 | 5/2012 | Bangera |
| 2012/0119999 A1 | 5/2012 | Harris |
| 2012/0120072 A1 | 5/2012 | Se |
| 2012/0120237 A1 | 5/2012 | Trepess |
| 2012/0120243 A1 | 5/2012 | Chien |
| 2012/0120277 A1 | 5/2012 | Tsai |
| 2012/0121124 A1 | 5/2012 | Bammer |
| 2012/0124604 A1 | 5/2012 | Small |
| 2012/0127319 A1 | 5/2012 | Rao |
| 2012/0133616 A1 | 5/2012 | Nishihara et al. |
| 2012/0133889 A1 | 5/2012 | Bergt |
| 2012/0143029 A1 | 6/2012 | Silverstein |
| 2012/0143212 A1 | 6/2012 | Madhani |
| 2012/0154272 A1 | 6/2012 | Hildreth |
| 2012/0154511 A1 | 6/2012 | Hsu |
| 2012/0154536 A1 | 6/2012 | Stoker |
| 2012/0154579 A1 | 6/2012 | Hampapur |
| 2012/0156661 A1 | 6/2012 | Smith |
| 2012/0158197 A1 | 6/2012 | Hinman |
| 2012/0162378 A1 | 6/2012 | El Dokor |
| 2012/0165964 A1 | 6/2012 | Flaks |
| 2012/0167143 A1 | 6/2012 | Longet |
| 2012/0169841 A1 | 7/2012 | Chemali |
| 2012/0176314 A1 | 7/2012 | Jeon |
| 2012/0184371 A1 | 7/2012 | Shum |
| 2012/0188237 A1 | 7/2012 | Han |
| 2012/0188371 A1 | 7/2012 | Chen |

(56) References Cited

U.S. PATENT DOCUMENTS

| | | |
|---|---|---|
| 2012/0194422 A1 | 8/2012 | El Dokor |
| 2012/0194517 A1 | 8/2012 | Izadi |
| 2012/0194561 A1 | 8/2012 | Grossinger |
| 2012/0195466 A1 | 8/2012 | Teng |
| 2012/0196660 A1 | 8/2012 | El Dokor et al. |
| 2012/0197135 A1 | 8/2012 | Slatkine |
| 2012/0200676 A1 | 8/2012 | Huitema |
| 2012/0201428 A1 | 8/2012 | Joshi et al. |
| 2012/0206604 A1 | 8/2012 | Jones |
| 2012/0212594 A1 | 8/2012 | Barns |
| 2012/0218407 A1 | 8/2012 | Chien |
| 2012/0218421 A1 | 8/2012 | Chien |
| 2012/0220233 A1 | 8/2012 | Teague |
| 2012/0224666 A1 | 9/2012 | Speller |
| 2012/0224743 A1 | 9/2012 | Rodriguez |
| 2012/0225718 A1 | 9/2012 | Zhang |
| 2012/0229643 A1 | 9/2012 | Chidanand |
| 2012/0229651 A1 | 9/2012 | Takizawa |
| 2012/0230561 A1 | 9/2012 | Qureshi |
| 2012/0235896 A1 | 9/2012 | Jacobsen |
| 2012/0238337 A1 | 9/2012 | French |
| 2012/0242816 A1 | 9/2012 | Cruz |
| 2012/0249741 A1 | 10/2012 | Maciocci |
| 2012/0253201 A1 | 10/2012 | Reinhold |
| 2012/0253241 A1 | 10/2012 | Levital et al. |
| 2012/0262540 A1 | 10/2012 | Rondinelli |
| 2012/0262558 A1 | 10/2012 | Boger |
| 2012/0262583 A1 | 10/2012 | Bernal |
| 2012/0268124 A1 | 10/2012 | Herbst et al. |
| 2012/0275649 A1 | 11/2012 | Cobb |
| 2012/0276995 A1 | 11/2012 | Lansdale |
| 2012/0277001 A1 | 11/2012 | Lansdale |
| 2012/0281093 A1 | 11/2012 | Fong |
| 2012/0281873 A1 | 11/2012 | Brown |
| 2012/0288142 A1 | 11/2012 | Gossweiler, III |
| 2012/0288143 A1 | 11/2012 | Ernst |
| 2012/0288852 A1 | 11/2012 | Willson |
| 2012/0289334 A9 | 11/2012 | Mikhailov |
| 2012/0289822 A1 | 11/2012 | Shachar et al. |
| 2012/0293412 A1 | 11/2012 | El Dokor |
| 2012/0293506 A1 | 11/2012 | Vertucci |
| 2012/0293663 A1 | 11/2012 | Liu |
| 2012/0294511 A1 | 11/2012 | Datta |
| 2012/0300961 A1 | 11/2012 | Moeller |
| 2012/0303839 A1 | 11/2012 | Jackson |
| 2012/0304126 A1 | 11/2012 | Lavigne |
| 2012/0307075 A1 | 12/2012 | Margalit |
| 2012/0307207 A1 | 12/2012 | Abraham |
| 2012/0314066 A1 | 12/2012 | Lee |
| 2012/0315016 A1 | 12/2012 | Fung |
| 2012/0319946 A1 | 12/2012 | El Dokor |
| 2012/0319989 A1 | 12/2012 | Argiro |
| 2012/0320178 A1 | 12/2012 | Siegert et al. |
| 2012/0320219 A1 | 12/2012 | David |
| 2012/0326966 A1 | 12/2012 | Rauber |
| 2012/0326976 A1 | 12/2012 | Markovic |
| 2012/0326979 A1 | 12/2012 | Geisert |
| 2012/0327241 A1 | 12/2012 | Howe |
| 2012/0327246 A1 | 12/2012 | Senior et al. |
| 2013/0002866 A1 | 1/2013 | Hanpapur |
| 2013/0002879 A1 | 1/2013 | Weber |
| 2013/0002900 A1 | 1/2013 | Gossweiler, III |
| 2013/0009865 A1 | 1/2013 | Valik |
| 2013/0010071 A1 | 1/2013 | Valik |
| 2013/0013452 A1 | 1/2013 | Dennard |
| 2013/0016009 A1 | 1/2013 | Godfrey |
| 2013/0016876 A1 | 1/2013 | Wooley |
| 2013/0021434 A1 | 1/2013 | Ahiska |
| 2013/0021578 A1 | 1/2013 | Chen |
| 2013/0024819 A1 | 1/2013 | Rieffel |
| 2013/0030283 A1 | 1/2013 | Vortman et al. |
| 2013/0033640 A1 | 2/2013 | Lee |
| 2013/0033700 A1 | 2/2013 | Hallil |
| 2013/0035590 A1 | 2/2013 | Ma et al. |
| 2013/0035612 A1 | 2/2013 | Mason |
| 2013/0040720 A1 | 2/2013 | Cammegh |
| 2013/0041368 A1 | 2/2013 | Cunningham |
| 2013/0057702 A1 | 3/2013 | Chavan |
| 2013/0064426 A1 | 3/2013 | Watkins, Jr. |
| 2013/0064427 A1 | 3/2013 | Picard |
| 2013/0065517 A1 | 3/2013 | Svensson |
| 2013/0066448 A1 | 3/2013 | Alonso |
| 2013/0066526 A1 | 3/2013 | Mondragon |
| 2013/0069773 A1 | 3/2013 | Li |
| 2013/0070201 A1 | 3/2013 | Shahidi |
| 2013/0070257 A1 | 3/2013 | Wong |
| 2013/0072787 A1 | 3/2013 | Wallace |
| 2013/0076863 A1 | 3/2013 | Rappel |
| 2013/0076944 A1 | 3/2013 | Kosaka |
| 2013/0077823 A1 | 3/2013 | Mestha |
| 2013/0079033 A1 | 3/2013 | Gupta |
| 2013/0084980 A1 | 4/2013 | Hammontree |
| 2013/0088584 A1 | 4/2013 | Malhas |
| 2013/0093866 A1 | 4/2013 | Ohlhues et al. |
| 2013/0096439 A1 | 4/2013 | Lee |
| 2013/0102879 A1 | 4/2013 | MacLaren et al. |
| 2013/0102893 A1 | 4/2013 | Vollmer |
| 2013/0108979 A1 | 5/2013 | Daon |
| 2013/0113791 A1 | 5/2013 | Isaacs et al. |
| 2013/0211421 A1 | 8/2013 | Abovitz et al. |
| 2013/0281818 A1 | 10/2013 | Vija et al. |
| 2014/0037174 A1 | 2/2014 | Ernst et al. |
| 2014/0073908 A1 | 3/2014 | Biber |
| 2014/0088410 A1 | 3/2014 | Wu |
| 2014/0148685 A1 | 5/2014 | Liu et al. |
| 2014/0159721 A1 | 6/2014 | Grodzki |
| 2014/0171784 A1 | 6/2014 | Ooi et al. |
| 2014/0205140 A1 | 7/2014 | Lovberg et al. |
| 2014/0378816 A1 | 12/2014 | Oh et al. |
| 2015/0085072 A1 | 3/2015 | Yan |
| 2015/0265220 A1 | 9/2015 | Ernst et al. |
| 2015/0297120 A1 | 10/2015 | Son et al. |
| 2015/0331078 A1 | 11/2015 | Speck et al. |
| 2015/0359464 A1 | 12/2015 | Olesen |
| 2015/0366527 A1 | 12/2015 | Yu et al. |
| 2016/0035108 A1 | 2/2016 | Yu et al. |
| 2016/0073962 A1 | 3/2016 | Yu et al. |
| 2016/0091592 A1 | 3/2016 | Beall et al. |
| 2016/0166205 A1 | 6/2016 | Ernst et al. |
| 2016/0228005 A1 | 8/2016 | Bammer et al. |
| 2016/0249984 A1 | 9/2016 | Janssen |
| 2016/0256713 A1 | 9/2016 | Saunders et al. |
| 2016/0262663 A1 | 9/2016 | MacLaren et al. |
| 2016/0287080 A1 | 10/2016 | Olesen et al. |
| 2016/0310229 A1 | 10/2016 | Bammer et al. |
| 2016/0313432 A1 | 10/2016 | Feiweier et al. |
| 2017/0032538 A1 | 2/2017 | Ernst |

FOREIGN PATENT DOCUMENTS

| | | |
|---|---|---|
| DE | 102004024470 | 12/2005 |
| EP | 0904733 | 3/1991 |
| EP | 1354564 | 10/2003 |
| EP | 1524626 | 4/2005 |
| EP | 2023812 | 2/2009 |
| EP | 2515139 | 10/2012 |
| EP | 2747641 | 7/2014 |
| EP | 2948056 | 12/2015 |
| EP | 2950714 | 12/2015 |
| JP | 03023838 | 5/1991 |
| WO | WO 96/17258 | 6/1996 |
| WO | WO 99/38449 | 8/1999 |
| WO | WO 00/72039 | 11/2000 |
| WO | WO 03/003796 | 1/2003 |
| WO | WO 2004/023783 | 3/2004 |
| WO | WO 2005/077293 | 8/2005 |
| WO | WO 2007/025301 | 3/2007 |
| WO | WO 2007/085241 A1 | 8/2007 |
| WO | WO 2007/136745 | 11/2007 |
| WO | WO 2009/101566 | 8/2009 |
| WO | WO 2009/129457 A1 | 10/2009 |
| WO | WO 2011/047467 A1 | 4/2011 |
| WO | WO 2011/113441 A2 | 9/2011 |
| WO | WO 2012/046202 A1 | 4/2012 |

(56) References Cited

FOREIGN PATENT DOCUMENTS

| | | |
|---|---|---|
| WO | WO 2013/032933 | 3/2013 |
| WO | WO 2014/005178 | 1/2014 |
| WO | WO 2014/116868 | 7/2014 |
| WO | WO 2014/120734 | 8/2014 |
| WO | WO 2015/042138 | 3/2015 |
| WO | WO 2015/092593 | 6/2015 |
| WO | WO 2015/148391 | 10/2015 |
| WO | WO 2016/014718 | 1/2016 |

OTHER PUBLICATIONS

Abbott et al., "Environmental, life-style, and physical precursors of clinical Parkinson's disease: recent findings from the Honolulu-Asia Aging Study", J Neurol, 250 [suppl 3]:III/30-III/39 (2003).
Abbott et al., "Frequency of bowel movements and the future risk of Parkinson's disease", Neurology, vol. 57(3):456-462 (2001).
Abbott et al., "Mid-life adiposity and the future risk of Parkinson's disease", Neurology, vol. 59(7):1051-1057 (2002).
Abbott et al., "Walking and Dementia in Physically Capable Elderly Men", JAMA, vol. 292:1447-1453 (2004).
Adalsteinsson et al., "In vivo 2D J-resolved magnetic resonance spectroscopy of rat brain with a 3T clinical human scanner", vol. 22:381-386 (2004).
Aksoy et al., "Hybrid Prospective and Retrospective Head Motion Correction to Mitigate Cross-Calibration Errors", NIH Publication, Nov. 2012.
Aksoy et al., "Real-Time Optical Motion Correction for Diffusion Tensor Imaging, Magnetic Resonance in Medicine" (Mar. 22, 2011) 66 366-378.
Alusi et al., "A study of tremor in multiple sclerosis", Brain, vol. 124:720-730 (2001).
Andrews et al., "Prospective Motion Correction for Magnetic Resonance Spectroscopy Using Single Camera Retro-Grate Reflector Optical Tracking, Journal of Magnetic Resonance Imaging" (Feb. 2011) 33(2): 498-504.
Angeles et al., "The Online Solution of the Hand-Eye Problem", IEEE Transactions on Robotics and Automation, 16(6): 720-731 (Dec. 2000).
Armstrong et al., "A controls laboratory program with an accent on system identification", IEEE Control Systems Magazine, vol. 21(1):14-20 (2001).
Armstrong et al., "A Lyapunov stability proof for nonlinear-stiffness PD control", In Proc. Inter. Conf. on Robotics and Automation, IEEE, Minneapolis, pp. 945-950 (1996).
Armstrong et al., RGR-6D: Low-cost, high-accuracy measurement of 6-DOF Pose from a Single Image. Publication date unknown.
Armstrong et al., "A single state elasto-plastic friction model", In Workshop on Friction: Modelling, Dynamics & Control, PATO Eindhoven University of Technology, Eindhoven, NL, Invited Paper (2002).
Armstrong et al., "A survey of models, analysis tools and compensation methods for the control of machines with friction", Automatica, vol. 30(7):1083-1138 (1994).
Armstrong et al., "CRC Controls Handbook, chapter Friction Compensation", Boca Raton, CRC Press, Invited Paper (1995).
Armstrong et al., "Friction in servo machines: Analysis and control methods", Applied Mechanics Reviews, vol. 47(7):275-305, Invited Paper (1994).
Armstrong et al., "New results in NPID control: Tracking, integral control, friction compensation and experimental results", IEEE Trans. on Control Systems Technology, vol. 9(2):399-406 (2001).
Armstrong et al., "New results in NPID control: Tracking, integral control, friction compensation and experimental results", In Proc. of the 1999 Inter. Conf. on Robotics and Automation, IEEE, Detroit, pp. 837-842 (1999).
Armstrong et al., "Nonlinear PID control with partial state knowledge: A general method based on quadratic programming", In Proc. 2000 American Controls Conference, AACC, Chicago, pp. 774-778 (2000).
Armstrong et al., "Nonlinear PID control with partial state knowledge: damping without derivatives", Inter. Journal of Robotics Research, vol. 19(8):715-731, Invited Paper (2000).
Armstrong et al., "Optimal NPID stabilization of linear systems", Journal of Optimization Theory and Applications, vol. 124(2):307-322 (2005).
Armstrong et al., "Orientation Dependent Reflector", PTO US, ed. vol. 5, 936, 722 (2000).
Armstrong et al., "PID control in the presence of static friction, a comparison of algebraic and describing function analysis", Automatica, vol. 32(5):679-692 (1996).
Armstrong et al., "RGR-3D: Simple, cheap detection of 6-DOF pose for tele-operation, and robot programming and calibration", In Proc. 2002 Int. Conf. on Robotics and Automation, IEEE, Washington (May 2002).
Armstrong et al., "Stability of Nonlinear PD control", Applied Mathematics and Computer Science, vol. 7(2)101-120 Invited Paper (1997).
Armstrong et al., "Target tracking with a network of Doppler radars", IEEE Trans. on Aerospace and Electronic Systems, vol. 34(1):33-48 (1998).
Armstrong et al., "The explicit dynamic model and inertial parameters of the PUMA 560 arm", In Proc. 1986 Int. Conf. on Robotics and Automation, IEEE, San Francisco, pp. 510-518 (1986).
Armstrong et al., "The stability of nonlinear PID control with arbitrary partial-state knowledge", In Proc. 2002 Int. Conf. on Robotics and Automation, IEEE, Washington (2002).
Armstrong, B. "Friction: Experimental determination, modeling and compensation", In Proc. 1988 Int. Conf. on Robotics and Automation, IEEE, Philadelphia, pp. 1422-1427 (1988).
Armstrong, B., "A controls laboratory program with an accent on system identification", In Proc. 1997 American Controls Conference, AACC, Albuquerque, pp. 3166-3170 (1997).
Armstrong, B., "A controls laboratory program with an accent on system identification", In Proc. 1997 ASEE Annual Conference and Exposition, ASEE, Milwaukee (1997).
Armstrong, B., "A design project for a second course in controls", In Proc. 1997 ASEE Annual Conference and Exposition, ASEE, Milwaukee (1997).
Armstrong, B., "A single state elasto-plastic friction model", In Committee on Identification and Control of Complex systems (ICCoS) Seminar, Katholieke Universiteit Leuven, Leuven, Belgium, Invited Paper (2003).
Armstrong, B., "Control of machines with non-linear low-velocity friction: A dimensional analysis", In Experimental Robotics I, Hayward et al., eds., Heidelberg, Springer-Verlag, pp. 180-195, Invited Paper (1990).
Armstrong, B., "Dynamics for Robot Control: Friction Modeling and Ensuring Excitation During Parameter Identification", PhD thesis, Dept. of Electrical Engineering, Stanford University, Stanford Computer Science Memo STANCS-88-1205 (1988).
Armstrong, B., "Final report: State of the art in microwave position detection for mobile robots", Technical report, Dept. of Electrical Engineering and Computer Science, UWM (1999).
Armstrong, B., "FLC design for bounded separable functions with linear input-output relations as a special case", IEEE Trans. on Fuzzy Systems, vol. 4(1):72-79 (1995).
Armstrong, B., "FLC design for bounded separable functions with linear input-output relations as a special case", In Proc. 1997 American Controls Conference, AACC, Albuquerque, pp. 2868-2872 (1997).
Armstrong, B., "Nonlinear PD control with incomplete state knowledge: damping without derivatives", In Proc. of SYROCO '97, IFAC, Nantes, France, pp. 73-78 (1997).
Armstrong, B., "On finding exciting trajectories for identification experiments involving systems with non-linear dynamics", In Proc. 1987 Int. Conf. on Robotics and Automation, IEEE, Raleigh, pp. 1131-1139 (1987).
Armstrong, B., "On finding exciting trajectories for identification experiments involving systems with nonlinear dynamics", Inter. J. of Robotics Research, vol. 8(6):24-48 (1989).
Armstrong, B., "Robustness of NPD control (preliminary results)", In Proc. of IROS '97, IEEE, Grenoble, France, pp. 478-483 (1997).

(56) References Cited

OTHER PUBLICATIONS

Armstrong, B.S.R., "Analysis of Commercial Pose Sensing Technologies", UWM (2004).
Armstrong-Helouvry, B., "Frictional lag and stick-slip", In Proc. 1992 Int. Cant on Robotics and Automation, IEEE, Nice, pp. 1448-1453 (1992).
Armstrong-Helouvry, B., "The imperfect solutions homework format", In Proc. of the 1992 American Society for Engineering Education North Midwest Section Meeting, ASEE, Milwaukee, pp. 9.3.1-9.3.7. (1992).
Armstrong-Helouvry, B., Control of Machines with Friction, Norwell Massachusetts, Kluwer Academic Publishers (1991).
Armstronq-Helouvry et al., "Friction modeling for controls", In Proc. 1993 ACC, AACC, San Francisco, pp. 1905-1909 (1993).
Armstronq-Helouvry, B., "A design for homework that provides rapid feedback and efficient grading", IEEE Trans. on Education, vol. 38(3):258-260 (1995).
Armstronq-Helouvry, B., "A perturbation analysis of stick-slip." In Friction-Induced Vibration, Chatter, Squeal and Chaos, Proc. ASME Winter Annual Meeting, ASME, Anaheim, vol. DE—vol. 49:41-48 (1992).
Armstronq-Helouvry, B., "Challenges to systematically engineered friction compensation", In Proc. of the IFAC Workshop on Motion Control, IFAC, Munich, pp. 21-30, Plenary Address (1995).
Armstronq-Helouvry, B., "Dynamic friction in the control of robots", In Proc. 1994 Int. Conf. on Robotics and Automation, IEEE, San Diego, pp. 1202-1207 (1994).
Armstronq-Helouvry, B., "Elucidating negative feedback during the introduction to operational amplifiers", In Proc. of the 1992 American Society for Engineering Education North Midwest Section Meeting, ASEE: Milwaukee, pp. 14.2.1 14.2.8 (1992).
Armstronq-Helouvry, B., "Frictional memory in servo control", In Proc. 1994 American Control Conference, AACC, Baltimore, pp. 1786-1790 (1994).
Armstronq-Helouvry, B., "Stick slip and control in low-speed motion", IEEE Trans. on Automatic Control, vol. 38(10):1483-1496 (1993).
Armstronq-Helouvry, B., An Introduction to Circuits, Laboratory Manual, New York, Macmillan Publishing Company (1994).
Armstronq-Hetouvry et al., "Elucidating negative feedback during the introduction to operational amplifiers", Inter. J. of Engineering Education, vol. 9(3):231-237 (1993).
Armstronq-Hetouvry et al., "PID control in the presence of static friction: Exact and describing function analysis", In Proc. 1994 American Control Conference, AACC, Baltimore, pp. 597-601 (1994).
Arnold et al., "Proton MR spectroscopy in multiple sclerosis", Neuroimaging Clinics of North America, vol. 10(4):789-798 (2000).
Arria et al., "Methamphetamine and Other Substance Use During Pregnancy: Preliminary Estimates from the Infant Development, Environment, and Lifestyle (IDEAL) Study", Maternal and Child Health Journal, Under revision.
Atkinson, K.B., Close Range Photogrammetry and Machine Vision, Whittles Publishing, London (1996).
Bai et al., "Kinematic calibration and pose measurement of a medical parallel manipulator by optical position sensors", Journal of Robotic Systems, vol. 20(4):201-209 (2003).
Bandettini, Peter A., et al., "Processing Strategies for Time-Course Data Sets in Functional MRI of the Human Breain", Magnetic Resonance in Medicine 30: 161-173 (1993).
Barmet et al, Spatiotemporal Magnetic Field Monitoring for MR, Magnetic Resonance in Medicine (Feb. 1, 2008) 60: 187-197.
Bartels, LW, et al., "Endovascular interventional magnetic resonance imaging", Physics in Medicine and Biology 48: R37-R64 (2003).
Beach et al., "Feasibility of Stero-Infrared Tracking to Monitor Patient Motion During Cardiac SPECT Imaging", IEEE Transactions on Nuclear Science, vol. 51(5):2693-2698 (2004).
Binder et al., "Functional MRI demonstrates left medial temporal lobe activation during verbal episodic memory encoding", 2nd Intl. Conf. on Functional Mapping of the Human Brain, Neurolmage., vol. 3(3):S530 (1996).
Binder et al., "Human Brain Language Areas Identified by Functional Magnetic Resonance Imaging", J. Neurosci, vol. 17:353-362 (1997).
Block et al., "Consistent fat suppression with compensated spectral-spatial pulses", Magnetic Resonance in Medicine, vol. 38(2):198-206 (1997).
Bolan et al., "Measurement and correction of respiration-induced B0 variations in breast 1H MRS at 4 Tesla", Magnetic Resonance in Medicine, vol. 52(6):1239-1245 (2004).
Bottomley, Paul A., "Spatial localization in NMR spectroscopy in vivo", Annals of the New York Academy of Sciences, vol. 508:333-348 (1987).
Bouchet et al., "Calibration of three-dimensional ultrasound images for image-guided radiation therapy", Physics in Medicine and Biology, vol. 46(2):559-577 (2001).
Brown et al., "NMR chemical shift imaging in three dimensions", Proceedings of the National Academy of Science USA, vol. 79:3523-3526 (1982).
Brown et al., Introduction to Random Signals and Applied Kalman Filtering, John Wiley and Sons, New York, Third Edition (1997).
Buhler et al., "An Accurate Method for Correction of Head Movement in PET", IEEE Transactions on Medical Imaging, vol. 23(8):1176-1185 (2004).
Caparelli et al., "Iterative phase correction to minimize signal loss in EPI", ISMRM Workshop on Methods for Quantitative Diffusion MRI of Human Brain, Lake Louise, Canada (2005).
Caparelli et al., "k-Space based summary motion detection for functional magnetic resonance imaging", Neuroimage, vol. 20(2):1411-1418 (2003).
Carpenter, J.R., "A preliminary investigation of decentralized control for satellite formations", IEEE Aerospace Conference Proceedings, Mar. 18-25, 2000, vol. 7 (2000).
Carranza-Herrezuelo et al, "Motion estimation of tagged cardiac magnetric resonance images using variational techniques" Elsevier, Computerized Medical Imaging and Graphics 34 (2010), pp. 514-522.
Cerveri et al., "Robust recovery of human motion from video using Kalman filters and virtual humans", Human Movement Science, vol. 22(2):377-404 (2003).
Chang et al,. "Perfusion MRI detects rCBF abnormalities in early stages of HIV-cognitive motor complex", Neurology, vol. 54:389-396 (2000).
Chang et al., "Adaptation of the Attention Network in Human Immunodeficiency Virus Brain Injury", Annals of Neurology, vol. 56:259-272 (2004).
Chang et al., "Additive Effects of HIV and Chronic Methamphetamine Use on Brain Metabolite Abnormalities", American Journal of Psychiatry, vol. 162(2):1-9 (2005).
Chang et al., "Antiretroviral Treatment Alters Relationship between MCP-1 and Neurometabolites in HIV Patients", Antiviral Therapy, vol. 9(3):431-440 (2004).
Chang et al., "Antiretroviral Treatment Alters the Relationship between Chemoattractant Protein and Neurometabolites in HIV", Antiviral Therapy, vol. 9(3):431-440 (2004).
Chang et al., "Cerebral metabolite abnormalities correlate with clinical severity of HIV-1 cognitive motor complex", Neurology, vol. 52:100-108 (1999).
Chang et al., "Combined and independent effects of chronic marijuana use and HIV on brain metabolites", Journal of NeuroImmune Pharmacology (in press).
Chang et al., "Correlation of cerebral metabolite abnormalities with trinucleotide repeats in myotonic dystrophy", Archives of Neurology, vol. 55:305-311 (1998).
Chang et al., "Decreased subcortical brain volumes and neuropsychological deficits in children exposed to methamphetamine in utero", Psychiatry Res: neuroimaging, vol. 132:95-106 (2004).

(56) References Cited

OTHER PUBLICATIONS

Chang et al., "Effect of Ecstasy [3,4 Methylenedioxy-methamphetamine (MDMA)] on Cerebral Blood Flow: A Co registered SPECT and MRI Study", Psychiatry Res: Neuroimaging, vol. 98:15-28 (2000).
Chang et al., "Enlarged Striatum in Abstinent Methamphetamine Abusers: A Possible Compensatory Response", Biological Psychiatry, vol. 57:967-974 (2005).
Chang et al., "Gender effects on persistent cerebral metabolite changes in the frontal lobes of abstinent cocaine users", American Journal of Psychiatry, vol. 156:716-722 (1999).
Chang et al., "Highly Active Antiretroviral Therapy Reverses Brain Metabolite Abnormalities in Mild HIV-1 Dementia", Neurology, vol. 53(4):782-789 (1999).
Chang et al., "Highly active antiretroviral therapy reverses brain metabolite abnormalities in mild HIV-dementia", Neurology, vol. 52:783-789 (1999).
Chang et al., "In vivo proton magnetic resonance spectroscopy of the normal aging human brain", Life Sci, vol. 58:2049-2056 (1996).
Chang et al., "Magnetic resonance spectroscopy studies of GABA in neuropsychiatric disorders", J Clin Psychiatry, vol. 64 Suppl 3:7-14. Review (2003).
Chang et al., "Marijuana use is associated with a reorganized visual attention network and cerebellar hypoactivity", Brain (in revision).
Chang et al., "Metabolite abnormalities in progressive multifocal leukoencephalopathy: A proton magnetic resonance spectroscopy study", Neurology, vol. 48(4):836-844 (1997).
Chang et al., "Neural correlates of attention and working memory deficits in HIV patients", Neurology, vol. 57:1001-1007 (2001).
Chang et al., "Perfusion MRI abnormalities and computerized cognitive deficits in abstinent methamphetamine users", Psychiatry Res: Neuroimaging, vol. 114:65-79 (2002).
Chang et al., "Perfusion MRI Abnormalities and Computerized Cognitive Deficits in Abstinent Methamphetamine Users", Psychiatry Res:Neuroimaging, vol. 114:65-79 (2002).
Chang et al., "Perfusion MRI and computerized cognitive test abnormalities in abstinent methamphetamine users", Psychiatry Res., vol. 114(2):65-79 (2002).
Chang et al., "Perfusion MRI Detects rCBF Abnormalities in Early Stages of HIV-Cognitive Motor Complex", Neurology, vol. 54:389-396 (2000).
Chang et al., "Perfusion MRI Detects rCBF Abnormalities in Mild HIV Dementia", Neurology, vol. 54(2): 389-396 (2000).
Chang et al., "Persistent Brain Abnormalities in Antiretroviral-Naïve HIV Patients 3 months after HAART", Antivi. Ther., vol. 8:17-26 (2003).
Chang et al., "Proton magnetic resonance spectroscopy and diffusion weighed MRI in focal brain lesions in AIDS", Neuroimaging in AIDS II, Neuroimaging Clinics of North America, vol. 7(3):409-429 (1997).
Chang et al., "Proton Magnetic Resonance Spectroscopy of Brain Masses in AIDS", Radiology, vol. 197:525-531 (1995).
Chang et al., "Relationships among cerebral metabolites, cognitive function and viral loads in antiretroviral-Naïve HIV patients", NeuroImage, vol. 17:1638-1648 (2002).
Chang et al., "Smaller Subcortical Volumes and Cognitive Deficits in Children with Prenatal Methamphetamine Exposure", Psychiatry Research:Neuroimaging, vol. 132:95-106 (2004).
Chang et al., for the HIV MRS Consortium, "A Multicenter In Vivo proton MRS study of HIV-associated brain injury and the effects of aging", Neuroimage, vol. 23(4):1336-1347 (2004).
Chang L., "In vivo Magnetic Resonance Spectroscopy in HIV and HIV-related brain diseases", Reviews in Neurosciences, vol. 6(4):365-378 (1995).
Chen et al. "NYMPH: A Multiprocessor for Manipulation Applications", Int. Conf. on Robotics and Automation, IEEE, San Francisco (1986).
Chen et al., "A multiprocessor for manipulation applications", In Proc. 1986 Int. Conf. on Robotics and Automation, IEEE, San Francisco, pp. 1731-1736 (1986).
Chen et al., "Satyr and the nymph: Software archetypes for real time systems", In Proc. of the ACM-IEEE Fall Joint Computer Conference, ACM, Dallas, Invited Paper (1986).
Cho et al., "A lesion of the anterior thalamus producing dystonic tremor of the hand", Arch Neurol, vol. 57:1353-1355 (2000).
Chou, Jack C. K., et al., "Finding the Position and Orientation of a Sensor on a Robot Manipulator Using Quaternions", The International Journal of Robotics Research, 10(3): 240-254 (Jun. 1991).
Chung et al., "Control of Respiration and Bioenergetics during Muscle Contraction", Am J. Physiol. Cell Physiol., vol. 288:C730-C738 (2005).
Clark et al., "A case of a methadone-induced movement disorder", Clin J Pain, vol. 17:375-377 (2000).
Cloak et al., "Increased Frontal White Matter Diffusion is Associated with Glial Metabolites and Psychomotor Slowing in HIV", Journal of Neuroimmunology, vol. 157(1-2):147-152 (2004).
Cloak et al., "Methamphetamine and AIDS: 1HMRS studies in a feline model of human disease", J Neuroimmunology, vol. 147:16-20 (2004).
Cofaru et al "Improved Newton-Raphson digital image correlation method for full-field displacement and strain calculation," Department of Materials Science and Engineering, Ghent University St-Pietersnieuwstraat, Nov. 20, 2010.
Corke et al., "A meta-study of puma 560 dynamics", Robotica, vol. 13(3):253-258 (1995).
Corke et al., "A search for consensus among model parameters reported for the PUMA 560 robot", In Proc. 1994 Int. Conf. on Robotics and Automation, IEEE, San Diego, pp. 1608-1613 (1994).
Craig et al., "Severe gamma-hydroxybutyrate withdrawal: a case report and literature review", J Emerg Med, vol. 18:65-70 (2000).
Crassidis et al., "Predictive Filtering for Attitude Estimation Without Rate Sensors", AIAA Journal of Guidance, Control, and Dynamics, vol. 20(3):522-527 (1997).
Cunningham et al., "Design of Symmetric-Sweep Spectral-Spatial RF pulses for spectral editing", Magn. Reson. Med., vol. 52:147-153 (2004).
Daniilidis et al., "Active intrinsic calibration using vanishing points", Pattern Recognition Letters, vol. 17(11):1179-1189 (1996).
De Coene et al., "MR of the brain using fluid-attenuated inversion recovery(FLAIR) pulse sequences", AJNR, vol. 13:1555-1564 (1992).
Derauf et al., "Agreement between maternal reported ethanol and tobacco use during pregnancy and meconium assays for fatty acid ethyl esters and cotinine", Am J Epidemiol, vol. 158(7):705-709 (2003).
Derauf et al., "The prevalence of methamphetamine and other drug use during pregnancy in Hawaii", Journal of Drug Issues, vol. 3(4):1001-1016 (2003).
Deuschl et al., "The pathophysiology of essential tremor", Neurology, vol. 54:S14-20 (2000).
Dick et al., "Neurological deficits in solvent-exposed painters: a syndrome including impaired colour vision, cognitive defects, tremor and loss of vibration sensation", Qjm, vol. 93:655-61 (2000).
Dold C., [personal communication] (2005).
Dold et al, eds., "Prospective Head Motion Compensation by Updating the Gradients of the MRT", Perspectives in Image-Guided Surgery, Proc. of Medical Robotics, Navigation and Visualization, ed. M. Thorsten, World Scientific, Singapore, pp. 160-167 (2004).
Dold et al. "The Compensation of Head Motion Artifacts Using an Infrared Tracking System and a New Algorithm for fMRI", Medicine Meets Virtual Reality, vol. 12 (2004).
Dold et al., "Updating of MRI Gradients Using a Infrared Tracking System to Compensate Motion Artifacts", ISMRM, Kyoto, vol. 12 (2004).
Dold, C., [personal communication] (2005).
Duggan et al., "The Essential Role of Research in Community Pediatrics", Pediatrics, vol. 115(4):1195-1201 (2005).
Dupont et al., "Compensation techniques for servos with friction", In Proc. 1993 ACC, AACC, San Francisco pp. 1910-1914 (1993).
Dupont et al., "Elastic-plastic friction model: Contact compliance and stiction", In Proc. 2000 American Controls Conference, AACC, Chicago, pp. 1072-1077 (2000).

(56) References Cited

OTHER PUBLICATIONS

Dupont et al., "Single state elasto-plastic friction models", IEEE Trans. on Automatic Control, vol. 47(5):787-792 (2002).
Eakin et al., Sun protection policy in elementary schools in Hawaii. Preventing Chronic Disease [serial online] Jul. 2004 Available from: URL: http://www.cdc.gov/pcdIissues/2004/jull030013.htm.
Eidson et al., "Sharing a Common Sense of Time", IEEE Instrumentation & Measurement Magazine, vol. 6:26-32 (2003).
Elble R.J., "Origins of tremor", Lancet, vol. 355:1113-1114 (2000).
Elble, R., "Essential Tremor", S G, ed. Medlink Neurology, MedLink Corporation, San Diego, vol. 2006. www.medlink.com (2005).
Elble, R.J., "Diagnostic criteria for essential tremor and differential diagnosis", Neurology, vol. 54:S2-6 (2000).
Ellingson et al., "Ballistocardiogram artifact reduction in the simultaneous acquisition of auditory ERPS and fMRI", Neuroimage, vol. 22:1534-1542 (2004).
Ellingson et al., "FMRI-Constrained dipole modeling of a passive auditory oddball response", J. Cog. Neurosci. Suppl., pp. 220-221 (2003).
Ellingson et al., "Reduction of ballistocardiogram artifact in the simultaneous acquisition of auditory event-related potentials and functional magnetic resonance images", Proc. 2nd Joint BMES/EMBS Conf., pp. 159-160 (2002).
Ernst et al., "A Novel Phase and Frequency Navigator for Proton Magnetic Resonance Spectroscopy Using Water-Suppression Cycling, Magnetic Resonance in Medicine" (Jan. 2011) 65(1): 13-7.
Ernst et al., "Abnormal Brain Activation on Functional MRI in Cognitively Asymptomatic HIV Patients", Neurology, vol. 59:1343-1349 (2002).
Ernst et al., "Absolute quantitation of water and metabolites in the human brain; Part I: compartments and water", J Magn Res, vol. B102:1-8 (1993).
Ernst et al., "Cerebral MRS in infant with suspected Reye's Syndrome", The Lancet, vol. 340:486 (1992).
Ernst et al., "Cerebral perfusion abnormalities in abstinent cocaine abusers: Perfusion MRI and SPECT", Psychiatry Res, vol. 99(2):63-74 (2000).
Ernst et al., "Cerebral toxoplasmosis and lymphoma in AIDS: Perfusion MR imaging experience in 13 patients", Radiology, vol. 208(3):663-669 (1998).
Ernst et al., "Changes in Cerebral Metabolism are Detected Prior to Perfusion Changes in Early HIV-CMC: A Coregistered 1H MRS and SPECT Study", J Magn Reson Imaging, vol. 12:859-865 (2000).
Ernst et al., "Correlation of regional cerebral blood flow from perfusion MRI and SPECT in normal subjects", Magnetic Resonance Imaging, vol. 17(3):349-354 (1999).
Ernst et al., "Coupling effects in volume selective 1H spectroscopy of major brain metabolites", Magn Res Med, vol. 21:82-96 (1991).
Ernst et al., "Direct 31P imaging in human limb and brain", J Comp Assist Tomogr, vol. 17:673-680 (1993).
Ernst et al., "Double-volume 1H spectroscopy with interleaved acquisitions using tilted gradients", Magn Res Med, vol. 20:27-35 (1991).
Ernst et al., "Effect of Aging on Brain Metabolism in Antiretroviral-Naïve HIV Patients", AIDS, vol. 18(S1):S61-S68 (2004).
Ernst et al., "Elimination of Artifacts in Short Echo Time 1H MR Spectroscopy of the Frontal Lobe", Magnetic Resonance in Medicine, vol. 36:462-468 (1996).
Ernst et al., "Evidence for long-term neurotoxicity associated with methamphetamine abuse: A 1H MRS Study", Neurology, vol. 54:1344-1349 (2000).
Ernst et al., "Fronto-temporal dementia and early Alzheimer Disease: Differentiation with frontal lobe 1H MR spectroscopy", Radiology, vol. 203:829-836 (1997).
Ernst et al., "Improved water suppression for localized in vivo 1H spectroscopy", J Magn Res, vol. B106:181-186 (1995).
Ernst et al., "Increased glial markers predict increased working memory network activation in HIV patients", Neurolmage, vol. 19(4):1686-1693 (2003).
Ernst et al., "M, Fronto-Temporal Dementia and Early Alzheimer Disease: Differentiation with Frontal Lobe 1H MR Spectroscopy", Radiology, vol. 203:829-836 (1997).
Ernst et al., "Observation of a fast response in functional MR", Magn Res Med, vol. 31:146-149 (1994).
Ernst et al., "Physiologic MRI of a tumefactive multiple sclerosis lesion", Neurology, vol. 51:1486-1488 (1998).
Ernst et al., "Progressive multifocal leukoencephalopathy and HIV-associated white matter lesions in AIDS: Magnetization transfer MR imaging", Radiology, vol. 210:539-543 (1999).
Ernst et al., "Simultaneous Correction for Interscan Patient Motion and Geometric Distortions in Echo Planar Imaging", Magn. Reson. Med., vol. 42(1):201-205 (1999).
Ernst et al., "The Effects of Tamoxifen and Estrogen on Brain Metabolism in Elderly Women", J Natl Cancer Inst, vol. 94(8):592-597 (2002).
Ernst et al., "The importance of the voxel size in clinical spectroscopy of the human brain", NMR Biomed, vol. 2:216 224 (1989).
Eviatar et al., "Real time head motion correction for functional MRI", In: Proceedings of the International Society for Magnetic Resonance in Medicine (1999) 269.
Felblinger et al., "Effects of physiologic motion of the human brain upon quantitative 1H-MRS: analysis and correction by retro-gating", NMR in Biomedicine, vol. 11(3):107-114 (1998).
Felmlee et al., "Adaptive motion compensation in MRI: accuracy of motion measurement", Magnetic Resonance in Medicine, vol. 18(1):207-213 (1991).
Foley et al., "Driving cessation in older men with incident dementia", J Am Geriatr Soc, vol. 48:928-930 (2000).
Forbes, Kristen P. N., et al., "Propeller MRI: Clinical Testing of a Novel Technique for Quantification and Compensation of Head Motion", Journal of Magnetic Resonance Imaging 14: 215-222 (2001).
Frahm et al., "Localized high-resolution proton NMR spectroscopy using stimulated echoes: initial applications to human brain in vivo", Magnetic Resonance in Medicine, vol. 9:79-93 (1989).
Freeman et al., "Proton Detected 15N NMR Spectroscopy and Imaging", J. Mag. Res. Series B, vol. 102:183 (1993).
Friston et al., "Movement-related effects in fMRI time-series", Magnetic Resonance in Medicine, vol. 35(3):346-355 (1996).
Friston et al., "Spatial realignment and normalization of images", Human Brain Mapping, vol. 2:165-189 (1995).
Frost et al., "Functional magnetic resonance imaging of phonological language processing", 2nd Intl. Conf. on Functional Mapping of the Human Brain, Neurolmage, vol. 3(3):S437 (1996).
Fukuda et al., "The Role of Community-Based Training in Pediatric Medical Education at JABSOM", Hawaii Med. J., vol. 62(9):198-199 (2003).
Fulton et al., "Correction for Head Movements in Positron Emission Tomography Using an Optical Motion-Tracking System", IEEE Transactions on Nuclear Science, vol. 49(1):116-123 (Feb. 2002).
Gantmacher, F.R, Theory of Matrices. New York, Chelsea (1960).
Gholson et al., "Maneuvering target tracking using adaptive state estimation", IEEE Trans. Aerospace Electron. Syst., AES-13(May):310-317 (1977).
Glover, Gary H., et al., "Self-Navigated Spiral fMRI: Interleaved versus Single-shot", Magnetic Resonance in Medicine 39: 361-368 (1998).
Gray et al., "Structure and Electron Transfer Reaction of Blue Copper Protein", Bioinorganic Chemistry II vol. 162, Advance in Chemistry Series, Raymond, K., editor, ACS, pp. 145-155 (1977).
Guerrero et al., "Early Detection and Intervention for Common Causes of Psychosocial Morbidity and Mortality in Children and Adolescents", Pediatr. Ann., vol. 32(6):408-412 (2003).
Gumus et al., "Elimination of DWI signal dropouts using blipped gradients for dynamic restoration of gradient moment", ISMRM 20th Annual Meeting & Exhibition, May 7, 2012.
Gumus et al., "Elimination of DWI signal dropouts using blipped gradients for dynamic restoration of gradient moment", p. 2114.

(56) References Cited

OTHER PUBLICATIONS

Gutierrez, J.A., "Millipixel scale landmark location in images: the optics, the imaging system, and the Cramer-Rao bound on performance", vol. Ph.D., University of Wisconsin—Milwaukee (2005).
Hancu et al., "1H MR spectroscopy using TE-Averaged PRESS", Mag. Reson. Med. (2005).
Hand, Chris, "A survey of 3D Interaction Techniques", Computer Graphics Forum, vol. 16(5):269-281 (1997).
Hanson et al., "Tremors", In Gilman S., ed. vol. 2005, MedLink Corporation. MedLink Neurology, San Diego, www.medlink.com (2005).
Hardesty et al., Increased risk of head tremor in women with essential tremor: longitudinal data from the Rochester Epidemiology Project. Mov Disord, vol. 19:529-533 (2004).
Havlik et al., APOE-e4 predicts incident AD in Japanese-American men: the Honolulu-Asia Aging Study, Neurology, vol. 54:1526-1529 (2000).
Hayward et al., "A new computational model of friction applied to haptic rendering", In Corke et al., editors, In Preprints of ISER'99, Experimental Robotics VI, vol. 250 of Lecture Notes in Control and Information Sciences, pp. 403-412, Springer-Verlag, ISBN: 1 85233 210 7 (2000).
Helms et al., "Restoration of motion-related signal loss and line-shape deterioration of proton MR spectra using the residual water as intrinsic reference", Magnetic Resonance in Medicine, vol. 46(2):395-400 (2001).
Hennig et al., "Detection of Brain Activation Using Oxigenation Sensitive Functional Spectroscopy", Mag Reson Med, vol. 31:85-90 (1994).
Hennig et al., "Direct absolute quantification of metabolites in the human brain with in vivo localized proton spectroscopy", NMR Biomed, vol. 5:193-199 (1992).
Hennig et al., Functional magnetic resonance imaging: a review of methodological aspects and clinical applications. J Magn Reson Imaging., vol. 18(1):1-15 (2003).
Hennig et al., "Functional Spectroscopy of Brain Activation Following a Single Light Pulse: Examination of the Mechanism of the Fast Initial Response", Int. J. of Imaging Systems and Technology, vol. 6:203-208 (1995).
Hennig et al., "Funktionelle Spektroskopie: Grenzen and Moglichkeiten einer neuen Methode zur Untersuchung der Hirnaktivierung mit Kernspintomographie", RoFo, vol. 161(1):51-57 (1994).
Hennig et al., "Grundlagen der funktionellen Magnetresonanztomographie", Radiologe, vol. 35:221-227 (1995).
Hennig et al., "Hyperechoes", Magnetic Resonance in Medicine, vol. 46:6-12 (2001).
Hennig et al., "Improved Sensitivity to Overlapping Multiplet Signals in in vivo Proton Spectroscopy Using a Multiecho Volume Selective (CPRESS-) Experiment", Magn. Reson. Med., vol. 37(6):816-820 (1997).
Hennig et al., "Is there a different type of MR-contrast in the early phase of functional activation?", Advances in Experimental Medicine and Biology, vol. 413:35-42 (1997).
Hennig et al., "Optimization of signal behavior in the transition to driven equilibrium in steady-state free precession sequences", Magn. Reson. Med., vol. 48(5):801-809 (2002).
Hennig et al., "RARE imaging: a fast imaging method for clinical MR", Magnetic Resonance Medicine, vol. 3:823-833 (1988).
Heppe, L.A., "Fabrication study of retrograte reflector targets", Electrical Engineering, vol. M.Sc., University of Wisconsin—Milwaukee (2002).
Herbst et al., "Preventing Signal Dropouts in DWI Using Continous Prospective Motion Correction", Proc. Intl. Soc. Mag. Reson. Med. 19 (May 2011) 170.
Herbst et al., "Prospective Motion Correction With Continuous Gradient Updates in Diffusion Weighted Imaging, Magnetic Resonance in Medicine" (2012) 67:326-338.
Hoff et al., "Analysis of Head Pose Accuracy in Augmented Reality", IEEE Transactions on Visualization and Computer Graphics 6, No. 4 (Oct.-Dec. 2000): 319-334.
Horn, Berthold K. P., "Closed-form solution of absolute orientation using unit quaternions", Journal of the Optical Society of America, vol. 4, p. 629-642 (Apr. 1987).
Hurd et al., "Measurement of Brain Glutamate using TE-Averaged PRESS at 3T", Magn. Reson. Med., vol. 51:435 440 (2004).
Hurd et al., "Proton Spectroscopy Without Water Suppression: The Oversampled J-Resolved Experiment", Magn. Reson Med, vol. 40:343-347 (1998).
Institute of Medicine, To Err is Human: Building a Safer Health System, National Academy Press, Washington, DC, 27 (1999).
International Preliminary Report on Patentability for Application No. PCT/US2015/022041, dated Oct. 6, 2016, in 8 pages.
International Preliminary Report on Patentability for Application No. PCT/US2007/011899, dated Jun. 8, 2008, in 13 pages.
International Search Report and Written Opinion for Application No. PCT/US2007/011899, dated Nov. 14, 2007.
International Search Report and Written Opinion for Application No. PCT/US2014/012806, dated May 15, 2014, in 15 pages.
International Search Report and Written Opinion for Application No. PCT/US2015/041615, dated Oct. 29, 2015, in 13 pages.
International Search Report and Written Opinion for Application No. PCT/US2014/013546, dated May 26, 2014, in 14 pages.
International Preliminary Report on Patentability for Application No. PCT/US2014/013546, dated Aug. 4, 2015, in 9 pages.
International Search Report and Written Opinion for Application No. PCT/US2015/022041, dated Jun. 29, 2015, in 9 pages.
Issakhanian et al., "HIV-2 Infection with Cerebral Toxoplasmosis and Lymphomatoid Granulomatosis", J Neuroimaging, vol. 11(2): 212-216 (2001).
Itti et al., "High-resolution 3D correction for partial volume effects in functional neuroimaging", Human Brain Mapping, vol. 5:379-388 (1997).
Itti et al., "Robust multimodality registration for brain mapping", Human Brain Mapping, vol. 5:3-17 (1997).
Janz et al., "Comparison of the hemodynamic response to different Visual stimuli in single event and block stimulation fMRI-experiments", J. Magn. Res. Imaging, vol. 12(5):708-714 (2000).
Janz et al., "Decoupling of the short-term hemodynamic response and the blood oxygen concentration", NMR in Biomed, vol. 14(7):402-407 (2001).
Janz et al., "Time-resolved measurements of brain activation after a short visual stimulus: New results on the physiological mechanisms of the cortical response", NMR Biomed, vol. 10:222-229 (1997).
Jaradeh et al. "Sweat output in QSART: Effect of measurement time and waveform configuration", Clinical Autonomic Research, vol. 12:310-312 (2002).
Jaradeh et al., "Autonomic nervous system evaluation of patients with vasomotor rhinitis", Laryngoscope. vol. 110:1828-1831 (2000).
Jaradeh et al., "Evaluation of the autonomic nervous system", Phys. Med. Rehabil. Clin. N. Am. vol. 14:287-305 (2003).
Jaradeh et al., "Progressive polyradiculoneuropathy in diabetes: correlation of variables and clinical outcome after immunotherapy", J. Neur. Neurosurg. Psychiatry, vol. 67:607-612 (1999).
Josefsson et al. "A flexible high-precision video system for digital recording of motor acts through lightweight reflect markers", Computer Methods and Programs in Biomedicine, vol. 49:111-129 (1996).
Jovicich et al., "Brain Areas Specific for Attentional Load in a Motion Tracking Task", J Cognitive Neuroscience, vol. 13:1048-1058 (2001).
Jue et al., Myoglobin and O2 consumption in exercising in human Gastrocnemius muscle; Adv Exp Med Biol, vol. 471:289-294 (1999).
Jue et al., "O2 and respiration in exercising human muscle: The regulation of oxidative phosphorylation in vivo", Adv Exp Med Biol, vol. 475:769-783 (2000).

(56) References Cited

OTHER PUBLICATIONS

Karonde, R.M., "Position location for mobile robotics using Retro Grate Reflectors", Computer Science, vol. M.Sc., University of Wisconsin—Milwaukee (2000).
Katsuki, et al., "Design of an Artificial Mark to Determine 3D Pose by Monocular Vision", 2003 IEEE International Conference on Robotics and Automation (Cat. No. 03CH37422), Sep. 14-19, 2003, pp. 995-1000 vol. 1.
Katz-Brull et al., "Frame-by-frame PRESS 1H-MRS of the brain at 3 T: the effects of physiological motion", Magnetic Resonance in Medicine, vol. 51(1):184-187 (2004).
Keller et al., "Altered age-associated brain metabolite and cognitive development in HIV-infected children", Neurology, vol. 62:1810-1817 (2004).
Keller et al., "Altered Neurometabolite Development in HIV-infected Children: Correlation with Neuropsychological Tests", Neurology, vol. 62:1810-1817 (2004).
Keller et al., "Cerebral Metabolites in HIV-infected Children Followed for Ten Months with 1H-MRS", Neurology (in press).
Kiebel et al., "MRI and PET coregistration—a cross validation of statistical parametric mapping and automated image registration", Neuroimage 5(4):271-279 (1997).
Kiruluta et al., "Predictive Head Movement Tracking Using a Kalman Filter", IEEE Trans. on Systems, Man, and Cybernetics—Part B: Cybernetics, 27(2):326-331 (Apr. 1997).
Kodali et al., "Thermal effects of laser stapedectomy on the inner ear—an animal model", Laryngoscope, vol. 107:1445-1450 (1997).
Kreis et al., "Absolute quantitation of water and metabolites in the human brain; Part II: metabolite concentrations", J Magn Res, vol. B102:9-19 (1993).
Kreis et al., "Development of the human brain: in vivo quantification of metabolite and water content with proton magnetic resonance spectroscopy", Magn Res Med, vol. 3:424-437 (1993).
Krystkowiak et al., "Thalamic tremor: correlations with three-dimensional magnetic resonance imaging data and pathophysiological mechanisms", Mov Disord, vol. 15:911-918 (2000).
Launer et al., "Mid-life blood pressure and dementia: the Honolulu-Asia Aging Study", Neurobiol Aging, vol. 21:49-55 (2000).
Lee et al., "A multi-center 1H MRS study of the AIDS dementia complex: Validation and preliminary analysis", J Magn Reson Imaging, vol. 17(6):625-633 (2003).
Lee et al., "Preventive health counseling for paediatric residents", Med. Educ., vol. 36(11):1107-1108 (2002).
Lee et al., "Smoking Cessation Counseling Training for Pediatric Residents in the Continuity Clinic Setting", Ambulatory Pediatrics, vol. 4:289-294 (2004).
Lerner, "Motion correction in fmri images", Technion-Israel Institute of Technology, Faculty of Computer Science ( Feb. 2006).
Lester et al., "Prenatal Exposure to Methamphetamine and Child Development", NIDA Community Epidemiology Work Group: Proceedings of the Community Epidemiology Work Group, vol. II (2005).
Liebenthal et al., "Simultaneous ERP and FMRI of the auditory cortex in a passive oddball paradigm", Neuroimage, vol. 19:1395-1404 (2003).
Liebenthal et al., "Simultaneous ERP/fMRI recordings of the auditory mismatch negativity to frequency deviants", NeuroImage. vol. 14:S680 (2002).
Lin et al., "A Single Strand Confirmation Polymorphism Study of CD40 Ligand. Efficient Mutation Analysis and Carrier Detection for X-Linked Hyper IgM Syndrome", J. Clin. Investigation, vol. 97:196-201 (1996).
Loehrl et al., "Autonomic dysfunction, vasomotor rhinitis, and extra esophageal manifestations of gastroesophageal reflux", Otolaryngol. Head Neck Surg., vol. 126:382-387 (2002).
Itti et al., "Robust multimodality registration for neuroimaging", Human Brain Mapping, vol. 5:3-17 (1997).
Ludwig et al., "Increasing Constrast-to-Noise Ratio for Silent Functional Gradient Echo Sequences with k-Space Centered Averaging", MAGMA, suppl. to vol. 15:213 (2002).

Maclaren et al., "Combined Prospective and Retrospective Motion Correction to Relax Navigator Requirements", Magnetic Resonance in Medicine (Feb. 11, 2011) 65:1724-1732.
MacLaren et al., "Navigator Accuracy Requirements for Prospective Motion Correction", Magnetic Resonance in Medicine (Jan. 2010) 63(1): 162-70.
MacLaren, "Prospective Motion Correction in MRI Using Optical Tracking Tape", Book of Abstracts, ESMRMB (2009).
Maclaren et al., "Measurement and correction of microscopic head motion during magnetic resonance imaging of the brain", PLOS One, vol. 7(11):1-9 (2012).
Mansfield et al., "Planar spin imaging by NMR", Journal of Magnetic Resonance, vol. 27:101-119 (1977).
Marchal et al. "Clinical evaluation of a motion compensated double echo sequence in MRI of the brain", Rofo, 150:442-448 (1989).
Masaki et al., "Association of vitamin E and C supplement use with cognitive function and dementia in elderly men", Neurology, vol. 54:1265-1272 (2000).
McVeigh et al., "Real-time, Interactive MRI for Cardiovascular Interventions", Academic Radiology, 12(9): 1121-1127 (2005).
Meyer et al., "Simultaneous spatial and spectral selective excitation", Magnetic Resonance in Medicine, vol. 15(2):287-304 (1990).
Milanov et al., "Clinical and electromyographic examinations of patients with tremor after chronic occupational lead exposure", Occup Med (Lond), vol. 51:157-62 (2001).
Miller et al., Alzheimer Disease: Depiction of Increased Cerebral Myo-Inositol with Proton MR Spectroscopy, Radiology, vol. 187:433-437 (1993).
Mitschke et al., "Recovering the X-ray projection geometry for three-dimensional tomographic reconstruction with additional sensors: Attached camera versus external navigation system", Medical Image Analysis, vol. 7(1):65-78 (2003).
Moats et al., "Quantitation of Abnormalities in the In Vivo 1H MR Spectrum of Patients with Probable Alzheimer Disease", Magn Reson Med, vol. 31:110-115 (1994).
Moghaddamjoo et al., "Robust adaptive Kalman filtering with unknown inputs", IEEE Trans. Acoust., Speech, Signal Processing, vol. 37(8):1167-1175 (1989).
Mole et al., "Myoglobin Desaturation with Exercise Intensity in Human Gastrocnemius Muscle", J. Physiol, R173 R179 (1999).
Morens et al., "Cigarette smoking and protection from Parkinson's disease: false association or etiologic clue", Neurology, vol. 45:1041-1051 (1995).
Morens et al., "Epidemiologic observations on Parkinson's disease: Incidence and mortality in a prospective study of middle aged men", Neurology, vol. 46:1044-1050 (1996).
Moriguchi et al., "Novel interleaved spiral imaging motion correction technique using orbital navigators", Magnetic Resonance in Medicine, vol. 50(2):423-428 (2003).
Mugler et al., "Three-dimensional magnetization-prepared rapid gradient-echo imaging (3D MP RAGE)", Magnetic Resonance in Medicine, vol. 15(1):152-157 (1990).
Mulder, Axel, "Human movement tracking technology", Technical Report, vol. 94(1), School of Kinesiology, Simon Fraser University (1994).
Nehrke et al., "Prospective Correction of Affine Motion for Arbitrary MR Sequences on a Clinical Scanner", Magnetic Resonance in Medicine (Jun. 28, 2005) 54:1130-1138.
Newell et al., "Computed Tomographic Appearance of Brachiocephalic Vein Aneurysm", Military Medicine, vol. 148(8):663 (1983).
Norris et al., "Online motion correction for diffusion-weighted imaging using navigator echoes: application to RARE imaging without sensitivity loss", Magnetic Resonance in Medicine, vol. 45:729-733 (2001).
Ooi et al., "Prospective Real-Time Correction for Arbitrary Head Motion Using Active Markers", Magnetic Resonance in Medicine (Apr. 15, 2009) 62(4): 943-54.
Orchard et al., "MRI Reconstruction using real-time motion tracking: A simulation study", Signals, Systems and Computers, 42nd Annual Conference IEEE, Piscataway, NJ, USA (Oct. 26, 2008).

(56) References Cited

OTHER PUBLICATIONS

Park, Frank C. and Martin, Bryan J., "Robot Sensor Calibration: Solving AX-XB on the Euclidean Group", IEEE Transaction on Robotics and Automation, 10(5): 717-721 (Oct. 1994).
Pathak et al., "A rate-controlled indentor for in vivo analysis of residual limb tissues", IEEE Trans. Rehabil. Eng., vol. 6:12-20 (1998).
Pattani et al., "Effects of physiologic human brain motion on proton spectroscopy: quantitative analysis and correction with cardiac gating", American Journal of Neuroradiology, vol. 23(2):225-230 (2002).
Pauly et al., "Parameters relations for the Shinnar-LeRoux selective excitation pulse design algorithm", IEEE Transactions in Medical Imaging, vol. 10:53-65 (1991).
Pauly et al., "A k-space analysis of small-tipangle excitation", Journal of Magnetic Resonance Imaging, vol. 81:43 (1989).
PCT Search Report from the International Searching Authority, dated Feb. 28, 2013, in 16 pages, regarding International Application No. PCT/US2012/052349.
Perone et al., "Intrasellar Schwannoma: Case Report", Neurosurgery, vol. 14(1):71 (1984).
Petrovitch et al., "Accuracy of clinical criteria for AD in the Honolulu-Asia Aging Study, a population-based study", Neurology, vol. 57:226-234 (2001).
Petrovitch et al., "Alzheimers and Cerebrovascular Lesions in Demented and Cognitively Normal Japanese American Men", Ann Neurol, vol. 57:98-103 (2005).
Petrovitch et al., "Midlife blood pressure and neuritic plaques, neurofibrillary tangles, and brain weight at death: the HAAS", Neurobiol Aging, vol. 21:57-62 (2000).
Petrovitch et al., "Plantation work and risk of Parkinson's disease in a population-based longitudinal study", Arch Neurol, vol. 59(11):1787-1792 (2002).
Pongarnis et al., "Detection of myoglobin desaturation in Mirounga angustirostris during apnea", Am J Physiol Regul Integr Comp Physlol, vol. 282: R267-R272 (2002).
Prieto et al., "A new 3-dimensional spatial orientation sensor referenced to the local magnetic field", World Congress on Medical Physics and Biomedical Engineering, Chicago (2000).
Prieto et al., "A system for recording manual subject responses during functional magnetic resonance imaging", Proc. 16th Ann. Conf. IEEE Eng. Med. Biol. Soc., vol. 16:561 (1994).
Prieto et al., "Acoustic noise levels in a head gradient coil during echo planar imaging at 3T", Proc. 6th ISMRM, p. 750 (1998).
Prieto et al., "Characterization and modeling of postural steadiness in the elderly", IEEE Trans. Rehabilitation Eng., vol. 1(1):26-34 (1993).
Prieto et al., "Characterization of postural steadiness and ankle joint compliance in the elderly", IEEE EMBS Magazine, vol. 11(4):25-27 (1992).
Prieto et al., "Measures of postural steadiness: Differences between healthy young and elderly adults", IEEE Trans. Biomed. Eng., vol. 43(9):956-966 (1996).
Prieto, T.E., "Acoustic noise levels in head gradient coils during EPI as a function of frequency encoding direction", Proc. 7th ISMRM (1999).
Prieto, T.E., "Devices for monitoring manual subject responses during functional magnetic resonance imaging", Annual Mtg. Biomed. Eng. Soc. Ann. Biomed, Eng., vol. 25(Suppl1):66 (1997).
Prieto, T.E., "Head stabilization system for FMRI of the human brain", Proc. 1st Joint BMES/EMBS Conf., p. 1077 (1999).
Prieto, T.E., "Systems for presenting stimuli and monitoring subject responses during FMRI", Annual Mtg. BIomed, Eng. Soc. Ann. Biomed. Eng., vol. 25(Suppl1):11 (1998).
Qin et al., "Prospective Head-Movement Correction for High-Resolution MRI Using an In-Bore Optical Tracking System", Magnetic Resonance in Medicine (Apr. 13, 2009) 62: 924-934.
Reddick et al., "Doppler Ultrasonic Imaging of the Cervical Carotid Artery; Does it Overlook Significant Intracranial Arterial Disease?", Current Surgery, vol. 40(1):13 (1984).
Reynolds et al., "Analysis of gait in Huntington's disease", Arch. Phys. Med. Rehabil., vol. 80:59-65 (1999).
Reynolds et al., "Too many treatments for Parkinson's disease: how should they be used?", Wisconsin Medical J., vol. 99:57-61 (2000).
Rezai et al., "Is magnetic resonance imaging safe for patients with neurostimulation systems used for deep brain stimulation?", Neurosurgery, vol. 57:1056-1062, discussion 1056-1062 (2005).
Rezai et al., "Neurostimulation system used for deep brain stimulation (DBS): MR safety issues and implications of failing to follow safety recommendations", Invest Radiol, vol. 39:300-303 (2004).
Ribo, M., "State of the art report on optical tracking", VRVis (2001).
Robson et al., "Diffusion-weighted multiple shot echo planar imaging of humans without navigation", Magnetic Resonance in Medicine, vol. 38(1): 82-88 (1997).
Rosen et al., "Neural basis of endogenous and exogenous spatial orienting: a FMRI study", J. Cogn. Neurosci., vol. 11:135-152 (1999).
Ross et al., "Characterization of risk factors for vascular dementia: the Honolulu-Asia Aging study", Neurology, vol. 53:337-343 (1999).
Ross et al., "Frequency and characteristics of silent dementia among elderly Japanese-American men: the Honolulu-Asia Aging Study", JAMA, vol. 277:800-805 (1997).
Ross et al., "Parkinsonian Signs and Substantia Nigra Neuron Density in Decedent Elders without PD", Ann Neurol, vol. 56:532-539 (2004).
Ross et al., "Protective effects of nicotine and caffeine against Parkinson's disease: current evidence and theraputic implications", Drugs and Aging, vol. 18(11):797-806 (2001).
Ross et al., "Quantification of regional glial fibrillary acidic protein levels in Alzheimer's disease", Acta Neurologica Scandinavica, vol. 107(5):318-323 (2003).
Ross et al., "The association of coffee and caffeine intake with the risk of Parkinson's disease", JAMA, vol. 283:2674-2679 (2000).
Ross et al., "The diagnosis and differential diagnosis of dementia", Med Clin North Am, vol. 86(3):455-476 (2002).
Royal, III, et al., Topotecan in the treatment of acquired immunodeficiency syndrome-related progressive multifocal leukoencephalopathy, J Neurovirol, vol. 9(3):411-419 (2003).
Sailasuta et al., "Studies of the Thermondynamics of Electron Transfer Reaction in Blue Copper Protein", J. Am. Chem. Soc., vol. 101:455-458 (1979).
Sailasuta-Scott et al., "Affinity of Tetraammineruthenium(II) and (III) for some amino acids", Inorg. Chem, vol. 20:3135-3138 (1981).
Sailasuta-Scott et al., "EXAFS and Other Studies of Sulfite Oxidase Molybdenum", Molydenum Chemistry of Biological Significance, Newton et al., editors, Plenum, New York, pp. 157-168, (1980).
Sailasuta-Scott et al., "Spectroelectrochemical Observation at Transparent Graphite Electrodes coated with Ploy(4 vinylpyridine) and Ru(III)EDTA", J. Electro. Chem., vol. 110:303-310 (1980).
Schmidt et al., "Robust hand-eye calibration of an endoscopic surgery robot using dual quaternions", Lecture Notes in Computer Science, vol. 2781:548-556 (2003).
Schulte et al., "Separation and Quantification of Perfusion- and BOLD-Effects by Simultaneous Acquisition of Functional 10- and T2*-Parameter Maps", Magn. Reson. Med., vol. 45(5):811-816 (2001).
Schulz et al., "First Embedded In-Bore System for Fast Optical Prospective Head Motion-Correction in MRI", Proceedings of the 28th Annual Scientific Meeting of the ESMRMB (Oct. 8, 2011) 369.
Seto et al., "Quantifying Head Motion Associated with Motor Tasks Used in fMRI", NeuroImage, vol. 14(2):284-297 (2001).
Shanley et al., "*Salmonella typhi* abscess in a craniopharyngioma: CT and MRI", Neuroradiology, vol. 36(1):35-36 (1994).
Shiu et al., "Calibration of Wrist-Mounted Robotic Sensors by Solving Homogeneous Transform Equations of the Form AX=XB", IEEE Transactions on Robotics and Automation, 5(1): 16-29 (Feb. 1989).
Small et al., "The Effect of Apolipoprotein E Type 4 Allele on Cerebral Glucose Metabolism in Relatives at Risk for Familial Alzheimer Disease", JAMA, vol. 273:942-947 (1995).

(56) References Cited

OTHER PUBLICATIONS

Smith et al., "Brain proton magnetic resonance spectroscopy and imaging in children exposed to cocaine in utero", Pediatrics, vol. 107:227-231 (2001).
Smith et al., "Brain proton magnetic resonance spectroscopy and imaging in children exposed to methamphetamine in utero", Neurology, vol. 57(2):255-260 (2001).
Smith et al., "Brain proton magnetic resonance spectroscopy in children exposed to methamphetamine in utero", Neurology, vol. 57:255-260 (2001).
Soher et al., "Quantitation of Automated Single-voxel Proton MRS using Cerebral Water as Internal Reference", Magn Reson Med, vol. 36:335-338 (1996).
Speck et al., "Bi-exponential modeling of multi gradient echo data of the brain", Magn. Reson. Med., vol. 45(6):1116-1121 (2001).
Speck et al., "Comparison of Static and Dynamic MRI Techniques for the Measurement of Regional Cerebral Blood Volume", Magn. Reson. Med., vol. 41(6):1264-1268 (1999).
Speck et al., "Comparison of Static and Dynamic Perfusion MRI Techniques for the Measurement of Regional Cerebral Blood Volume", Magn Reson Med, vol. 41:1264-1268 (1999).
Speck et al., "Fast 31P-Chemical Shift Imaging using SSFP Methods", Magn. Reson. Med., vol. 48(4):633-639 (2002).
Speck et al., "Functional Imaging by 10- and T2*-Parameter Mapping using Multi-Image-EPI", Magn. Reson. Med., vol. 40(2): 243-248 (1998).
Speck et al., "Gender Differences in the Functional Organization of the Brain for Working Memory", NeuroReport, vol. 11(11):2581-2585 (2000).
Speck et al., "Grading and Therapy Monitoring of Astrocytomas with 1H Spectroscopy: Preliminary Study", Anticancer Research, vol. 16(3B):1581-1586 (1996).
Speck et al., "Motion Correction of Parametric fMRI Data from Multi-Slice Single-Shot Multi-Echo Acquisitions", Magn. Reson. Med., vol. 46(5):1023-1027 (2001).
Speck et al., "Multi Gradient Echo Acquisition Techniques for fMRI: Advantages of Bi-Exponential Modeling", Magn Reson Med, vol. 45:1116-1121 (2001).
Speck et al., "Perfusion MRI of the Human Brain with Dynamic Susceptibility Contrast: Gradient Echo versus Spin Echo Techniques", J. Magn. Reson. Imag., vol. 12(3):381-387 (2000).
Speck, et al., "Prospective real-time slice-by-slice Motion Correction for fMRI in Freely Moving Subjects", Magnetic Resonance Materials in Physics, Biology and Medicine., 19(2), 55-61, published May 9, 2006.
Srinivasan et al., "A comparative study of myo-inositol quantification with LCModel at 1.5 T and 3T using 3D Proton Spectroscopic Imaging of the Human Brain", Magn. Reson. Med., vol. 22:523-528 (2004).
Srinivasan et al., "Evidence of Elevated Glutamate in Multiple Sclerosis Using MR Spectroscopy at 3T", Brain (2005).
Strecker et al., "Vessel Size Imaging in Humans", MAGMA, suppl. to vol. 15:14 (2002).
Swanson et al., "Single-voxel oversampled J-resolved spectroscopy of in vivo human prostate tissue", Magn Reson Med, vol. 45:973-980 (2001).
Taniguchi et.al., "Thermodynamics of Metalloproteins Electron Transfer Reactions", Pure and Applied Chemistry, vol. 52:2275-2281 (1980).
Tanner et al., "Neuroepidemiology: fundamental considerations", In Nelson et al., eds. Neuroepidemiology: From Principles to Practice, Oxford University Press, New York, pp. 1-22 (2004).
Thesen et al., "Prospective acquisition correction for head motion with image-based tracking for real-time fMRI", Magnetic Resonance in Medicine, vol. 44(3):457-465 (2000).
Thiel et al., "Phase coherent averaging in magnetic resonance spectroscopy using interleaved navigator scans: compensation of motion artifacts and magnetic field instabilities", Magnetic Resonance in Medicine, vol. 47(6):1077 1082 (2002).
Thomas et al., "Fuzzy logic control—a taxonomy of demonstrated benefits", Proceedings of the IEEE, vol. 83(3):407 421, Invited Paper (1995).
Thomas et al., "Fuzzy logic control: A taxonomy of demonstrated benefits", In Proc. Fuzzy Logic '94. Computer Design, San Diego, Invited Paper (1994).
Tomasi et al., "Acoustic noise interferes with working memory in HIV-patients", Annals of Neurology (in press).
Tomasi et al., "Common deactivation patterns during working memory and visual attention tasks: An intra-subject fMRI study at 4 Tesla", Human Brain Mapping, Epub ahead of print (2006).
Tomasi et al., "Echo planar imaging at 4 Tesla with minimum acoustic noise", J Magn Reson Imaging, vol. 18(1):128 130 (2003).
Tomasi et al., "Practice-induced changes of brain function during visual attention: A parametric fMRI study at 4 Tesla", NeuroImage, vol. 23(4):1414-1421 (2004).
Tomasi et al., "The Effect of Practice in Visual Attention Processing: A functional MRI study at 4 Tesla", Neuroimage, vol. 23(4):1414-1421 (2004).
Tomasi et al., "The human immunodeficiency virus reduces network capacity: acoustic noise effect", Annals of Neurology (in press).
Tran et al., "Comparative Analysis of NMR and INRS Measurements of intra cellular PO2 in Human Skeleton Muscle", J. Physiol, R1682-R1690 (1999).
Tran et al., "Spatial distribution of deoxymyoglobin in human muscle an index of local Tissue oxygenation", NMR Biomed. vol. 12:26-30 (1999).
Tran et al., "Very selective suppression pulses for clinical MRSI studies of brain and prostate cancer", Magn Reson Med, vol. 43:23-33 (2000).
Tremblay et al., "Retrospective Coregistration of Functional Magnetic Resonance Imaging Data using External monitoring", Magnetic Resonance in Medicine 53:141-149 (2005).
Tsai et al., "A New Technique for Fully Autonomous and Efficient 3D Robotics Hand/Eye Calibration", IEEE Transaction on Robotics and Automation, 5(3): 345-358 (Jun. 1989).
Volkow et al., "Association of dopamine transporter reduction with psychomotor impairment in methamphetamine abusers", Am J Psychiatry, vol. 158:377-382 (2001).
Volkow et al., "Loss of dopamine transporters in methamphetamine abusers recovers with protracted abstinence", Journal of Neuroscience, vol. 21(23):9414-9418 (2001).
Volkow et al., "Low level of brain dopamine D2 receptors in methamphetamine abusers: association with metabolism in the orbitofrontal cortex", American Journal of Psychiatry, vol. 158(12):2015-2021 (2001).
Wallace et al., "Cognitive-linguistic assessment of individuals with multiple sclerosis", Archives of Physical Medicine and Rehabilitation, vol. 74(6):637-643 (1993).
Wang et al., "Decreased brain dopamine transporters in patients with HIV-associated dementia", Brain, vol. 127(pt 11):2452-2458 (2004).
Wang, Ching-Cheng, "Extrinsic Calibration of a Vision Sensor Mounted on a Robot", IEEE Transactions on Robotics and Automation, 8(2):161-175 (Apr. 1992).
Ward et al., "Real-time autoshimming for echo planar timecourse imaging", Journal of Magnetic Resonance Imaging, vol. 48(5):771-780 (2002).
Ward et al., "Prospective Multiaxial Motion Correction for fMRI", Magnetic Resonance in Medicine 43:459-469 (2000).
Webb et al., "Automated Single-Voxel Proton MRS Technical Development and Multisite Verification", Magn Reson Med; vol. 31:365-369 (1994).
Welch at al., "Spherical Navigator Echoes for Full 3D Rigid Body Motion Measurement in MRI", Magnetic Resonance in Medicine 47:32-41 (2002).
White et al., "Brain Aging and midlife tofu consumption", J Amer College of Nutrition, vol. 19:242-255 (2000).
White et al., "Prevalence of dementia in older Japanese-American men in Hawaii: the Honolulu-Asia Aging Study", JAMA, vol. 276:955-960 (1996).

(56) References Cited

OTHER PUBLICATIONS

Yeh et al., "S to O and O to S Linkage Isomeization in Sulfoxide Complexes of Pentaammine Ruthenium", Inorg. Chem., vol. 21:2542-2545 (1982).

Yeo, et al. Motion correction in fMRI by mapping slice-to-volume with concurrent field-inhomogeneity correction:, International Conference on Medical Image Computing and Computer-Assisted Intervention, pp. 752-760 (2004).

Yuan et al. "Flow-induce phase effects and compensation technique for slice-selective pulses", Magnetic Resonance in Medicine, vol. 9(2):161-176 (1989).

Zaitsev et al, "Imaging of Freely Moving Objects by Means of Real-Time Image Coordinates Update Using an External Optical Motion Tracking System", ISMRM, Kyoto, vol. 12 (2004).

Zaitsev et al., "Point Spread Function Mapping with Parallel Imaging Techniques and High Acceleration Factors: Fast, Robust and Flexible Method for Echo Planar Imaging Distortion Correction", MRM, vol. 52(5):1156-1566 (2004).

Zaitsev, M., et al., "Prospective Real-Time Slice-by-Slice 3D Motion Correction for EPI Using an External Optical Motion Tracking System", Proc.Intl.Soc.Mag.Reson.Med. 11:517(2004).

Zeitsev et al., "Magnetic resonance imaging of freely moving objects: Prospective real-time motion correction using an external optical motion tracking system", NeuroImage 31 (Jan. 29, 2006) 1038-1050.

Zhong et al., "Localized In Vivo Human 1H MRS at Very Short Echo Times", Magn Reson Med, vol. 52(4):898-901 (2004).

Ziyeh et al., "BOLD-Kontrast-MRT and zerebrovaskulare Reservekapazitat", Kiln. Neurorad., vol. 14:213-217 (2004).

Ziyeh et al., "BOLD-MR imaging of cerebral CO2-reactivity in severe carotid stenosis and occlusion", Stroke, vol. 36(4):751-756 (2005).

Ziyeh et al., "Vessel Size Imaging in Brain Tumor Patients", J. Neuroradiol., vol. 29:1S36 (2002).

Anishenko et al., "A Motion Correction System for Brain Tomography Based on Biologically Motivated Models." 7th IEEE International Conference on Cybernetic Intelligent Systems, dated Sep. 9, 2008, in 9 pages.

* cited by examiner

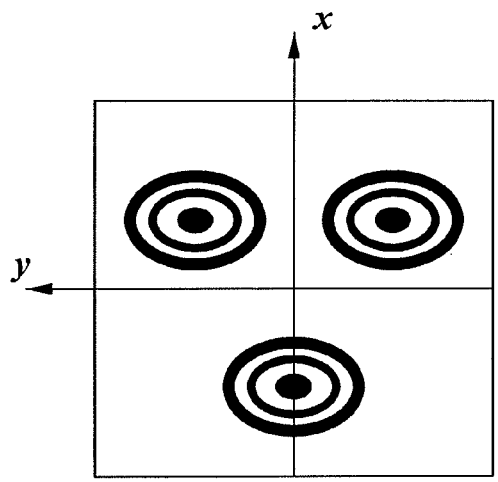
FIG.1A
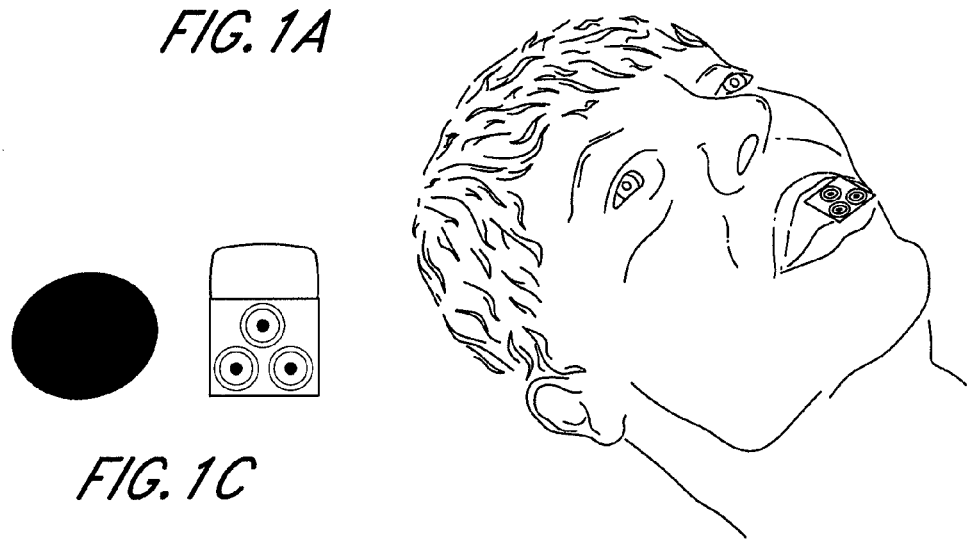
FIG.1C
FIG.1B
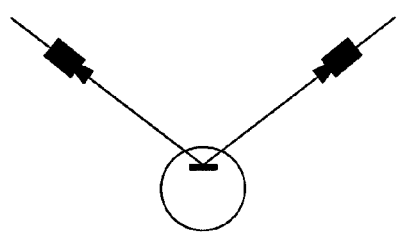
FIG.2A
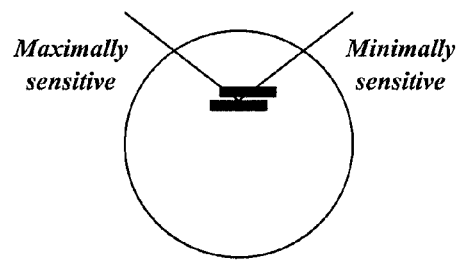
FIG.2B

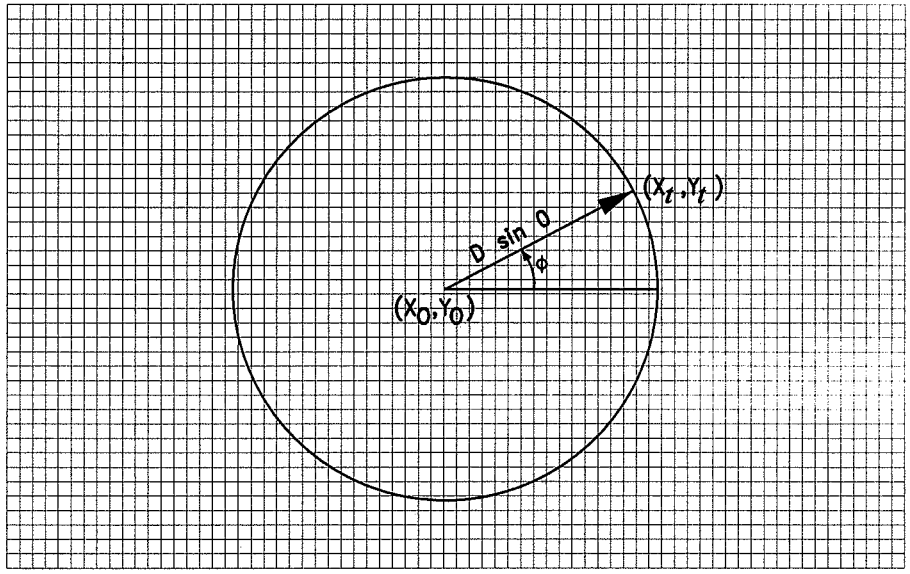

$D$ = lens focal length
$X_t = X_0 + D\sin\theta\cos\phi$
$Y_t = Y_0 + D\sin\theta\cos\phi$ $N_x = N_{x0} + \left(\dfrac{X_t - X_0}{\Delta s}\right) = N_{x0} + \left(\dfrac{D}{\Delta s}\right)\sin\theta\cos\phi$ $N_y = N_{y0} + \left(\dfrac{Y_t - Y_0}{\Delta s}\right) = N_{y0} + \left(\dfrac{D}{\Delta s}\right)\sin\theta\sin\phi$ $\Delta s$ = pixel size: $N_{x0}$ = horiz center pixel number: $N_{y0}$ = vert center pixel number:

*FIG. 14B*

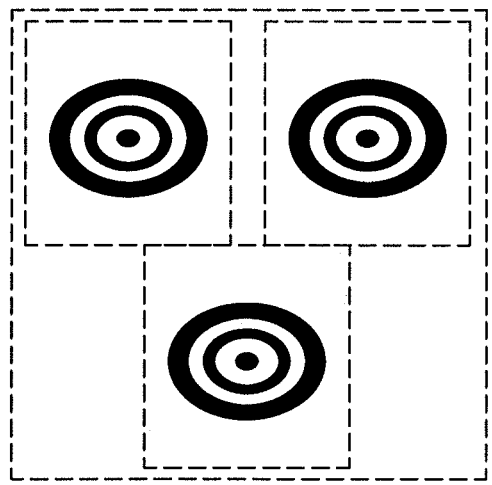

*FIG. 14C*

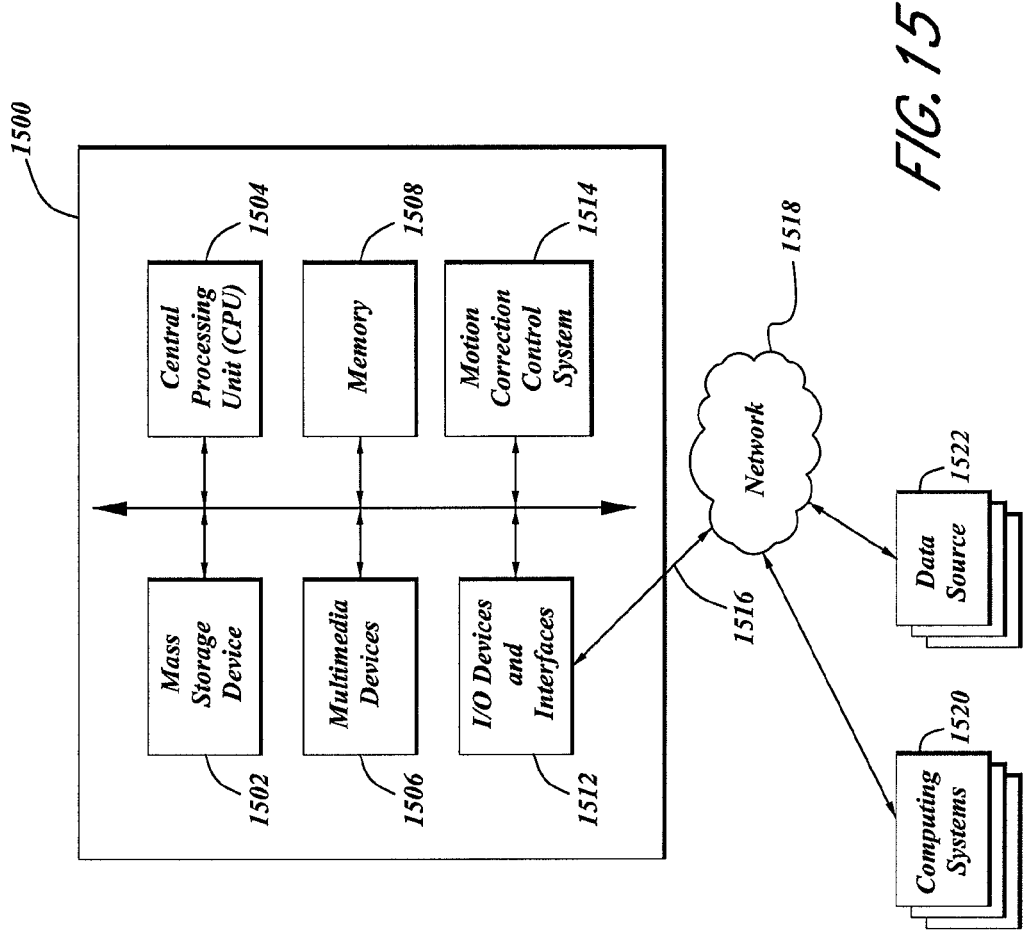

SYSTEMS, DEVICES, AND METHODS FOR TRACKING MOVING TARGETS

CROSS REFERENCE TO RELATED APPLICATIONS

This application is a continuation of U.S. patent application Ser. No. 14/837,554, entitled SYSTEMS, DEVICES, AND METHODS FOR TRACKING MOVING TARGETS, filed Aug. 27, 2015, which is a continuation of U.S. patent application Ser. No. 13/831,115, entitled SYSTEMS, DEVICES, AND METHODS FOR TRACKING MOVING TARGETS, filed Mar. 14, 2013, which claims the benefit as a nonprovisional application of U.S. Provisional Patent Application No. 61/849,338, entitled SIX DEGREES OF FREEDOM OPTICAL TRACKER, filed Jan. 24, 2013. Each of the foregoing applications is hereby incorporated by reference herein in its entirety.

BACKGROUND

There are various modalities for performing medical imaging of patients. For example, magnetic resonance imaging (MRI) is a medical imaging technique used in radiology to visualize internal structures of the body in detail. An MRI scanner is a device in which the patient or a portion of the patient's body is positioned within a powerful magnet where a magnetic field is used to align the magnetization of some atomic nuclei (usually hydrogen nuclei—protons) and radio frequency magnetic fields are applied to systematically alter the alignment of this magnetization. This causes the nuclei to produce a rotating magnetic field detectable by the scanner and this information is recorded to construct an image of the scanned region of the body. These scans typically take several minutes (up to about 40 minutes in some scanners) and in prior art devices any significant movement can ruin the images and require the scan to be repeated.

U.S. Pat. No. 8,121,361 issued Feb. 21, 2012, entitled Motion Tracking System for Real Time Adaptive Imaging and Spectroscopy describes a system that adaptively compensates for subject motion. and the disclosure therein is hereby incorporated herein by reference.

SUMMARY

An accurate and reliable method of determining the dynamic position and orientation of a patient's head or other body portion during MRI scanning is a requirement in any attempt to compensate for subject motion during the procedure. Toward this end, disclosed herein are systems and methods that include practical optical head tracking capability using at least a first sensor, e.g., a first camera, and a second sensor, e.g., a second camera, such as a pair of cameras, for example ordinary CCD cameras, ordinary white light or LED illumination, and a marker target, such as a compact, inexpensive target which mounts comfortably and rigidly to the subject's skeletal frame The camera can be configured to detect any desired wavelength or range of wavelengths of energy, including one or more of the infrared, near-infrared, visible, or ultraviolet spectra for example. Some preferred embodiments can track head and other body motion having up to and including six degrees of freedom (sometimes referred to as 6-DOF).

In an embodiment, the system is configured for tracking a moving target having up to six degrees of freedom and rapidly determining positions of the target, said system includes an easy to locate precision optical target fixed to the target. The system can also include at least two cameras positioned so as to view the optical camera from different directions with each of the at least two cameras being adapted to record two dimensional images of the precision optical target defining a precise target point. In an embodiment, a computer processor is programmed to determine the target movement in Cartesian coordinates of x, y and z and pitch, roll and yaw utilizing an algorithm adapted to identify a set of precise target points on the precision optical target and the x, y and z displacement and the pitch, roll and yaw rotation of the precise target points based on optical images collected by the at least two cameras. The system can utilize an iteration procedure whereby an approximate first-order solution is proposed and tested against the identified precise target point projections on the cameras to determine residual errors which are then divided by the local derivatives with respect to each component of rotation and translation, to determine an iterative correction. The system can be configured to repeat the above actions until residual error becomes smaller than desired accuracy. Using this process the system can be configured to determine the position of the target at rates of at least 100 times per second with translations accuracies of about or no more than about 0.1 mm and angle accuracies of about or no more than about 0.1 degrees. With repetition rates in the range of 100 times per second, the full 6-DOF movement determination can be performed for each repetition. In these embodiments the results of each movement determination is used for the initial first order solution during the next iteration.

The six degrees of freedom movements are over orthogonal directions x, y, and z and roll, pitch and yaw angles. Direction x is along the spinal axis. Direction y perpendicular to x is along the shoulder to shoulder direction and direction z is perpendicular to both x and y and in the floor-to-ceiling direction assuming the patient is lying on his back parallel to the floor. The roll angle is about the x-axis; the angle made by a shaking head "No". The pitch angle is about the y-axis; the angle made by shaking head "Yes" and the Yaw angle is about the z-axis, the angle made by leaning head toward a shoulder.

In an embodiment, the desired accuracy is about 0.1 mm for each of the directions and about 0.1 degrees for each of the angles. Movements are measured relative to a pivot point in the patient's neck. In an embodiment the pivot point is located at the base of the patient's neck where the head swivels for nod turn and lean motions. The offset of the precision optical target from this pivot point position is $\Delta y=0$, $\Delta x=-4.5"$, $\Delta z=5.5"$. The precision of these offsets is not critical since all motions of interest are relative motions. The six measurements are x, y, and z distances and roll, pitch and yaw angles. In some embodiments, the measurements are up-dated at a rate of about 100 solutions per second with a latency of about 10 milliseconds. The system can be configured to report to MRI systems the exact position or the approximate position of the head with accuracies of about or better than about 0.1 mm in distances and about 0.1 degree in angles.

One possible coordinate system for reporting 6-DOF motions to the MRI field compensation system is a Cartesian system aligned with the symmetry axis of the head coil. The head coil coordinate system is coincident with body coordinates in the nominal ("square") head position. Target displacements and rotations can be reported to the coil field compensation system using this system of coordinates.

BRIEF DESCRIPTION OF THE DRAWINGS

FIG. 1A is a drawing of a precision optical target, according to some embodiments of the invention.

FIG. 1B show the target of FIG. 1A attached to the top front teeth of a patient.

FIG. 1C show the size of one embodiment of the optical target relative to a U.S. penny.

FIGS. 2A and 2B show how two cameras together provide sensitivity needed to track motion, according to some embodiments of the invention.

FIGS. 14B and 14C display features of an iteration technique utilized to precisely monitor head movement utilizing the camera images of the precision optical target, according to some embodiments of the invention.

FIG. 15 is a block diagram depicting an embodiment of a computer system configured to implement one or more embodiments of the methods, devices, and systems described herein.

DETAILED DESCRIPTION

Figure 3A:
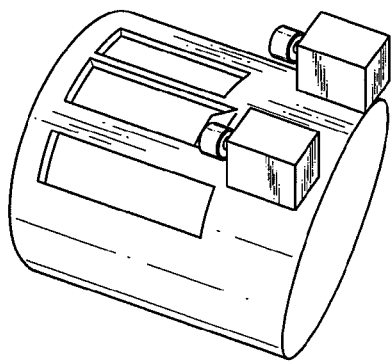
FIGS. 3A and 3B show how a patient's head and two cameras are located in an MRI device, according to some embodiments of the invention.

Optical Target Fixed to an Anatomical Location, e.g., the Head

To overcome the challenge of the elastic nature of skin, in an embodiment, an optical tracking target can be coupled to the upper teeth of the patient. One accessible feature which is rigid to the skull is the upper teeth. Unlike the teeth on the lower jawbone, the upper teeth are rigidly affixed to the skull of the patient. In an embodiment, a compact and reliable optical tracking target can be attached to one or more of the upper teeth with a clip-on or other coupling device. Such attachment devices can be configured to be extremely comfortable. In an embodiment, a printed precision optical target is attached to the top front teeth of a patient.

An optical target can be configured to be easy to locate with a high degree of accuracy regardless of orientation in a sensor field of view. A circle or series of concentric circles or ellipses can be potentially advantageous in this regard. Furthermore, to accommodate the fastest composite 2D data processing methods, a number (at least 3) of centroid positions can be discernible at every instant in time. The target can be, in some embodiments, composed of three sets of concentric circles or ellipses located at the vertices of an equilateral triangle. Compactness is desired for practical reasons, but the minimum size and spacing of the targets is dictated to large extent by characteristics of the sensors and the available non-occluded optical lines of sight through the MRI field compensation coil. A tradeoff arises, for instance, between the minimum size of the target and the cost of the imaging cameras used to sense the head motion—the smaller the edge dimension of the target triangle, the more pixels required in the camera sensor, and the faster the readout and processing electronics required.

As a reasonable compromise, in some embodiments an equilateral triangle side length of 0.5 inches can be adopted. The printed target pattern includes a solid central elliptical dot of $1/16$" minor diameter at each triangle vertex, and each dot is surrounded by a first concentric ellipse of $3/16$" minor diameter and $1/32$" line width, and a second concentric ellipse of $5/16$" minor diameter and $1/32$" line width (ellipses scaled to look circular from camera nominal 45° look angle). In this embodiment, the entire target measures about 1 inch wide by about 0.93 inches high. Other dimensions are possible.

A camera viewing this target is able to determine the centroid of each ellipse on the target pattern using a simple brightness moment calculation, independent of orientation of the target. The target itself subtends only a small portion of the camera field of view, but is recognizable by its high contrast and lack of gray scale. In embodiments the computer processor is programmed to track each of the three sub-targets by enclosing each of the three sub-targets within a sub-pixel array of 48×48 pixels and to calculate centroids of each sub-target by dividing (a) the sum of the product of pixel darkness and pixel position by (b) the sum of the pixel darkness of all of the pixels in the 48×48 sub-pixel array. The processor is also programmed to move each of the 48×48 pixel arrays so that its target is always located fully within the sub-pixel array. With sufficient camera spatial and brightness resolution and target illumination and contrast, centroid positional accuracy of about 0.1 pixels in row and/or column or less is achievable using this target.

FIG. 1A is an enlarged view of the optical target and two of the three Cartesian axes. FIG. 1B shows a full-scale target (compared to a U.S. penny) affixed to NTI coupling device for placement on the upper teeth of the patient. (Lower right) Subject with optical target and night guard clipped onto front teeth.

Latency

Latency in the measurement of head motion using optical tracking techniques is comprised of the camera sensor integration and readout time, the target centroid determination time and the 6-DOF decomposition time. In order to reliably track head motions as fast as 2 cm/second and head rotations as fast as 10 degrees per second, a camera frame rate of about 100 Hz is desired, with electronic shuttering to freeze motion at rates up to 10 times this speed for sharp resolution of the optical target without blurring. A significant field of view is required to accommodate large motions, so fast camera readout without expensive mechanical tracking capabilities will require either a low pixel density or a camera with a larger focal plane but the ability to window a smaller region of interest for readout. Centroid and 6-DOF decomposition algorithms running in composite 2D, rather than full 3D space, and utilizing rapidly converging solution methods can be capable of returning solutions to the compensating head coil electronics at 100 solutions per second, with about 10 ms of latency. In some embodiments, the system can be configured to operate with a latency that enables it to update the scanner in between each image acquisition Cameras For a subject wearing or coupled with the optical head tracking target, the target size and subject rotation angles and translation position determine the physical location of the three target centroids precisely in three dimensions. With precise knowledge of these angles and the optical sensor (camera and lens) parameters—pixel pitch, lens focal length and radial distortion, camera location and orientation relative to nominal target position—the location of the target centroid projections on the focal plane sensor can be predicted to any level of accuracy even prior to measurement.

In principle, the inverse problem should be equally simple as long as the 3D position of the target centroids can be ascertained optically. Using two cameras, a stereo view of the centroid projections can be used to determine the 3D location in space of each target centroid, and the 6-DOF displacement vector can then be determined through a simple matrix inversion. In practice, however, this approach leads to expensive and complicated requirements on camera pixel density, pixel count, camera alignment and camera calibration.

An alternate unfolding approach dispenses with stereo ranging but uses separate 2D projections from two cameras without attempting to correlate absolute target positions on the two cameras. This approach eliminates the strict requirements on camera alignment and magnification matching characteristic of the stereo vision approach, and also relaxes the pixel density and count requirements needed to obtain the required positional accuracy (about 0.1 mm in translation and about 0.1 degrees in rotation) by about a factor of 20, resulting in significant savings in cost and processing speed.

Even for this 2D measurement approach some basic steps can be taken to calibrate camera parameters once the cameras are integrated with the head coil; these can be performed at the manufacturing facility. These include measuring the projected pixel location of a single reference point on both cameras, as well as the camera magnification factors for pixel displacement per degree of rotation in pitch, yaw and roll, and per mm of translation along x, y and z. However, as stated before, it is not necessary that the cameras be exactly aligned in space (e.g. perfectly normal) or that their magnifications (lens focal length and distance to reference point) be identical, as is easily verified by simulation.

Stereo Versus Composite 2D Vision Requirements

With a single camera viewing the target from 45 degrees off of vertical in the target plane, the camera sees very little centroid displacement when the target moves in the direction of the camera (e.g. upward vertical translation equal to horizontal translation in the camera direction, with no rotation). Assuming a 7 micron pixel pitch, a 25 mm lens, and a working distance of 14 inches, target displacement in the camera direction may be at least 0.6 mm before the target can be detected as a 0.1-pixel increase in target centroid separation. However, as shown in FIGS. 2A and 2B a second camera placed orthogonally, e.g. at −45 degrees relative to vertical in the same plane, is maximally sensitive to this same motion, seeing a full pixel displacement of each centroid for a diagonal translation of only 0.1 mm. The second camera eliminates the "blind spot" that a single camera has to motion along its optical axis. While certain embodiments described systems in which cameras are positioned orthogonally, cameras can also be placed at relative angles other than orthogonal with respect to vertical in the same plane, depending on the desired clinical result.

Camera Depth of Field

To accommodate head roll of +/−15 degrees plus the 0.85-inch target width at a working distance of 14 inches, the lens can be configured to provide sharp focus for distances between 13" and 15.5". At f/22, assuming a circle of confusion slightly smaller than a camera pixel (7 microns), a 25 mm focal-length lens provides this necessary depth of field a nominal 14-inch focus. At this working distance, the optical path can be folded with a turning mirror (FIG. 3) or otherwise configured to fit within the 70 cm diameter bore of the main MRI coil. A non-ferrous camera can be utilized in the MRI environment. In an embodiment, it can be cost effective to repackage a commercial camera for use in the strong magnetic field.

In some embodiments, one possible camera that can be utilized or modified for use with systems and methods as disclosed herein, is produced by Allied Vision Technologies and designated the Prosilica GE-680 Monochrome CCD Camera. This camera features a Kodak KAI-0340 ⅓" 640× 480 VGA focal plane sensor with 7.4 µm square pixels and a fast Gigabit Ethernet output delivering up to 205 frames per second at 12-bit pixel depth. An inexpensive possible lens for use is an Edmund Optics TechSpec 25 mm high-resolution fixed focal length lens.

For this camera and lens, at 14 inches from the target at 45° incidence, the 5/16" diameter target circles project to ellipses on the camera, with the minor diameter of the largest ellipses at about 28 pixels and the major diameter at about 40 pixels. With sufficient S/N ratio (target illumination) and lens MTF (sharpness), this pattern should allow accurate centroiding to about 0.1 pixels in row and/or column or less. The entire projected target subtends about 128 H×168 V pixels, and allowing for head roll of +/−11.5 degrees, a camera with 640 horizontal pixels (pixel columns) can accommodate the entire field of interest without mechanical tracking provisions.

Figure 3B:
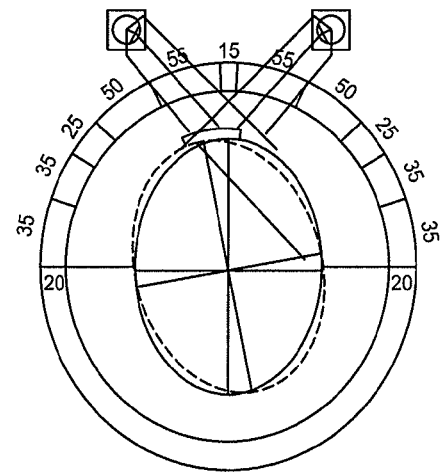

FIGS. 3A and 3B show a modified head coil with cameras mounted longitudinally and turning mirrors to accommodate a longer working distance than is possible with a straight optical path in the constrained space of the main MRI coil bore. In embodiment, the system is configured with two or more cameras with a direct view of the optical tracking targets without the use of mirrors.

Six Degree-of-Freedom Measurement and Reporting Algorithm

In some embodiments, the MRI Head Tracker takes real-time input from two 2D imaging sensors and analyzes these data to determine and report motions in six degrees of freedom with minimal latency. This task can be performed by detecting and measuring the three centroid positions on the target and utilizing those positions with a reporting algorithm to determine the position of the patient's head.

Six-Degree-of-Freedom Coordinate System

Figure 4A:
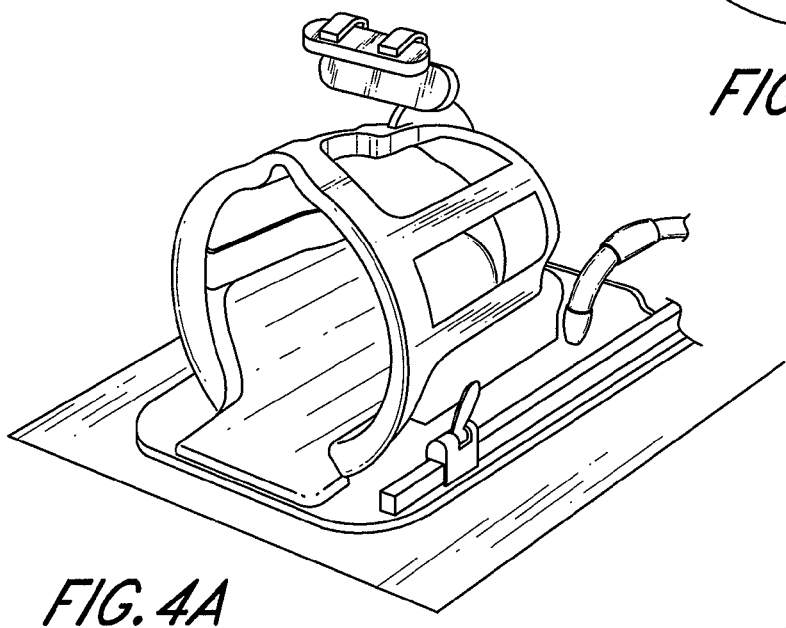
FIGS. 4A and 4B show how Cartesian coordinates are used relative to a patient's head for the purpose of tracking motions, according to some embodiments of the invention.
Figure 4B:
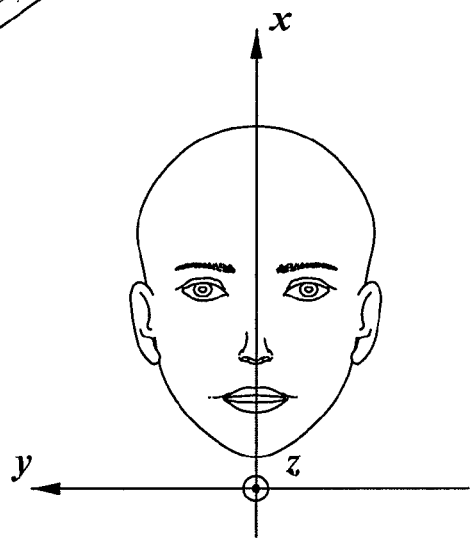

In an embodiment, the system is configured to use a coordinate system for reporting 6-DOF motions to the MRI field compensation system that is a Cartesian system aligned with the symmetry axis of the head coil as shown in FIGS. 4A and 4B. Head coil coordinate system shown in FIG. 4A is coincident with body coordinates in the nominal ("square") head position as shown in FIG. 4B. The z direction is into and out of the plane of the drawing. Target displacements and rotations are reported to the coil field compensation system using this system of coordinates.

Coordinate definitions are adopted by the same conventions used in defining aircraft motion, except that the rotation directions are taken to be right-handed (positive for counter-clockwise rotation about the basis direction vectors):

x is the longitudinal (chin-to-crown) direction, with values increasing toward the top of the head y is the transverse (left-to-right) direction, with increasing values toward the patient's right ear z is the up-down direction, with increasing values toward the ceiling $$\psi = \tan^{-1}\left(\frac{\Delta y}{\Delta x}\right)$$

is the yaw angle or right-handed rotation about the z-axis (head lean toward shoulder while facing forward, zero at normal "square" position, positive values for patient leaning toward patient's right shoulder)

$$\theta = \tan^{-1}\left(\frac{\Delta x}{\Delta z}\right)$$

is the pitch angle or right-handed rotation about the y-axis (nodding "yes," zero at normal "square" position, positive values for patient looking "upward")

$$\varphi = \tan^{-1}\left(\frac{-\Delta y}{\Delta z}\right)$$

is the roll angle or right-handed rotation about the x-axis (shaking the head "no," zero at normal "square" position, positive values for patient looking toward patient's left side).

The origin of coordinates and angle zero references are arbitrary, as only relative motions are reported, however two convenient reference origin positions exist: 1) at the center of the target in its normal ("square") head position, and 2) at the base of the neck at the point where the head swivels for nod, turn and lean motions. The latter is adopted here (as shown in FIG. 2), simply for ease in orthogonalizing the set of principal observation parameters with common motion directions in the 6-DOF decomposition algorithm.

Target Displacement Equations

The full 6-DOF translation is composed of a 3-D displacement as well as a 3-axis rotation. To first order we assume that the skull moves as a rigid body about a single rotation point somewhere in the neck. From this point the translation becomes separable from the rotation, so this is chosen as the coordinate origin. The rotations are separated into roll, pitch and yaw as described above, and the translated position follows through rotation follows the Euler rotation matrix formulation as follows (using right-handed angle conventions). The x, y, and z displacement coordinates then follow the independent translations:

$$\begin{pmatrix} x' \\ y' \\ z' \end{pmatrix} = \begin{pmatrix} 1 & 0 & 0 \\ 0 & \cos\varphi & -\sin\varphi \\ 0 & \sin\varphi & \cos\varphi \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} \cos\psi & -\sin\psi & 0 \\ \sin\psi & \cos\psi & 0 \\ 0 & 0 & 1 \end{pmatrix} \begin{pmatrix} x \\ y \\ z \end{pmatrix} + \begin{pmatrix} \Delta x \\ \Delta y \\ \Delta z \end{pmatrix}.$$

Decomposing the six independent translations from the absolute and relative displacements of the measured target centroids is the subject of this effort. The 2D inverse problem is somewhat more difficult than the 3D problem, in that after the target centroid projections in focal plane row and column are determined, significant degeneracies remain in the unfolding matrices for each camera. Combining the data from both cameras removes these degeneracies through a series of interrelated, nonlinear equations. The fastest procedure for solving this inverse problem is obtained by the Newton-Raphson method or a variant thereof, whereby an approximate first-order solution is proposed and tested against the known (measured) centroid locations on the two camera focal planes. The residual error is divided by the local derivatives with respect to each component of rotation and translation, to determine an iterative correction. The first-order solution is chosen by considering the features of the projected target pattern which are most strongly affected by a single rotation angle or displacement, and linearizing the inversion problem along these feature axes.

A 6-DOF motion simulation and decomposition algorithm was developed and tested to allow simulation of arbitrary motions and then verify the ability of a pair of orthogonal cameras to decompose centroid measurements at the 0.1-pixel level into distinct x, y, z, roll, pitch and yaw components at the requisite level of accuracy.

Six-Degree-of-Freedom Motion Determination Algorithm

General subject motion is a superposition of translation along x, y, and z as well as rotation about the x, y and z axes (designated roll, pitch and yaw respectively). Displacements along each of these degrees of freedom are not sensitive to coordinate system origin; however it is convenient (as explained above) for modeling purposes to place an origin near the region of the spine about which the head rotates and swivels, and a secondary reference point at the center of the optical tracking target in the nominal ("correct") head position and orientation. This secondary reference is typically offset from the spinal origin by ~10 cm in x and ~10 cm in z.

Figure 5:
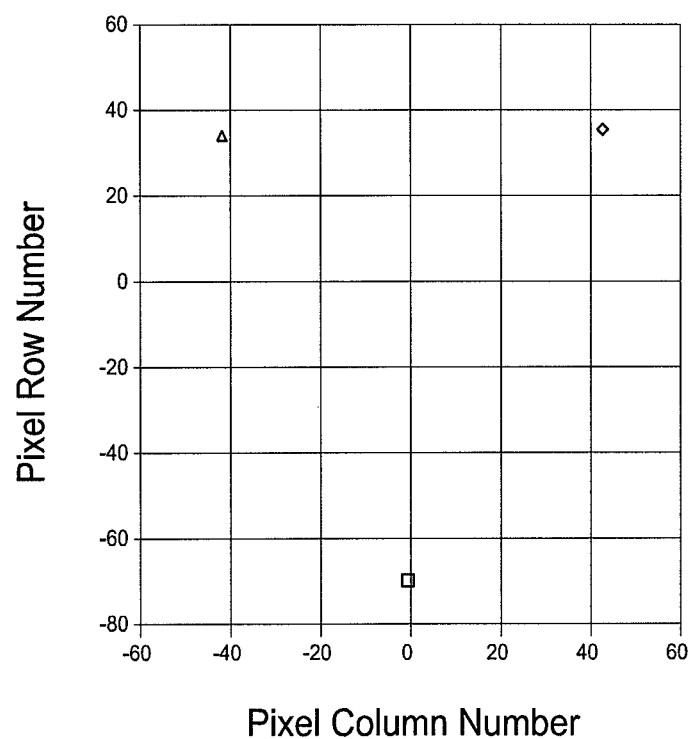
FIG. 5 shows how three points of the precision optical target are imaged on the focal plane of each of the two cameras, according to some embodiments of the invention.

The target shown in FIG. 1, as viewed from a single camera, appears as three sets of concentric ellipses with centroids projected onto three different positions (column, row) on the camera focal plane. The camera is centered along the (x=constant) plane of the target and aligned such that the central pixel row images this plane, at an angle of 45 degrees with respect to both the y and z axes and with the nominal target center projected to the central pixel column. Using a camera with 7.4 micron pixels and a 25 mm lens, positioned at a distance of 14.1 inches from the nominal target center, centroids from the vertices of an equilateral triangle target with sides of length 0.5 inches are projected onto the camera focal plane as shown in FIG. 5. This figure shows projected positions of target centroids for a target with sets of concentric circles arranged about the vertices of an equilateral triangle of side length 0.5 inches, using a camera focal length 25 mm, pixel pitch 7.4 microns and view angle 45 degrees (camera to right and above paper), aligned with the camera centerline. The 45-degree view angle results in the foreshortening of the equilateral triangle from left to right across the focal plane.

Yaw

Figure 6:
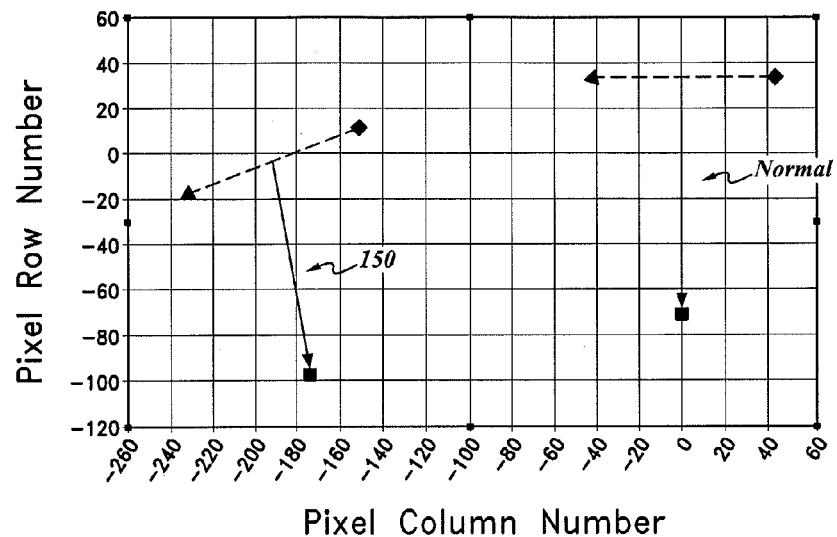
FIG. 6 shows the results on one camera image of a 15 degree yaw movement (about the z-axis), according to some embodiments of the invention.

Rotation about the z-axis is designated as yaw; a positive or "right handed" rotation about this axis (head leaning to subject's right shoulder) results in a counterclockwise rotation of the target. Because this rotation usually occurs about a point lower in the neck, it is typically accompanied by a translation to the subject's right side (camera left), as seen in FIG. 6. Projected positions of target centroids for same conditions as FIG. 5, but before and after inducing a yaw of 15 degrees.

The median of the centered target triangle (as shown at the right in FIG. 6) is aligned approximately with a single column of camera pixels, but is rotated out of this alignment (as shown at the left side of FIG. 6) by yaw. For the camera, lens, target distance and target size described above, a yaw of only 0.1 degrees results in a relative displacement of 0.13 pixel columns between the two ends of the median. Assuming that the centroid algorithm is able to determine position of the triangle vertices to 0.1 pixels in row and column, the yaw angle determination is measurable down to and accurate to about 0.1 degrees.

Pitch

Rotation about the y-axis is designated as pitch; a positive or "right-handed" rotation about this axis (head tipped back) results in motion of the target upward off the gantry (+z) and toward the top of the head (+x). For a single camera this projection is not easily distinguishable from a simultaneous target displacement in x and y (see FIG. 7), but for two cameras at opposite sides of the head the apparent y-displacement is in the opposite direction, removing this degeneracy. A second degeneracy with pitch rotation remains, for simultaneous target translation in +x and +z—this is discussed in more detail later—but the tilt of the target plane during a pitch rotation yields a small difference in the amount of translation of the base of the target triangle relative to its apex, thus resulting in a slight apparent rotation of the target triangle as shown in FIG. 7, which is not a characteristic of simple translation. This becomes in some embodiments the defining characteristic of pitch motion.

Figure 7A:
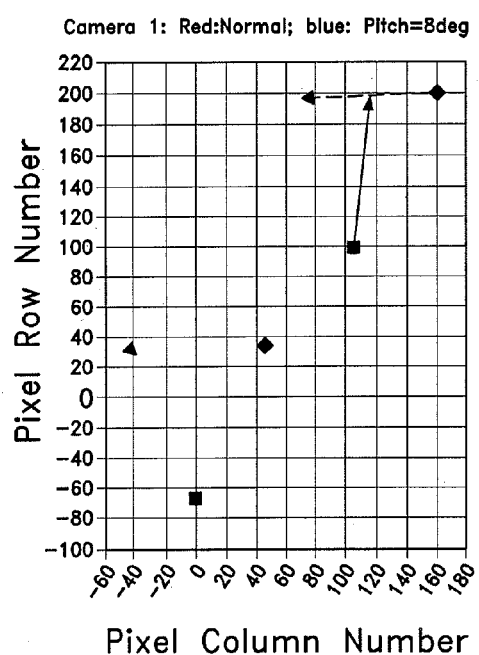
FIGS. 7A and 7B shows how two cameras are able to monitor precisely a pitch movement (about the y-axis), according to some embodiments of the invention.
Figure 7B:
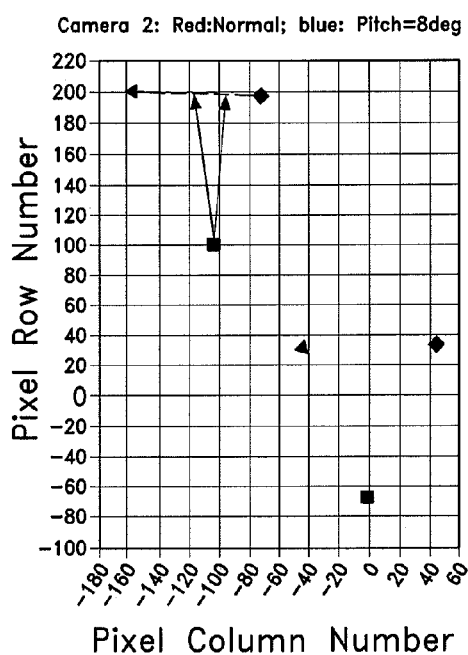

FIGS. 7A and 7B show the projected positions of target centroids for same conditions as FIG. 5, but before and after a target pitch of 8 degrees. Left is view from a camera at the left side and above the paper, right is view from a camera at the right side and above the paper. In each case motion away from the gantry (+z) makes the target appear more distant from the observer.

Roll

Rotation about the x-axis is designated as roll; a positive or "right-handed" rotation about this axis (head pointing toward subject's left side) results in a motion of the target toward the subject's left (−y). For a single camera this motion is not easily distinguishable from a displacement in y (see FIG. 8), but for two cameras the difference in position and in apparent foreshortening of the triangle is much more pronounced for rotation than for translation. This is because the roll moves the target plane closer to normal incidence with one camera sightline and further from normal incidence with the other camera sightline, at a rate which is much larger than that for a simple translation (or yaw). There is a significant degeneracy between roll and simultaneous +y and +z translation which is only resolved comparing the lengths of the triangle base as seen between the two cameras. A large difference in the base lengths is a characteristic of roll motions and not a characteristic of y+z translation, hence this is the distinguishing characteristic for roll.

Figure 8A:
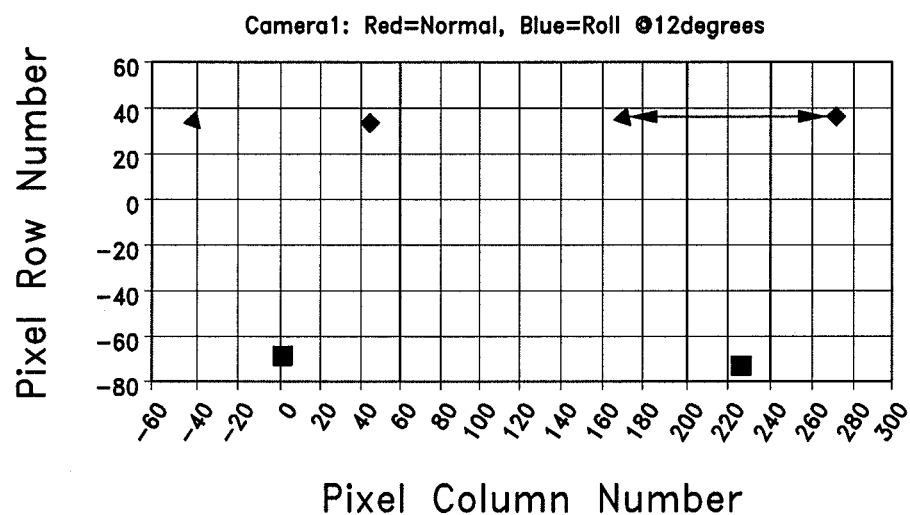
FIGS. 8A and 8B show how a roll movement (about the x-axis) is monitored, according to some embodiments of the invention.
Figure 8B:
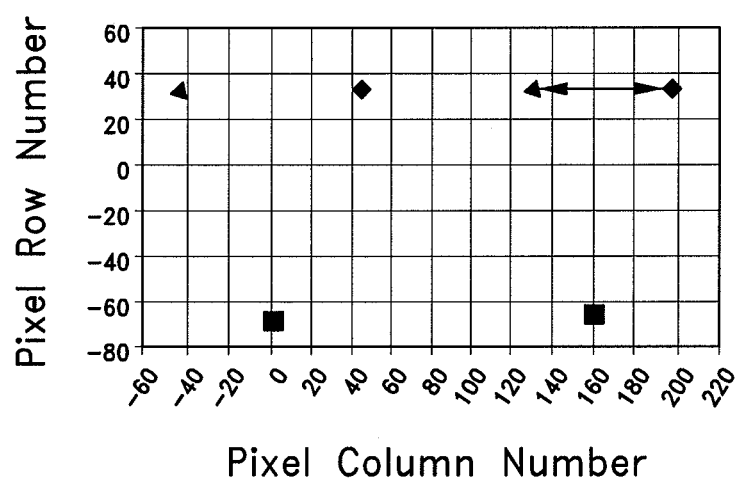

As shown in FIGS. 8A and 8B the projected positions of target centroids for same conditions as for FIG. 5, but before and after target roll of 12 degrees. Left is view from a camera at the left side and above the paper, right is view from a camera at the right side and above the paper. The camera at the left side sees much wider triangle because target plane is closer to normal to this camera sightline. The camera at the left also sees much larger displacement of triangle center.

X-Axis Translation

Figure 9:
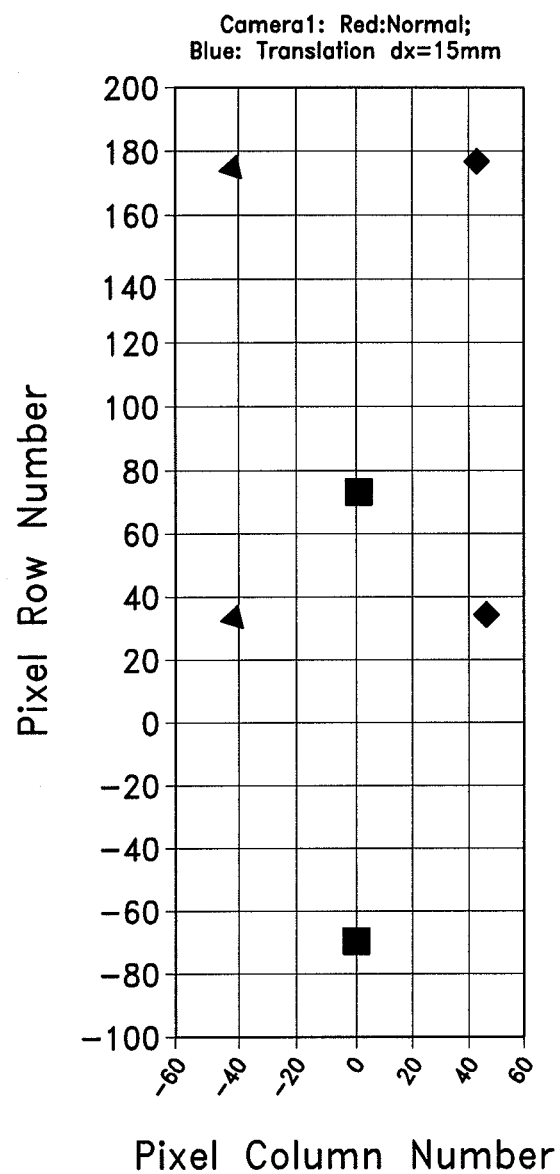
FIG. 9 shows how x-axis translation (positive toward the top of the patient's head) is monitored on one camera, according to some embodiments of the invention.

Translation along the x-axis (positive toward top of head) results in a motion of the target along the vertical direction of the camera focal plane (see FIG. 9). Unlike for pitch rotation (which also involves a translation in z), the target does not move significantly between pixel columns, and rotation of the target triangle is minimal. This up-down camera translation without accompanying rotation is the distinguishing characteristic of x-axis translation. FIG. 9 shows the projected positions of target centroids for same conditions as for FIG. 5, but before and after target translation of 12 mm in x.

Y-Axis Translation

Figure 10A:
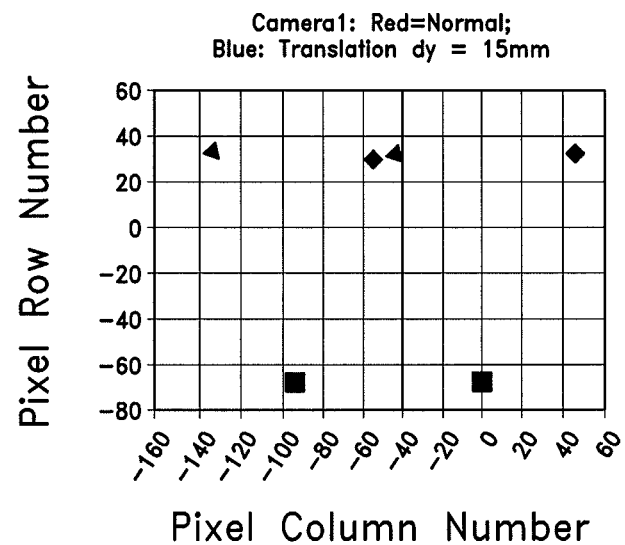
FIGS. 10A and 10B shows the effect of y-axis translation (positive to the patient's right side) as monitored on the two cameras, according to some embodiments of the invention.
Figure 10B:
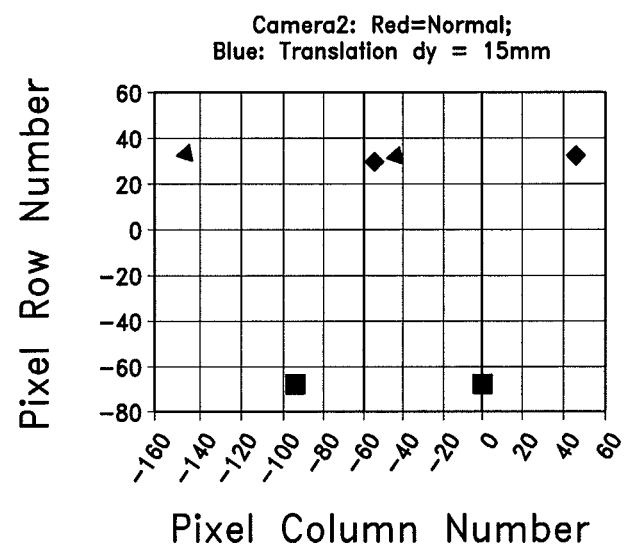

Translation along the y-axis (positive toward subject's right side) results in a motion of the target along the horizontal axis of the camera focal plane (see FIGS. 10A and 10B). Unlike for roll (which also involves a differential rotation of the target plane as seen by the left and right side cameras), the target's projected size, displacement and rotation varies only slightly between left and right camera views for y-axis translation; this is the distinguishing characteristic for y-displacement. FIGS. 10 A and 10B show projected positions of target centroids for same conditions as FIG. 5, but before and after target translation of 15 mm along y-axis. Left is view from a camera at the left side and above the paper, right is view from a camera at the right side and above the paper. Unlike roll, target displacements and sizes are similar for two cameras viewing y-axis translation.

Z-Axis Translation

Figure 11A:
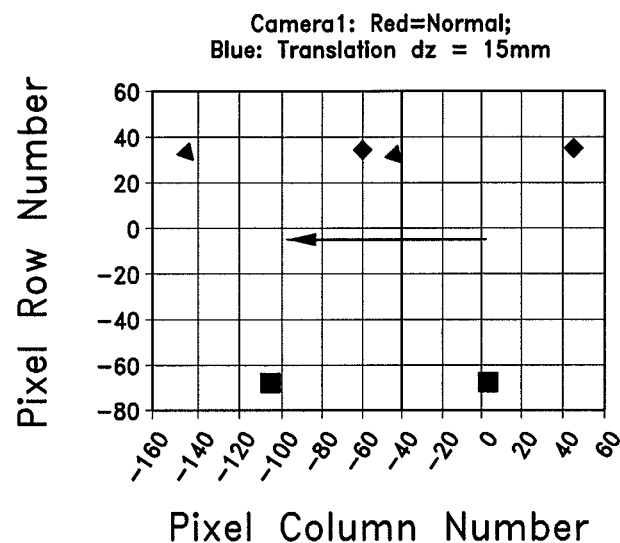
FIGS. 11A and 11B show the effect of z-axis translation (toward the ceiling), according to some embodiments of the invention.
Figure 11B:
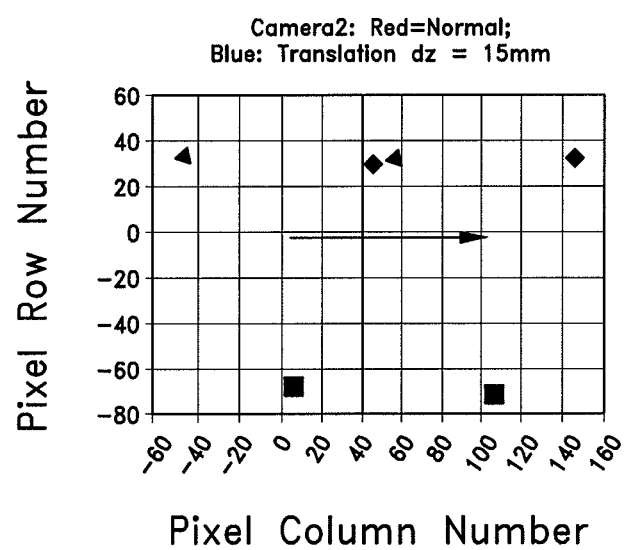

Translation along the z-axis (positive toward the ceiling) results in apparent motion of the target along the horizontal axis of the camera focal plane. Unlike for y translation, however, the direction of the horizontal displacement is opposite between the left-side and right-side cameras (see FIGS. 11A and 11B). This is the distinguishing characteristic for z-axis translation. FIGS. 11A and 11B show projected positions of target centroids for same conditions as for FIG. 5, but before and after target translation of 15 mm along the z-axis. Left is view from a camera at the left side and above the paper, right is view from a camera at the right side and above the paper. Unlike translation along y, apparent target displacement is in opposite direction in two camera views.

Non-Degenerate Target Motion Parameters

Pitch Versus (X+Z) Translation Degeneracy

Figure 12A:
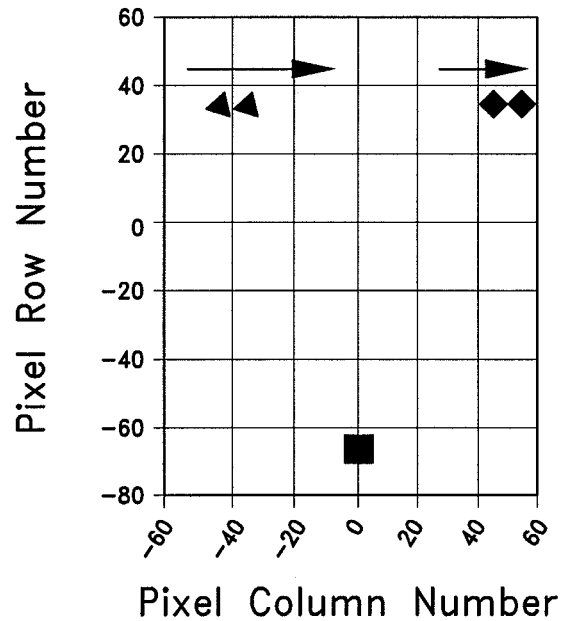
FIGS. 12 A and 12B show the effect of simultaneous pitch and x-axis and z-axis translation, according to some embodiments of the invention.
Figure 12B:
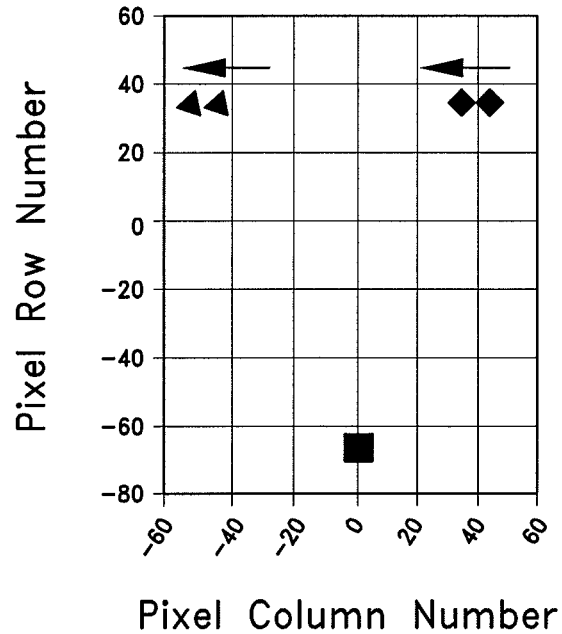

Pitch is nearly degenerate with simultaneous x and z translation, except for a small tilt in the triangle vertical which results from the tilt of the target plane about the y axis. This tilt creates an apparent clockwise rotation of the triangle from the left-side view and an apparent counter-clockwise rotation from the right side view, as shown in FIGS. 12A and 12B. These drawings show projected positions of target centroids for same conditions as FIG. 5, but before and after target pitch of 4 degrees and translations in x and z of −9.5 mm and +7.8 mm respectively. FIG. 12A is view from a camera at the left side and above the paper, FIG. 12B is view from a camera at the right side and above the paper. The camera at left sees triangle rotated clockwise, with upper vertices rotated away from the camera because of an increase in z relative to the lower vertex. The camera at the right sees triangle rotated counterclockwise for the same reason. For a pitch motion of 0.1 degrees accompanied by translations in x and z of −0.244 mm and 0.187 mm respectively, the triangle apex centroid does not move in either camera view. However, in this case, the left-side camera sees the triangle base displaced by 0.13 pixels to the right while the right-side camera sees the triangle base displaced by 0.13 pixels to the left. Assuming the centroiding routine can locate the vertices of the target triangle to an accuracy of 0.1 pixels, a pitch as small as 0.1 degrees is distinguishable from a simple translation by comparison of the vertical tilts.

Roll Versus (Y+Z) Translation Degeneracy

Figure 13A:
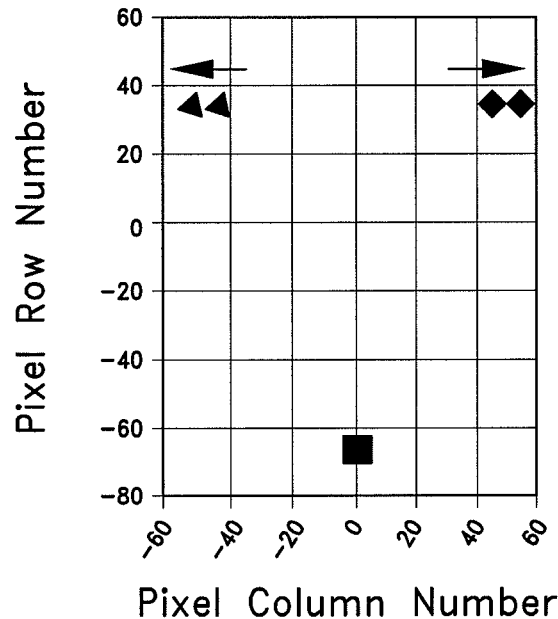
FIGS. 13A and 13B show the effect of simultaneous roll and y-axis and z-axis translation, according to some embodiments of the invention.
Figure 13B:
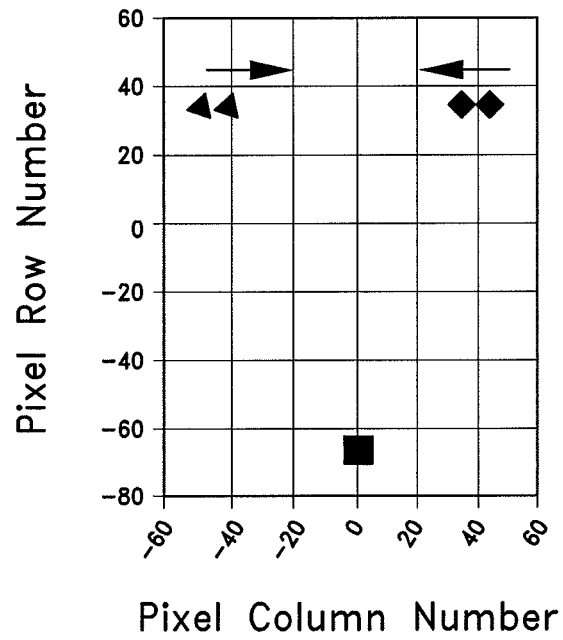

Roll is nearly degenerate with simultaneous y and z translation, except for larger camera-to-camera differences in apparent target size encountered with roll, resulting from tilt of the target's plane about the x-axis. A significant difference in the apparent length of the target triangle base is a reliable distinguishing characteristic of roll motion rather than simple translation. FIGS. 13A and 13B show projected positions of target centroids for the same conditions as in FIG. 5, but before and after target roll of 4 degrees and translations in y and z of 9.75 mm and 0.34 mm respectively. FIG. 13A is view from a camera at the left side and above the paper, FIG. 13B is view from a camera at the right side and above the paper. Camera at left sees triangle base shrink due to rotation about the x-axis away from camera normal, while camera at right sees triangle base grow due to rotation toward camera normal.

For a roll of 0.1 degrees and translations in y and z of −0.244 mm and 0.0002 mm respectively, the lower centroid is unchanged in both camera views. In this case, the left-side camera sees the target triangle base shrink by 0.15 pixels while the right-side camera sees the triangle base grow by 0.15 pixels. Assuming the centroiding routine can locate the target centroids to an accuracy of 0.1 pixels, shifts of 0.14 pixels should be discernible, so a pitch as small as 0.1 degrees is distinguishable from a simple translation by comparison of the length of the target triangle base.

Six-Degree-of-Freedom Motion Determination Algorithm Architecture

Complementary Projections Versus Stereo Imaging

The target size, rotation angles and translation vector determine the relative displacement of the three target centroids precisely in three dimensions. Precise knowledge of camera and lens parameters (e.g., pixel pitch, lens focal length and radial distortion, camera location and orientation relative to nominal target position), are then sufficient to predict the location of the target centroid projections to better than 0.1 pixels in row and column for each camera. In principle, the inverse problem should be equally simple; the stereo view of the centroid projections determine the 3D location in space of each target centroid, and the 6-DOF displacement vector can then be determined through a simple matrix inversion. In practice, however, this approach leads to expensive and complicated requirements on camera pixel density, pixel count, camera alignment and camera calibration. An alternate unfolding approach dispenses with stereo ranging and uses the two camera projections separately without strict requirements on precise matching of camera alignment and magnification, to determine the 6-DOF displacement vector to within 0.1 degrees in each rotation angle and 0.1 mm along each translation axis. This approach relaxes the pixel density and count requirements by about a factor of 20 relative to the stereo approach, resulting in significant savings in cost and processing speed.

Even for this 2D approach some basic measurements can be made to calibrate camera parameters once the cameras are integrated with the head coil; these can be easily performed at the manufacturing facility. These measurements include the projected pixel location of a single reference point on both cameras, as well as the camera magnification factors for pixel displacement per degree of rotation in pitch, yaw and roll, and per mm of translation along x, y and z. However, as stated before, it is not necessary that the cameras be exactly aligned in space (e.g. perfectly normal) or that their magnifications (lens focal length and distance to reference point) be identical, as has been easily verified by simulation.

Inversion Equations

The 2D inversion problem is somewhat more difficult than the 3D problem, in that after the target centroid projections in focal plane row and column are determined, significant degeneracies remain in the unfolding matrices for each camera. Combining the data from both cameras removes these degeneracies through a series of interrelated, nonlinear equations. The fastest procedure for solving this inverse problem is obtained by a variant of the Newton-Raphson method, whereby an approximate first-order solution is proposed and tested against the known (measured) centroid locations on the two camera focal planes. The residual error is divided by the local derivatives with respect to each component of rotation and translation, to determine an iterative correction. The first-order solution is chosen by considering the features of the projected target pattern which are most strongly affected by a single rotation angle or displacement, and linearizing the inversion problem along these feature axes.

6-DOF Extraction Algorithm

The method for extracting the 6 degree of freedom displacement matrix from the observed target location on two focal plane cameras is described.

Step 1: Characterizing the Target Images

The optical target consists of elliptical targets shown in FIG. 1A that are drawn so as to appear as circular patterns when imaged at 45 degrees by the two cameras shown in FIG. 2A. The center of each of the three circular patterns define one of the three vertices of an equilateral triangle at the focal plane of each of the two cameras. A centroid calculation routine determines the positions of the centroids at each of the three vertices, on each of two independent cameras. These centroids are displayed on a computer monitor displaying the 640×480 pixels of each of the two cameras. FIG. 5 shows the three vertices being displayed on one of the cameras. These vertex positions are designated $(X_{i,j}, Y_{i,j})$, for vertex index i from 1 to 3, and camera index j from 1 to 2, resulting in twelve measured coordinates. From the twelve measured coordinates, and initialized values of these coordinates, six principal quantities are computed to characterize the two camera views of the equilateral triangle target:

a) $\Sigma_{HD}$—the sum of the horizontal displacements (in pixels) of the target center on camera 1 and camera 2; the formula used is $$\sum_{i=1}^{3} \sum_{j=1}^{2} (X_{i,j} - X_{0i,j}),$$

where $X_{0i,j}$ is the initial (zero displacement) horizontal camera coordinate of each centroid projection b) $\Delta_{HD}$—the difference between the horizontal displacements (in pixels) of the target center for camera 1 and camera 2; the formula used is $$\sum_{i=1}^{3} (X_{i,1} - X_{0i,1}) - (X_{i,2} - X_{0i,2}).$$

c) $\Sigma_{VD}$—the sum of the vertical displacements (in pixels) of the target center for camera 1 and camera 2; the formula used is $$\sum_{i=1}^{3} \sum_{j=1}^{2} (Y_{i,j} - Y_{0i,j}),$$

where $Y_{0i,j}$ is the initial (zero displacement) vertical camera coordinate of each centroid projection.

d) $\Delta_{BL}$—the difference in the apparent base length of the target triangle (in pixels) for camera 1 and camera 2; the formula used is $$\{\sqrt{(X_{3,1}-X_{1,1})^2+(Y_{3,1}-Y_{1,1})^2} - \sqrt{(X_{3,2}-X_{1,2})^2+(Y_{3,2}-Y_{1,2})^2}\}.$$

e) $\Sigma_{MT}$—the sum of the apparent median tilt of the target triangle (offset in horizontal pixels between center-of-base and apex) for camera 1 and camera 2; the formula used is $$\sum_{j=1}^{2} \left\{\left(X_{2,j} - \frac{X_{3,j} + X_{1,j}}{2}\right) - \left(X_{02,j} - \frac{X_{03,j} + X_{01,j}}{2}\right)\right\}.$$

f) $\Delta_{MT}$—the difference between the apparent median tilt of the target triangle (in pixels) for camera 1 and camera 2; the formula used is $$\left\{\left(X_{2,1} - \frac{X_{3,1} + X_{1,1}}{2}\right) - \left(X_{02,1} - \frac{X_{03,1} + X_{01,1}}{2}\right)\right\} - \left\{\left(X_{2,2} - \frac{X_{3,2} + X_{1,2}}{2}\right) - \left(X_{02,2} - \frac{X_{03,2} + X_{01,2}}{2}\right)\right\}$$

Step 2: Characterizing Global Variation in Principal Quantities with 6-DOF Motions Partial derivatives relative to subject displacements and rotations $(\phi,\theta,\psi,\Delta x,\Delta y,\Delta z)$, of the principal quantities described above, about the initial (non-displaced) position, are computed numerically. Here:

Roll $\phi$ is right-handed rotation about the x-axis

Pitch $\theta$ is right-handed rotation about the y-axis

Yaw $\psi$ is right-handed rotation about the z-axis $\Delta x$ is toe-to-head direction $\Delta y$ is left-to-right direction $\Delta z$ is down-to-up direction Starting from an initial target position in 3-D world space, defined as $(\phi,\theta,\psi,\Delta x,\Delta y,\Delta z)=(0,0,0,0,0,0)$, the initial target vertex world coordinates $(x_{0i},y_{0i},z_{0i})$ are determined for vertex index i=1 to 3, based on the geometric size and shape of the target triangle and definition of a convenient coordinate origin.

Local partial derivatives of each of the principal quantities, with respect to each of the 6 degrees of freedom (roll, pitch, yaw, dx, dy, dz), are performed numerically by evaluating changes in these quantities for small increments in each degree of freedom. Changes in the target vertex positions for specified motions along the six degrees of freedom are computed using the Euler rotation matrices and translation vector:

$$\begin{pmatrix} x_i \\ y_i \\ z_i \end{pmatrix} = \begin{pmatrix} 1 & 0 & 0 \\ 0 & \cos\varphi & -\sin\varphi \\ 0 & \sin\varphi & \cos\varphi \end{pmatrix} \begin{pmatrix} \cos\theta & 0 & \sin\theta \\ 0 & 1 & 0 \\ -\sin\theta & 0 & \cos\theta \end{pmatrix} \begin{pmatrix} \cos\psi & -\sin\psi & 0 \\ \sin\psi & \cos\psi & 0 \\ 0 & 0 & 1 \end{pmatrix} \begin{pmatrix} x_{0i} \\ y_{0i} \\ z_{0i} \end{pmatrix} + \begin{pmatrix} \Delta x \\ \Delta y \\ \Delta z \end{pmatrix} \quad [1]$$

Subsequently, the camera projections of these new target vertex positions are determined using a geometric projection calculation. Given accurate knowledge of camera positions, pixel size and lens focal length, the horizontal and vertical pixel numbers on each camera focal plane (camera index j equal to 1 or 2) that these new 3-D positions in space should project onto is as follows:

$$X_{i,j} = X_{0,j} + \left(\frac{f.l.}{s_{pix}}\right) \sin\alpha_{i,j} \cos\beta_{i,j}, \quad [2]$$

$$Y_{i,j} = Y_{0,j} + \left(\frac{f.l.}{s_{pix}}\right) \sin\alpha_{i,j} \sin\beta_{i,j}$$

Here $X_{i,j}$ and $Y_{i,j}$ are the horizontal and vertical pixel numbers for translated target vertex i projected onto the camera j sensor, $X_{0,j}$ and $Y_{0,j}$ are the horizontal and vertical number of the pixel column and row intersected by the optical axis of that camera (typically at or very near the camera center), f.l. and $s_{pix}$ are the lens focal length and camera pixel pitch, and the angles $\alpha_{i,j}$ and $\beta_{i,j}$ are the polar and azimuth angles locating target vertex i, relative to the camera j focal axis. These angles are calculated from the vertex world coordinates as follows:

$$\alpha_{i,j} = \sin^{-1}\left(\frac{\sqrt{(x_{\perp,j} - x_i)^2 + (y_{\perp,j} - y_i)^2 + (z_{\perp,j} - z_i)^2}}{\sqrt{(x_{cj} - x_i)^2 + (y_{cj} - y_i)^2 + (z_{cj} - z_i)^2}}\right), \quad [3]$$

$$\beta_{i,j} = \pm\cos^{-1}\left(\frac{(x_{\perp,j} - x_i)(y_{cj} - y_0) - (y_{\perp,j} - y_i)(x_{cj} - x_0)}{\sqrt{(x_{\perp,j} - x_i)^2 + (y_{\perp,j} - y_i)^2 + (z_{\perp,j} - z_i)^2} \sqrt{(x_{cj} - x_0)^2 + (y_{cj} - y_0)^2}}\right), \quad [4]$$

where the point $(x_{\perp,j}, y_{\perp,j}, z_{\perp,j})$ is the point of intersection between the camera optical axis and the plane perpendicular to the optical axis which includes the translated target vertex $(x_\perp i, y_\perp i, z_\perp i)$:

$$x_{\perp,j} = x_0 + \kappa(x_{cj} - x_0); \quad y_{\perp,j} = y_0 + \kappa(y_{cj} - y_0); \quad z_{\perp,j} = z_0 + \kappa(z_{cj} - z_0), \quad [5]$$

with $(x_\downarrow cj, y_\downarrow cj, z_\downarrow cj)$ defining the 3-D position of camera j, $(x_\downarrow 0, y_\downarrow 0, z_\downarrow 0)$ defining the nominal boresight position of both cameras at the un-displaced target center and the constant $\kappa$ based on geometric projection and given by:

$$\kappa = \left\{ \frac{(x_{cj}-x_0)(x_i-x_0)+(y_{cj}-y_0)(y_i-y_0)+(z_{cj}-z_0)(z_i-z_0)}{(x_{cj}-x_0)^2+(y_{cj}-y_0)^2+(z_{cj}-z_0)^2} \right\}. \quad [6]$$

In equation [4], the inverse cosine function is taken to range from 0 to $\pi$, and the appropriate sign for $\beta_{i,j}$ is given by:

$$\text{sign}[\beta_{i,j}]=\text{sign}[(z_{cj}-z_i)\{(x_{cj}-x_0)(x_{\perp,j}-x_i)+(y_{cj}-y_0)(y_{\perp,j}-y_i)\}-(z_{\perp,j}-z_i)\{(x_{cj}-x_0)^2+(y_{cj}-y_0)^2\}]$$

During this determination of the camera projection of the 3-D target vertices, a compensation function may be applied for large values of the polar angle $\alpha_{i,j}$ to account for barrel distortion in the lens, based on prior lens calibration measurements. The geometric value for $\alpha_{i,j}$ is first computed based on equation [3] and then adjusted for lens distortion by way of a pre-determined look-up table or measured fit function, and this new compensated value for $\alpha_{i,j}$ is then used in the calculation of $X_{i,j}$ and $Y_{i,j}$ through equation [2].

To numerically evaluate the partial derivatives of the principal quantities about the initialized target position, the un-displaced 3-D target vertex coordinates $(x_{0i}, y_{0i}, z_{0i})$ are first projected to camera coordinates using equations [2] through [6] above, and initial values are computed for each of the principal quantities described in Step 1 (most should be zero or near-zero at the starting position). Then small increments of roll, pitch, yaw, x-, y- and z-axis displacements are introduced one at a time; for each increment the new world coordinates and the new camera projections of the target vertices are computed and the principal quantities are re-calculated. The change in each principal quantity is divided by the small angular or displacement increment to determine the partial derivative.

For instance, to determine the partial derivatives with respect to roll, the displacement vector $(\phi,\theta,\psi,\Delta x,\Delta y,\Delta z)=(\delta\phi,0,0,0,0,0)$ is introduced to the general displacement equation [1] to determine the translated target vertex positions $(x_i, y_i, z_i)$. The conversion to camera coordinates $(X_{i,j}, Y_{i,j})$ is then performed using equations [2] through [6], and the principal quantities are calculated as outlined in Step 1. The difference between each principal quantity and the corresponding value of that quantity for the un-displaced calculation is divided by the small increment in roll, to give the partial derivative of each quantity with respect to roll. To determine partial derivatives with respect to pitch, the displacement vector $(\phi,\theta,\psi,\Delta x,\Delta y,\Delta z)=(0,\delta\theta,0,0,0,0)$ is used to initiate the calculations, and so on for all six degrees of freedom.

Each of these six repetitions produces one column of the global partial derivative matrix:

$$\left. \begin{pmatrix} \frac{\partial \Sigma_{HD}}{\partial \varphi} & \frac{\partial \Sigma_{HD}}{\partial \theta} & \frac{\partial \Sigma_{HD}}{\partial \psi} & \frac{\partial \Sigma_{HD}}{\partial x} & \frac{\partial \Sigma_{HD}}{\partial y} & \frac{\partial \Sigma_{HD}}{\partial z} \\ \frac{\partial \Delta_{HD}}{\partial \varphi} & \frac{\partial \Delta_{HD}}{\partial \theta} & \frac{\partial \Delta_{HD}}{\partial \psi} & \frac{\partial \Delta_{HD}}{\partial x} & \frac{\partial \Delta_{HD}}{\partial y} & \frac{\partial \Delta_{HD}}{\partial z} \\ \frac{\partial \Sigma_{VD}}{\partial \varphi} & \frac{\partial \Sigma_{VD}}{\partial \theta} & \frac{\partial \Sigma_{VD}}{\partial \psi} & \frac{\partial \Sigma_{VD}}{\partial x} & \frac{\partial \Sigma_{VD}}{\partial y} & \frac{\partial \Sigma_{VD}}{\partial z} \\ \frac{\partial \Delta_{BL}}{\partial \varphi} & \frac{\partial \Delta_{BL}}{\partial \theta} & \frac{\partial \Delta_{BL}}{\partial \psi} & \frac{\partial \Delta_{BL}}{\partial x} & \frac{\partial \Delta_{BL}}{\partial y} & \frac{\partial \Delta_{BL}}{\partial z} \\ \frac{\partial \Sigma_{MT}}{\partial \varphi} & \frac{\partial \Sigma_{MT}}{\partial \theta} & \frac{\partial \Sigma_{MT}}{\partial \psi} & \frac{\partial \Sigma_{MT}}{\partial x} & \frac{\partial \Sigma_{MT}}{\partial y} & \frac{\partial \Sigma_{MT}}{\partial z} \\ \frac{\partial \Delta_{MT}}{\partial \varphi} & \frac{\partial \Delta_{MT}}{\partial \theta} & \frac{\partial \Delta_{MT}}{\partial \psi} & \frac{\partial \Delta_{MT}}{\partial x} & \frac{\partial \Delta_{MT}}{\partial y} & \frac{\partial \Delta_{MT}}{\partial z} \end{pmatrix} \right|_{(0,0,0,0,0,0)}$$

Step 3: Determining First-Order Displacement Vector

A first-order approximation to the displacement matrix is determined by multiplying the matrix of measured principal quantities, as determined in Step 1, by the inverse of the partial derivative matrix computed in Step 2:

$$\begin{pmatrix} \varphi_0 \\ \theta_0 \\ \psi_0 \\ (\Delta x)_0 \\ (\Delta y)_0 \\ (\Delta z)_0 \end{pmatrix} = \begin{pmatrix} \frac{\partial \Sigma_{HD}}{\partial \varphi} & \frac{\partial \Sigma_{HD}}{\partial \theta} & \frac{\partial \Sigma_{HD}}{\partial \psi} & \frac{\partial \Sigma_{HD}}{\partial x} & \frac{\partial \Sigma_{HD}}{\partial y} & \frac{\partial \Sigma_{HD}}{\partial z} \\ \frac{\partial \Delta_{HD}}{\partial \varphi} & \frac{\partial \Delta_{HD}}{\partial \theta} & \frac{\partial \Delta_{HD}}{\partial \psi} & \frac{\partial \Delta_{HD}}{\partial x} & \frac{\partial \Delta_{HD}}{\partial y} & \frac{\partial \Delta_{HD}}{\partial z} \\ \frac{\partial \Sigma_{VD}}{\partial \varphi} & \frac{\partial \Sigma_{VD}}{\partial \theta} & \frac{\partial \Sigma_{VD}}{\partial \psi} & \frac{\partial \Sigma_{VD}}{\partial x} & \frac{\partial \Sigma_{VD}}{\partial y} & \frac{\partial \Sigma_{VD}}{\partial z} \\ \frac{\partial \Delta_{BL}}{\partial \varphi} & \frac{\partial \Delta_{BL}}{\partial \theta} & \frac{\partial \Delta_{BL}}{\partial \psi} & \frac{\partial \Delta_{BL}}{\partial x} & \frac{\partial \Delta_{BL}}{\partial y} & \frac{\partial \Delta_{BL}}{\partial z} \\ \frac{\partial \Sigma_{MT}}{\partial \varphi} & \frac{\partial \Sigma_{MT}}{\partial \theta} & \frac{\partial \Sigma_{MT}}{\partial \psi} & \frac{\partial \Sigma_{MT}}{\partial x} & \frac{\partial \Sigma_{MT}}{\partial y} & \frac{\partial \Sigma_{MT}}{\partial z} \\ \frac{\partial \Delta_{MT}}{\partial \varphi} & \frac{\partial \Delta_{MT}}{\partial \theta} & \frac{\partial \Delta_{MT}}{\partial \psi} & \frac{\partial \Delta_{MT}}{\partial x} & \frac{\partial \Delta_{MT}}{\partial y} & \frac{\partial \Delta_{MT}}{\partial z} \end{pmatrix}^{-1} \begin{pmatrix} \Sigma_{HD} \\ \Delta_{HD} \\ \Sigma_{VD} \\ \Delta_{BL} \\ \Sigma_{MT} \\ \Delta_{MT} \end{pmatrix}.$$

Step 4: Characterizing Local Variation in Principal Quantities with 6-DOF Motions First order values for $(\phi,\theta,\psi,\Delta x,\Delta y,\Delta z)$ determined in Step 3 are entered into the translation equation [1] to determine the corresponding translated 3-D target position $(x_\downarrow i, y_\downarrow i, z_\downarrow i)$ for each of the three target vertices. These world coordinates are projected to camera coordinates $(X_{i,j}, Y_{i,j})$ using equations [2] through [6], and the principal quantities are re-calculated. These six quantities are compared against the measured values of these quantities determined in Step 1, to create a residual error matrix:

$(\sigma_{\Sigma_{HD}}, \sigma_{\Delta_{HD}}, \sigma_{\Sigma_{VD}}, \sigma_{\Delta_{BL}}, \sigma_{\Sigma_{MT}}, \sigma_{\Delta_{MT}})$.

Local partial derivatives of the principal quantities are calculated by introducing small increments in roll, pitch, yaw, x-, y- and z-axis displacements one at a time as before, but this time the increments are relative to the first-order displacement vector. For each increment, the new world coordinates and the new camera projections of the target vertices are re-computed and the principal quantities are re-calculated. The change in each principal quantity is divided by the small angular or displacement increment to determine a local partial derivative. For instance, to calculate partial derivatives with respect to roll, the first-order displacement vector $\{\phi_0,\theta_0,\psi_0,(\Delta x)_0,(\Delta y)_0,(\Delta z)_0\}$ is replaced by $\{\phi_0+\delta\phi,\theta_0,\psi_0,(\Delta x)_0,(\Delta y)_0,(\Delta z)_0\}$ and resulting changes to each of the principal quantities is divided by to determine the local derivative with respect to roll. This is repeated for each of the six degrees of freedom.

Each of these six repetitions produces one column of the new local partial derivative matrix:

$$\left.\begin{pmatrix} \frac{\partial \Sigma_{HD}}{\partial \varphi} & \frac{\partial \Sigma_{HD}}{\partial \theta} & \frac{\partial \Sigma_{HD}}{\partial \psi} & \frac{\partial \Sigma_{HD}}{\partial x} & \frac{\partial \Sigma_{HD}}{\partial y} & \frac{\partial \Sigma_{HD}}{\partial z} \\ \frac{\partial \Delta_{HD}}{\partial \varphi} & \frac{\partial \Delta_{HD}}{\partial \theta} & \frac{\partial \Delta_{HD}}{\partial \psi} & \frac{\partial \Delta_{HD}}{\partial x} & \frac{\partial \Delta_{HD}}{\partial y} & \frac{\partial \Delta_{HD}}{\partial z} \\ \frac{\partial \Sigma_{VD}}{\partial \varphi} & \frac{\partial \Sigma_{VD}}{\partial \theta} & \frac{\partial \Sigma_{VD}}{\partial \psi} & \frac{\partial \Sigma_{VD}}{\partial x} & \frac{\partial \Sigma_{VD}}{\partial y} & \frac{\partial \Sigma_{VD}}{\partial z} \\ \frac{\partial \Delta_{BL}}{\partial \varphi} & \frac{\partial \Delta_{BL}}{\partial \theta} & \frac{\partial \Delta_{BL}}{\partial \psi} & \frac{\partial \Delta_{BL}}{\partial x} & \frac{\partial \Delta_{BL}}{\partial y} & \frac{\partial \Delta_{BL}}{\partial z} \\ \frac{\partial \Sigma_{MT}}{\partial \varphi} & \frac{\partial \Sigma_{MT}}{\partial \theta} & \frac{\partial \Sigma_{MT}}{\partial \psi} & \frac{\partial \Sigma_{MT}}{\partial x} & \frac{\partial \Sigma_{MT}}{\partial y} & \frac{\partial \Sigma_{MT}}{\partial z} \\ \frac{\partial \Delta_{MT}}{\partial \varphi} & \frac{\partial \Delta_{MT}}{\partial \theta} & \frac{\partial \Delta_{MT}}{\partial \psi} & \frac{\partial \Delta_{MT}}{\partial x} & \frac{\partial \Delta_{MT}}{\partial y} & \frac{\partial \Delta_{MT}}{\partial z} \end{pmatrix}\right|_{\{\varphi_0, \theta_0, \psi_0, (\Delta x)_0, (\Delta y)_0, (\Delta z)_0\}}$$

Step 5: Determining Coarse Correction to First-Order Displacement Vector

A coarse correction is computed to improve the first-order displacement vector and reduce residual error, by multiplying the residual error matrix determined in Step 4 by the inverse of the local partial derivative matrix, also determined in Step 4:

$$\begin{pmatrix} \Delta \varphi \\ \Delta \theta \\ \Delta \psi \\ \Delta(\Delta x) \\ \Delta(\Delta y) \\ \Delta(\Delta z) \end{pmatrix} =$$

$$\begin{pmatrix} \frac{\partial \Sigma_{HD}}{\partial \varphi} & \frac{\partial \Sigma_{HD}}{\partial \theta} & \frac{\partial \Sigma_{HD}}{\partial \psi} & \frac{\partial \Sigma_{HD}}{\partial x} & \frac{\partial \Sigma_{HD}}{\partial y} & \frac{\partial \Sigma_{HD}}{\partial z} \\ \frac{\partial \Delta_{HD}}{\partial \varphi} & \frac{\partial \Delta_{HD}}{\partial \theta} & \frac{\partial \Delta_{HD}}{\partial \psi} & \frac{\partial \Delta_{HD}}{\partial x} & \frac{\partial \Delta_{HD}}{\partial y} & \frac{\partial \Delta_{HD}}{\partial z} \\ \frac{\partial \Sigma_{VD}}{\partial \varphi} & \frac{\partial \Sigma_{VD}}{\partial \theta} & \frac{\partial \Sigma_{VD}}{\partial \psi} & \frac{\partial \Sigma_{VD}}{\partial x} & \frac{\partial \Sigma_{VD}}{\partial y} & \frac{\partial \Sigma_{VD}}{\partial z} \\ \frac{\partial \Delta_{BL}}{\partial \varphi} & \frac{\partial \Delta_{BL}}{\partial \theta} & \frac{\partial \Delta_{BL}}{\partial \psi} & \frac{\partial \Delta_{BL}}{\partial x} & \frac{\partial \Delta_{BL}}{\partial y} & \frac{\partial \Sigma_{VD}}{\partial z} \\ \frac{\partial \Sigma_{MT}}{\partial \varphi} & \frac{\partial \Sigma_{MT}}{\partial \theta} & \frac{\partial \Sigma_{MT}}{\partial \psi} & \frac{\partial \Sigma_{MT}}{\partial x} & \frac{\partial \Sigma_{MT}}{\partial y} & \frac{\partial \Sigma_{MT}}{\partial z} \\ \frac{\partial \Delta_{MT}}{\partial \varphi} & \frac{\partial \Delta_{MT}}{\partial \theta} & \frac{\partial \Delta_{MT}}{\partial \psi} & \frac{\partial \Delta_{MT}}{\partial x} & \frac{\partial \Delta_{MT}}{\partial y} & \frac{\partial \Delta_{MT}}{\partial z} \end{pmatrix}^{-1} \begin{pmatrix} \sigma_{\Sigma_{HD}} \\ \sigma_{\Delta_{HD}} \\ \sigma_{\Sigma_{VD}} \\ \sigma_{\Delta_{BL}} \\ \sigma_{\Sigma_{MT}} \\ \sigma_{\Delta_{MT}} \end{pmatrix}.$$

The first-order displacement vector is incremented by the coarse correction matrix to create a better approximation to the displacement vector:

$$\{\varphi_0 + \Delta\varphi, \theta_0 + \Delta\theta, \psi_0 + \Delta\psi, (\Delta x)_0 + \Delta(\Delta x), (\Delta y)_0 + \Delta(\Delta y), (\Delta z)_0 + \Delta(\Delta z)\}.$$

Step 6: Performing Fine Correction to Determine Final 6DOF Displacement Vector

Steps 4 and 5 are repeated, starting with the coarse-corrected displacement vector, to determine a final fine correction to the displacement vector. After this iteration, the resultant fine correction increments are added to the coarse-corrected vector to create the final 6-DOF displacement vector. Empirical results from a general simulation indicate that this fine correction is sufficient in all cases to reduce residual errors to well below the stated 0.1-degree, 0.1-mm tolerances.

Algorithm Numerical Simulation to Verify Absolute Convergence

As cameras, targets and rotation stages are being procured and assembled, the 6 DOF decomposition algorithm can be coded and tested for a test set of rotations. It is clear that the routine will converge for small translations and rotations, but it can be potentially advantageous to determine whether there are limitations on its convergence for extreme displacements in all six degrees of freedom. To this end, we imagine an extreme target displacement, calculate the 3D position of the displaced target, calculate the centroid positions that will be seen on each of the two cameras, and run the decomposition algorithm to determine speed of convergence.

In some embodiments, to demonstrate absolute convergence of the iterative 6DOF unfolding algorithm, the simulation is started with a test set of very large rotations and displacements, as listed in Table 1 below.

TABLE 1

Example of a set of extreme angular rotations and linear translations of an imaginary patient for purposes of testing algorithm convergence.

| | |
|---|---|
| Head Yaw (Lean) Psi (deg toward patient's right shoulder) | 8.0000 |
| Head Pitch (Nod) Theta (deg relative to level; pos is toward top of head) | −15.0000 |
| Head Roll (Shake) Phi (deg relative to square; pos toward patient's left side) | 12.0000 |
| Head shift dx (mm toward top of head) | −9.0000 |
| Head shift dy (mm to patient's right) | 3.0000 |
| Head shift dz (mm away from table) | 7.0000 |

The simulation begins by determining the locations of the displaced centroids that will be seen by each camera, allowing for some degree of mispointing and misalignment of each camera. The original (nominal) target location is rotated and displaced by the Euler rotation formalism presented in Section 2.5.2.2, to determine the three displaced target centroid locations in three-dimensional space. Next these "world coordinates" are translated to 2-D "camera coordinates" for each of the two cameras independently, as described in the same Section.

Assuming the target is imaged into these camera coordinates, but that the operator has no prior knowledge of the displacement matrix giving rise to this target position, we use the algorithm as described in Section 2.5.2 from end to end to recreate the displacement matrix. By the end of Step 3 (Section 2.5.2.3), the algorithm returns an initial estimate of the 6DOF displacement vector, as shown in Table 2 below.

TABLE 2

First estimate of 6DOF displacement based on method described in Section 2.5.2.

| | |
|---|---|
| First Approximation Yaw (degrees) | 4.4313 |
| First Approximation Pitch (degrees) | −19.4474 |
| First Approximation Roll (degrees) | 8.8784 |
| First Approximation X displacement (mm) | −6.4257 |
| First Approximation Y displacement (mm) | −2.5639 |
| First Approximation Z displacement (mm) | −5.9428 |

As expected, residual errors at this stage are atypically large, due to the extreme magnitudes of the translations and rotations chosen for this simulation along and about each axis; this situation creates a good test for absolute convergence of the Newton Raphson algorithm methodology. Assuming this estimate to be correct, the algorithm in Step 4 (Section 2.5.2.4) again calculates the displaced position of the target, the resulting centroid positions seen by each camera, and the principal quantities (vertical tip sum and difference, base length difference, vertical displacement sum, and horizontal displacement sum and difference) which would result, for comparison with the actual observed values. The residual errors, in pixels, and the local derivatives of each of the principal values for small changes (pixels per 0.1 degrees) in yaw, pitch, and roll, and for small changes (pixels per 0.1 mm) in dx, dy and dz are calculated as described in Section 2.5.2.4, and tabulated as shown in Table 3 below.

TABLE 3

Residual Error (in pixels) and local derivatives with respect to Yaw, Pitch, Roll (pixels per 0.1 deg), x-displacement, y-displacement, and z-displacement (pixels per 0.1 mm), of the principal quantities Vertical Tip Sum, Vertical Tip Difference, Base Length Difference, Vertical Displacement Sum, Horizontal Displacement Sum, and Horizontal Displacement Difference.

| | $\partial/\partial Y$ | $\partial/\partial P$ | $\partial/\partial R$ | $\partial/\partial x$ | $\partial/\partial y$ | $\partial/\partial z$ | Residual Error |
|---|---|---|---|---|---|---|---|
| VT1 + VT2 | 0.2575 | 0.0383 | −0.0994 | 0.0021 | 0.0045 | 0.0021 | −8.6558 |
| VT1 − VT2 | 0.0657 | −0.2756 | −0.0131 | 0.0006 | 0.0018 | 0.0274 | 6.8709 |
| BL1 − BL2 | −0.3223 | 0.0277 | 0.4988 | 0.0109 | −0.0702 | 0.0106 | −2.9918 |
| VD1 + VD2 | −0.3118 | 5.8134 | 0.0350 | 1.8843 | 0.0112 | −0.2223 | −168.5591 |
| HD1 + HD2 | −2.5875 | −0.1680 | 3.8651 | 0.0117 | −1.3090 | −0.0124 | 58.1859 |
| HD1 − HD2 | −0.5823 | 1.4452 | 0.7697 | −0.0140 | −0.1114 | −1.4280 | 120.7937 |

The matrix of derivatives at the left of Table 3 is inverted and multiplied by the residual error vector at the right, to yield first-order corrections to the initial estimate of the displacement vector, as described in Section 2.5.2.5, and as shown at the left of Table 4 below. These are added to the initial estimates, to produce the more refined estimate of the 6 DOF displacement vector, shown at the right of Table 4.

TABLE 4

(left) First-Order Corrections to Initial Estimates of Yaw, Pitch, Roll, dx, dy and dz, obtained by inverting the matrix of derivatives at left of Table 3 above and multiplying this inverse matrix by the residual error vector at right of Table 3. These corrections are added to initial 6DOF motion estimates to produce improved estimates at right above.

| | | | |
|---|---|---|---|
| Yaw Adjustment (deg) | 3.8632 | First Newton Iteration Yaw (deg) | 8.2945 |
| Pitch Adjustment (deg) | 4.5672 | First Newton Iteration Pitch (deg) | −14.8803 |
| Roll Adjustment (deg) | 3.5642 | First Newton Iteration Roll (deg) | 12.4426 |
| dx Adjustment (mm) | −3.0846 | First Newton Iteration Delta X (mm) | −9.5103 |
| dy Adjustment (mm) | 6.5969 | First Newton Iteration Delta Y (mm) | 4.0329 |
| dz Adjustment (mm) | 12.9426 | First Newton Iteration Delta Z (mm) | 6.9998 |

This process is repeated for a second and final time as described in Section 2.5.2.6, assuming again that the (now refined) 6 DOF displacement vector is accurate, and calculating first the 3D target centroid positions and then the locations of the target centroids as projected onto each of the two camera focal planes. Again the six principal quantities are computed and compared with the actual observations to produce a vector of residual errors. Again the local derivatives are computed, this time at the location of the first-order displacement vector. The results are tabulated as shown in Table 5 below.

TABLE 5

First-Order Residual Error (in pixels) and new local derivatives with respect to Yaw, Pitch, Roll (pixels per 0.1 deg), x-displacement, y-displacement, and z-displacement (pixels per 0.1 mm), of the principal quantities Vertical Tip Sum, Vertical Tip Difference, Base Length Difference, Vertical Displacement Sum, Horizontal Displacement Sum, and Horizontal Displacement Difference.

| | ∂/∂Y | ∂/∂P | ∂/∂R | ∂/∂x | ∂/∂y | ∂/∂z | Residual Error |
|---|---|---|---|---|---|---|---|
| VT1 + VT2 | 0.2498 | 0.0545 | −0.0785 | 0.0020 | 0.0028 | 0.0007 | 0.4715 |
| VT1 − VT2 | 0.0682 | −0.2935 | 0.0223 | −0.0012 | −0.0034 | 0.0242 | −0.0827 |
| BL1 − BL2 | −0.3146 | 0.0536 | 0.4966 | 0.0171 | −0.0723 | 0.0094 | 0.5096 |
| VD1 + VD2 | −0.5927 | 5.7797 | 0.0405 | 1.9353 | 0.0084 | −0.1911 | −4.3941 |
| HD1 + HD2 | −2.5462 | 0.3237 | 3.7395 | 0.0074 | −1.3067 | −0.0135 | −4.8578 |
| HD1 − HD2 | −0.6876 | 1.7791 | 0.7547 | −0.0177 | −0.0884 | −1.4787 | 2.5823 |

The matrix of derivatives at the left of Table 5 is inverted and multiplied by the residual error vector at the right, to yield final corrections to the first-order estimate of the displacement vector, as shown at the left of Table 6 below. These corrections are added to the first-order estimates, to produce the final second-order estimate of the 6 DOF displacement vector, shown at the right of Table 6.

TABLE 6

(left) Second-Order Corrections to First-Order Estimates of Yaw, Pitch, Roll, dx, dy and dz, obtained by inverting the matrix of derivatives at left of Table 5 above and multiplying this inverse matrix by the residual error vector at right Table 5. These corrections are added to first-order correction obtained by the same method, to produce final values for each of the 6 DOF motions used in the simulation.

| | | | |
|---|---|---|---|
| Yaw Adjustment (deg) | −0.2947 | Final Yaw (deg) | 7.9999 |
| Pitch Adjustment (deg) | −0.1210 | Final Pitch (deg) | −15.0013 |
| Roll Adjustment (deg) | −0.4448 | Final Roll (deg) | 11.9978 |
| dx Adjustment (mm) | 0.5114 | Final Delta X (mm) | −8.9989 |
| dy Adjustment (mm) | −1.0377 | Final Delta Y (mm) | 2.9952 |
| dz Adjustment (mm) | −0.0058 | Final Delta Z (mm) | 6.9941 |

Even for the extreme rotations and displacements used in this model, the algorithm is shown to converge to within 0.003 degrees and 0.006 mm in only two iterations. Given the number of floating-point operations needed to perform the initial estimate and two successive iterations of the Newton method, the algorithm can produce a solution on a typical laptop computer in less than 5 milliseconds.

Quaternion Representation

The head coil ICD specifies the rotation vector in terms of the quaternion, for which (still using right-handed Euler angle rotation conventions):

$$q = \begin{bmatrix} q_r \\ q_x \\ q_y \\ q_z \end{bmatrix} = \begin{bmatrix} \cos(\varphi/2)\cos(\theta/2)\cos(\psi/2) - \sin(\varphi/2)\sin(\theta/2)\sin(\psi/2) \\ -\sin(\varphi/2)\cos(\theta/2)\cos(\psi/2) - \cos(\varphi/2)\sin(\theta/2)\sin(\psi/2) \\ -\cos(\varphi/2)\sin(\theta/2)\cos(\psi/2) + \sin(\varphi/2)\cos(\theta/2)\sin(\psi/2) \\ -\cos(\varphi/2)\cos(\theta/2)\sin(\psi/2) - \sin(\varphi/2)\sin(\theta/2)\cos(\psi/2) \end{bmatrix}$$

The translation vector is unchanged from the form calculated here.

Centroid Determination Algorithm

The centroid location on the focal plane is given by:

$$x_c = \frac{\sum_{ij} x_{ij} I_{ij}}{\sum_{ij} I_{ij}}, \quad y_c = \frac{\sum_{ij} y_{ij} I_{ij}}{\sum_{ij} I_{ij}}.$$

Figure 14D:
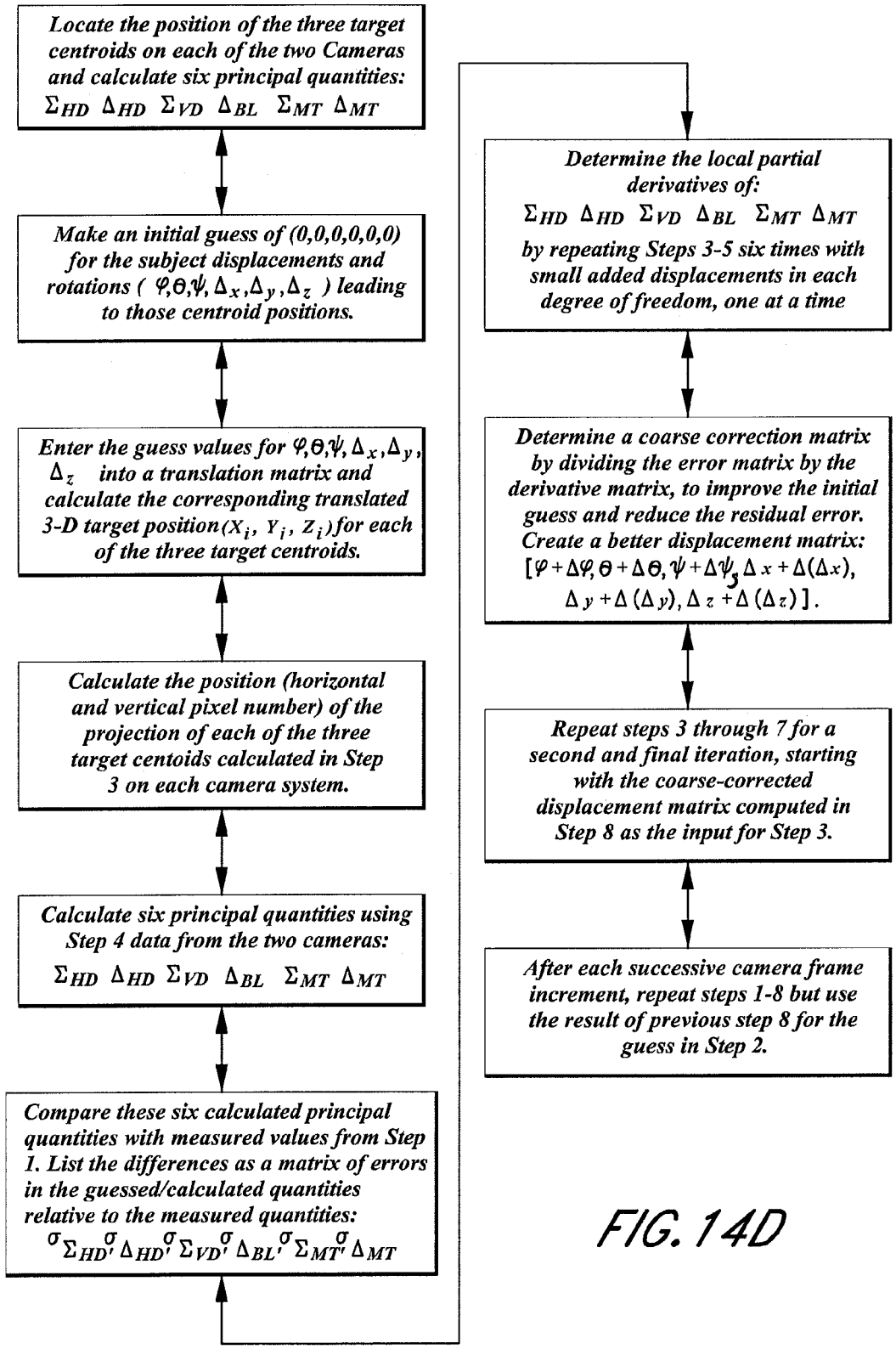
FIG. 14D is a flow diagram of an iterative process for tracking movement.

This calculation is performed for three subregions on the target as shown in FIG. 14C (the dashed lines do not appear on the real target), inverting the image such that large count numbers correspond to black (near 4095, for the 12-bit monochrome camera readout) and small count numbers for white (near 0). With a minimal amount of sophistication, the routine can detect the pattern of circles and approximately locate these subregions automatically. In some embodiments, the routine can be initialized with a key click to identify the approximate position of each centroid at startup. Subsequently, the three regions of interest for each new frame will be centered at the centroid locations from the previous frame, plus and minus 48 pixel rows and plus and minus 48 pixel columns. Regions of interest around each of the three target circles which can be integrated to determine target centroids.

Centroid Determination

In some embodiments, a test target can be printed and mounted in the view field of a monochrome camera at an angle of approximately 45 degrees. At this angle the elliptical target projected to an approximately round target on the camera focal plane. FIG. 16 shows the camera focused at full-scale printed target oriented at 45 degrees at a distance of 14.1 inches. Camera field of view is roughly the size of the rectangle in the center of the camera calibration target mounted next to the target.

The calculated target centroid is displayed as a red dot at the center of the LabView image in FIG. 17, and displayed as a floating point (x,y) pair to the right of the image. At illumination levels above about 20% of full scale, the measured centroid location does not fluctuate above the 0.1-pixel level in row or column; for lower intensity levels, statistical fluctuations exceed this threshold. It is noted, however, that for the black-on-white printed target, uniformity of illumination can be potentially important—if the target is illuminated significantly more strongly from the left or right side, for instance, the moment calculation could add bias in the horizontal direction and would shift the centroid outside of the specified error threshold. This effect could in some cases put an undesirable cost constraint on the illumination approach, so an intensity thresholding algorithm is first implemented, by which the target histogram is clipped near the lower extrema for the bright and dark region intensities, eliminating the undesirable effect. In some embodiments, a Camera Control screen view can allow control of camera frame rate and readout resolution, showing manually-selected region of interest. Full camera field of view is approximately represented by a black region on the screen. The centroid can be displayed as a red dot at the center of the circular target, and camera x-y coordinates are displayed as floating point numbers to 2-decimal precision to the right of the display.

Example 1

Camera Calibration

As with any camera lens, the lens used for the head tracker could have some level of distortion as a function of distance from imaging axis. Azimuthal distortion should be negligible, but radial distortion can be measured after lens installation and fit to a polynomial curve to allow rapid compensation of centroid positions near the edges of the camera field of view. The 6DOF unfolding algorithm can be constructed to accommodate typical levels of radial distortion as a second-order compensation during the application of the Newton Raphson iteration method.

Figure 16A:
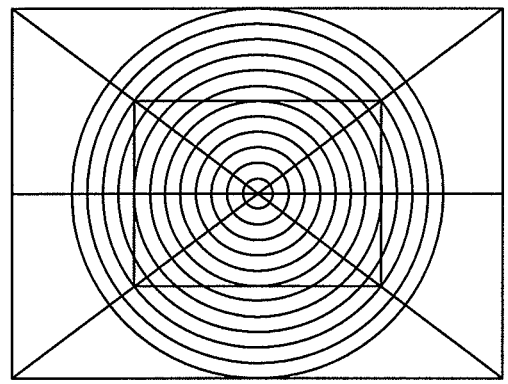
FIGS. 16A and 16B show techniques for camera calibration, according to some embodiments of the invention.
Figure 16B:
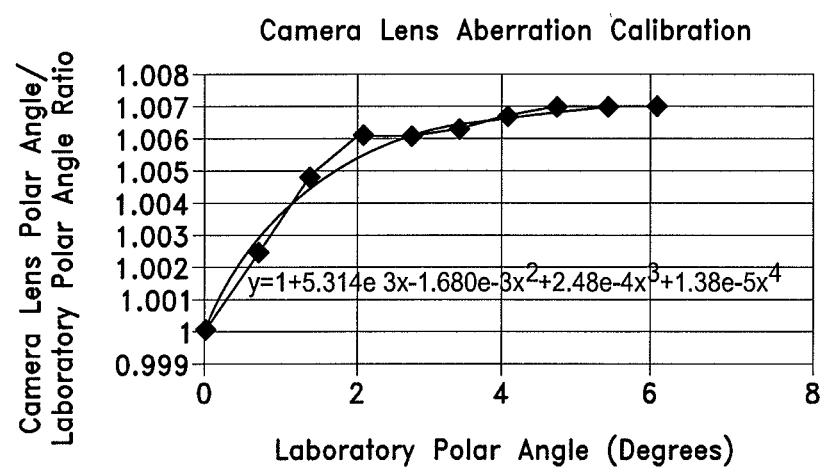

Radial distortion can be determined using a printed reference target with concentric circles of diameter ⅓", ⅔", 1", and so on up to a maximum diameter of 4 inches, as shown in FIGS. 16A and 16B. The approximate FOV of the camera and 25 mm lens at a working distance of 14.08 inches is 2"×2.67", as indicated by the inner rectangle printed on the target. The camera is mounted 14.24 inches from the target such that the inner rectangle is visible at the edges of the camera FOV, and the target is centered in this field. A single image frame is captured and the intersections of the circles and radial lines are identified and precisely located through local centroid calculations on the image. The polar angles of the world coordinate system are compared against the polar angles recorded on the camera to determine the radial distortion. FIG. 16A is the Camera Calibration Target and FIG. 16B is the off-axis radial distortion of the 25 mm fixed-focal length camera lens, measured by comparing the diameters of circles recorded on the camera focal plane.

In one embodiment, the measured radial distortion measured for the TechSpec High Resolution Fixed Focus 25 mm lens follows camera polar angle $\theta_c=(1+0.0053144\theta-0.0016804\theta^2+0.0002483\theta^3-0.0000138\theta^4)\theta$, with laboratory polar angle $\theta$ in degrees. At the extreme corner of the viewing field, where $\theta\sim 6.75°$, camera aberration results in a radial growth in camera angle of about 0.7% relative to true angle, or about 2.8 pixels in radius.

Full 6-DOF Tracking

The full 6-DOF tracking algorithm was coded in LabView with the Graphical User Interface (GUI). The upper left side of the GUI screen gives centroid information for target circles in the current frame, and the lower left side gives the same information for the prior frame. For each, one nested target circle from the set of three is displayed in negative (white on black) along with a histogram of its pixel brightness within a 48-by-48 pixel box centered on the centroid location of the previous frame. This histogram is split into two sections to display (at left) the peak from background pixels at one end of the brightness scale, and (at right) the peak from the pixels of the target itself, at the other end of the brightness scale. A long continuum of pixels in between represents pixels at dark-light boundaries in the target frame. From analysis of the two histograms, the target field is clipped at the lower-brightness shoulder on the bright side, and the upper brightness shoulder on the dark side, to create a binary target field that is not sensitive to variations in illumination across the target. Although displayed in real time for only one target circle, all three target circles are processed in this way.

Next to the target histograms, the x-y camera centroid locations are displayed to two-decimal precision for each of the three nested circle targets; again at the upper half of the screen for the current data and at the lower half of the screen for the prior frame.

The right side of the screen displays the processed 6-DOF data, after analysis using the approach described in Section 2.5. An analog meter-style display shows the acquisition and processing time per frame, which is limited at its low end to the camera frame integration and readout time of about 8 milliseconds. Using a single iteration of the Newton-Raphson routine described in Section 2.5, the algorithm runs during the integration period for the successive frame, so the processing time is approximately 8 milliseconds, corresponding to a 120 Hz camera readout rate. The 6-DOF data can be displayed in either analog or digital format, but the digital format can be read to precision of 0.01 mm and 0.01 degree for comparison with the 0.1 mm, 0.1 degree accuracy requirements.

Laboratory Mechanical Layout for Head Tracking Simulation

The laboratory setup was designed to mimic head rotation and displacement using a six-degree-of-freedom optical rotation mount. This mount included three ganged translation stages along the x-, y-, and z-axes of the optical table, and three ganged rotation stages corresponding to yaw, roll and pitch respectively. The two monochrome cameras and turning mirrors were mounted in the appropriate geometry for use with an existing 12-channel head coil. The two monochrome cameras are in foreground, mounted at ±45° relative to horizontal to accommodate rotation by the turning mirrors. The turning mirrors are mounted 10 inches behind cameras (slightly obscured by the cameras in the picture). The target is partially visible in the reflection of each mirror. The 6-DOF rotation stage is at center in foreground, with the y-axis stage at bottom, x-axis stage next, and z-axis stage above that, followed by the yaw rotation stage, the roll stage, and finally the pitch stage with target at the top (the pitch rotation handle is obscured by the stage). A near-IR illumination LED is at the center in background; light from this stage is within the camera spectral range, but hardly visible to the human eye.

X-Axis Translation

The second translation stage from the bottom in the 6-DOF displacement assembly controls x-axis displacement (aligned with the patient's spine). The x-axis translation stage control knob is turned four full rotations (corresponding to −2.54 mm), and the absolute position change is calculated from the resulting motion of the centroid camera coordinates. Results are: the displacement determined by the unfolding algorithm is −2.56 mm in x, less than 0.1 mm in y and z, and less than 0.1° in roll, pitch and yaw. The target displacement by dx=−2.54 mm, with zoom on lower right display section of GUI showed calculated dx=−2.56 mm, dy=0.08 mm, dz=0.02 mm, $d\phi$=0.05°, $d\theta$=−0.03°, and $d\psi$=−0.01°.

Y-Axis Translation

The bottom translation stage in the 6-DOF displacement assembly controls y-axis displacement (patient's left-to-right). The y-axis translation stage control knob is turned four full rotations (corresponding to −2.54 mm), and the absolute position change is calculated from the resulting motion of the centroid camera coordinates. This resulted in a target displacement by dy=−2.54 mm, with zoom on lower right display section of GUI showing dx=0.00 mm, dy=−2.47 mm, dz=−0.01 mm, $d\phi$=0.64°, $d\theta$=−0.04°, and $d\psi$=−0.03°.

Z-Axis Translation

The top translation stage in the 6-DOF displacement assembly controls z-axis displacement (patient's down to up, with the patient lying on his back). The z-axis translation stage control knob is turned four full rotations (corresponding to −2.54 cm), and the absolute position change is calculated from the resulting motion of the centroid camera coordinates. The displacement determined by the unfolding algorithm was −2.54 mm in z, less than 0.1 mm in x and y, and less than 0.1° in roll, pitch and yaw. The results were a target displacement by dz=−2.54 mm, with zoom on lower right display section of GUI showing dx=0.01 mm, dy=−0.01 mm, dz=−2.59 mm, $d\phi$=−0.02°, $d\theta$=−0.06° and $d\psi$=0.01°.

Yaw Rotation

The bottom rotation stage in the 6-DOF displacement assembly controls yaw rotation (patient's left shoulder-to-right shoulder lean direction). The yaw rotation stage control knob is turned by +4° degrees (heading 315° to heading 311° on stage, corresponds to movement toward right shoulder), and the absolute position change is calculated from the resulting motion of the centroid camera coordinates. The displacement determined by the unfolding algorithm is less than 0.1 mm in dx, dy and dz, 0.1° in roll and less than 0.1° in pitch, and 3.94° in yaw. The results were a target rotation by $d\psi$=+4.00°, with zoom on lower right display section of GUI showing dx=0.07 mm, dy=−0.05 mm, dz=0.02 mm, $d\phi$=0.10°, $d\theta$=−0.01°, and $d\psi$=3.94°.

Roll Rotation

The middle rotation stage in the 6-DOF displacement assembly controls roll rotation (patient's right shoulder-to-left shoulder "head shaking" direction). The roll goniometer control knob is turned by +5° degrees, and the absolute position change is calculated from the resulting motion of the centroid camera coordinates. The displacement determined by the unfolding algorithm is less than 0.1 mm in dx, and dz, 1.78 mm in dy, 4.97° in roll and less than 0.1° in pitch and yaw. Displacement in y is expected due to the fact that the center of rotation for the Thorlabs GNL18 goniometer stage is 44.5 mm above the mount surface, while the target is only 22 mm above the stage. For the resulting −20.5 mm lever arm, the y-displacement due to a 5° roll rotation is −(−20.5 mm)*sin(5°)=+1.79 mm, in good agreement with the measured data.

The results were a target rotation by $d\phi$=+5.00°, with zoom on lower right display section of GUI showing dx=0.07 mm, dy=1.78 mm, dz=−0.01 mm, $d\phi$=4.97°, $d\theta$=−0.03°, and $d\psi$=0.08°.

Pitch Rotation

The top rotation stage in the 6-DOF displacement assembly controls pitch rotation (patient's "nodding" direction). The pitch goniometer control knob is turned by +5° degrees, and the absolute position change is calculated from the resulting motion of the centroid camera coordinates. The calculated pitch is 4.95°, with less than 0.1° in yaw. The center of rotation for the Thorlabs GNL10 goniometer stage is 25.4 mm above the mount surface, while the target is only 6.4 mm above the stage. For the resulting −19 mm lever arm, the x-displacement due to a 5° rotation is −19 mm*sin(5°)=−1.66 mm, the y-displacement is 0.00 mm, and the z-displacement is −19 mm*[1-cos(5°)]=0.07 mm. These displacements are all within 0.1 mm of measured data.

The results were a target pitch rotation by $d\theta$=+5.00°, with zoom on lower right display section of GUI showing dx=−1.63 mm, dy=0.09 mm, dz=0.17 mm, $d\phi$=0.21°, $d\theta$=4.95°, and $d\psi$=−0.07°.

Variations

Specific embodiments have been described in detail above with emphasis on medical application and in particular MRI examination of a patient's head. However, the teachings of the present invention can be utilized for other MRI examinations of other body parts where movements of up to six degrees of freedom are possible. In addition medical procedures involving imaging devices other than MRI equipment (e.g., CT, PET, ultrasound, plain radiography, and others) may benefit from the teaching of the present invention. The teachings of the present invention may be useful in many non-medical applications where tracking of a target having several degrees of freedom are possible. Some of these applications could be military applications. Furthermore, while particular algorithms are disclosed, variations, combinations, and subcombinations are also possible.

Computing System

In some embodiments, the computer clients and/or servers described above take the form of a computing system 1500 illustrated in FIG. 15, which is a block diagram of one embodiment of a computing system that is in communication with one or more computing systems 1520 and/or one or more data sources 1522 via one or more networks 1518.

The computing system 1500 may be used to implement one or more of the systems and methods described herein. In addition, in one embodiment, the computing system 1500 may be configured to apply one or more of the methods and systems described herein. While FIG. 15 illustrates an embodiment of a computing system 1500, it is recognized that the functionality provided for in the components and modules of computing system 1500 may be combined into fewer components and modules or further separated into additional components and modules.

Motion Correction Control Systems

In an embodiment, the system 700 comprises a motion correction control system module 1514 that carries out the functions described herein with reference to motion correction mechanism, including any one of the motion correction methods described above. The motion correction control system module 1514 may be executed on the computing system 1500 by a central processing unit 1504 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++ or Objective C. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In an embodiment, the computing system 1500 also comprises a workstation or other computing devices suitable for controlling and/or communicating with large databases, performing transaction processing, and generating reports from large databases. The computing system 1500 also comprises a central processing unit ("CPU") 1504, which may comprise a conventional microprocessor. The computing system 1500 further comprises a memory 1508, such as random access memory ("RAM") for temporary storage of information and/or a read only memory ("ROM") for permanent storage of information, and a mass storage device 1502, such as a hard drive, diskette, or optical media storage device. Typically, the modules of the computing system 1500 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 1500 comprises one or more commonly available input/output (I/O) devices and interfaces 1512, such as a keyboard, mouse, touchpad, and printer. In one embodiment, the I/O devices and interfaces 1512 comprise one or more display devices, such as a monitor, that allows the visual presentation of data to a user. More particularly, a display device provides for the presentation of GUIs, application software data, and multimedia presentations, for example. In the embodiment of FIG. 15, the I/O devices and interfaces 1512 also provide a communications interface to various external devices. The computing system 1500 may also comprise one or more multimedia devices 1506, such as speakers, video cards, graphics accelerators, and microphones, for example.

Computing System Device/Operating System

The computing system 1500 may run on a variety of computing devices, such as, for example, a mobile device or a server or a desktop or a workstation, a Windows server, an Structure Query Language server, a Unix server, a personal computer, a mainframe computer, a laptop computer, a cell phone, a personal digital assistant, a kiosk, an audio player, a smartphone, a tablet computing device, and so forth. The computing system 1500 is generally controlled and coordinated by operating system software, such as iOS, z/OS, Windows 95, Windows 98, Windows NT, Windows 2000, Windows XP, Windows Vista, Windows 7, Linux, BSD, SunOS, Solaris, or other compatible operating systems. In Macintosh systems, the operating system may be any available operating system, such as MAC OS X. In other embodiments, the computing system 1500 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 15, the computing system 1500 is coupled to a network 1518, such as a LAN, WAN, or the Internet, for example, via a wired, wireless, or combination of wired and wireless, communication link 1516. The network 1518 communicates with various computing devices and/or other electronic devices via wired or wireless communication links. In the embodiment of FIG. 15, the network 1518 is communicating with one or more computing systems 1520 and/or one or more data sources 1522.

Access to the motion correction control system module 1514 of the computer system 1500 by computing systems 1520 and/or by data sources 1522 may be through a web-enabled user access point such as the computing systems' 1520 or data source's 1522 personal computer, cellular phone, laptop, or other device capable of connecting to the network 1518. Such a device may have a browser module is implemented as a module that uses text, graphics, audio, video, and other media to present data and to allow interaction with data via the network 1518.

The browser module may be implemented as a combination of an all points addressable display such as a cathode-ray tube (CRT), a liquid crystal display (LCD), a plasma display, touch screen display or other types and/or combinations of displays. In addition, the browser module may be implemented to communicate with input devices 1512 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 1500 may comprise a physical or logical connection established between a remote microprocessor and a mainframe host computer for the express purpose of uploading, downloading, or viewing interactive data and databases on-line in real time. The remote microprocessor may be operated by an entity operating the computer system 1500, including the client server systems or the main server system, an/or may be operated by one or more of the data sources 1522 and/or one or more of the computing systems. In some embodiments, terminal emulation software may be used on the microprocessor for participating in the micro-mainframe link.

In some embodiments, computing systems 1520 that are internal to an entity operating the computer system 1500 may access the motion correction control system module 1514 internally as an application or process run by the CPU 1504.

User Access Point

In an embodiment, the computing system 1500 comprises a computing system, a smartphone, a tablet computing device, a mobile device, a personal computer, a laptop computer, a portable computing device, a server, a computer workstation, a local area network of individual computers, an interactive kiosk, a personal digital assistant, an interactive wireless communications device, a handheld computer, an embedded computing device, or the like.

Other Systems

In addition to the systems that are illustrated in FIG. 15, the network 1518 may communicate with other data sources or other computing devices. The computing system 1500 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a signal database, object-oriented database, and/or a record-based database.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. A motion compensation system for tracking and compensating for subject motion during a medical imaging scan, the motion compensation system comprising:
   an optical target configured to be fixed to a subject;
   at least two cameras positioned so as to view the optical target from different directions with each of the at least two cameras being configured to record two dimensional images of the optical target defining a target point, wherein the at least two cameras are attached to a head coil configured to be used in conjunction with a medical imaging scanner;
   one or more computer readable storage devices configured to store a plurality of computer executable instructions; and
   one or more hardware computer processors in communication with the one or more computer readable storage devices and configured to execute the plurality of computer executable instructions in order to cause the system to determine a position of the subject, wherein the determining the position of the subject comprises:
      identifying the target point and displacement of the target point based on optical images collected by the at least two cameras;
      utilizing an iteration procedure, wherein the iteration procedure comprises testing an approximate first-order solution against the identified target point to determine residual errors and dividing the determined residual errors by local derivatives with respect to rotation and translation to determine an iterative correction;
      repeating the iteration procedure until the residual errors are within predetermined levels of accuracy; and
      utilizing the repeated iteration procedure to determine the position of the subject at rates of at least 100 times per second.

2. The motion compensation system of claim 1, wherein the at least two cameras are affixed to an exterior surface of the head coil.

3. The motion compensation system of claim 1, wherein the medical imaging scanner is a magnetic resonance scanner.

4. The motion compensation system of claim 3, further comprising the magnetic resonance scanner.

5. The motion compensation system of claim 3, wherein the determined position of the subject is utilized as an input to the magnetic resonance scanner to compensate for the subject motion.

6. The motion compensation system of claim 1, wherein the iteration procedure is a variant of the Newton-Raphson method.

7. The motion compensation system of claim 1, wherein the determined position of the subject is updated at a rate of at least 100 solutions per second with a latency of less than 10 milliseconds.

8. The motion compensation system of claim 1, wherein the determined position of the subject is updated at a rate of at least 200 solutions per second with a latency of less than 10 milliseconds.

9. The motion compensation system of claim 1, wherein the at least two cameras are embedded in the head coil.

10. The motion compensation system of claim 1, wherein the optical target comprises at least three concentric sub-targets.

11. The motion compensation system of claim 10, wherein the system is configured to calculate centroids of each sub-target by dividing a sum of a product of pixel intensity and pixel position by a sum of pixel intensity in a sub-pixel array.

12. The motion compensation system of claim 11, wherein the sub-pixel array is about 48×48 pixels.

13. The motion compensation system of claim 10, wherein the three concentric sub-targets are each concentric ellipses.

14. A computer-implemented method for tracking and compensating for subject motion during a medical imaging scan, the computer-implemented method comprising:
- attaching an optical target to a subject;
- positioning at least two cameras so as to view the optical target from different directions with each of the at least two cameras being configured to record two dimensional images of the optical target defining a target point, wherein the at least two cameras are attached to a head coil configured to be used in conjunction with a medical imaging scanner; and
- determining, by a computer system, a position of the subject, wherein the determining the position of the subject comprises:
  - identifying the target point and displacement of the target point based on optical images collected by the at least two cameras;
  - utilizing an iteration procedure, wherein the iteration procedure comprises testing an approximate first-order solution against the identified target point to determine residual errors and dividing the determined residual errors by local derivatives with respect to rotation and translation to determine an iterative correction;
  - repeating the iteration procedure until the residual errors are within predetermined levels of accuracy; and
  - utilizing the repeated iteration procedure to determine the position of the subject at rates of at least 100 times per second,
- wherein the computer system comprises a computer processor and an electronic storage medium.

15. The computer-implemented method of claim 14, wherein the at least two cameras are affixed to an exterior surface of the head coil.

16. The computer-implemented method of claim 14, wherein the determined position of the subject is utilized as an input to the medical imaging scanner to compensate for the subject motion.

17. The computer-implemented method of claim 16, wherein the medical imaging scanner is a magnetic resonance scanner.

18. The computer-implemented method of claim 14, wherein the iteration procedure is a variant of the Newton-Raphson method.

19. The computer-implemented method of claim 14, wherein the at least two cameras are embedded in the head coil.

20. The computer-implemented method of claim 14, wherein the determined position of the subject is updated at a rate of at least 100 solutions per second with a latency of less than 10 milliseconds.

\* \* \* \* \*

UNITED STATES PATENT AND TRADEMARK OFFICE
CERTIFICATE OF CORRECTION

PATENT NO. : 9,779,502 B1  
APPLICATION NO. : 15/428495  
DATED : October 3, 2017  
INVENTOR(S) : John Arthur Lovberg Page 1 of 3

It is certified that error appears in the above-identified patent and that said Letters Patent is hereby corrected as shown below:

In Column 1 (page 7, item (56)) at Line 24, Under Other Publications, change ""Hybrind" to --"Hybrid--.

In Column 1 (page 8, item (56)) at Line 61, Under Other Publications, change "Breain"," to --Brain",--.

In Column 2 (page 8, item (56)) at Line 3, Under Other Publications, change "NeuroImage" to --NeuroImage--.

In Column 2 (page 8, item (56)) at Line 38, Under Other Publications, change "magnetric" to --magnetic--.

In Column 1 (page 9, item (56)) at Line 56, Under Other Publications, change "NeuroImage" to --NeuroImage--.

In Column 2 (page 10, item (56)) at Line 2, Under Other Publications, change "NeuroImage" to --NeuroImage--.

In Column 2 (page 10, item (56)) at Line 48, Under Other Publications, change "NeuroImage" to --NeuroImage--.

In Column 1 (page 11, item (56)) at Line 28, Under Other Publications, change "Oxigenation" to --Oxygenation--.

In Column 1 (page 11, item (56)) at Line 61, Under Other Publications, change "retrograte" to --retrograde--.

In Column 1 (page 11, item (56)) at Line 64, Under Other Publications, change "Continous" to --Continuous--.

Signed and Sealed this  
Twenty-seventh Day of March, 2018

Andrei Iancu  
*Director of the United States Patent and Trademark Office*

CERTIFICATE OF CORRECTION (continued)
U.S. Pat. No. 9,779,502 B1

In Column 1 (page 12, item (56)) at Line 69, Under Other Publications, change "Constrast" to --Contrast--.

In Column 1 (page 13, item (56)) at Line 37, Under Other Publications, change "Physlol," to --Physiol,--.

In Column 2 (page 13, item (56)) at Line 28, Under Other Publications, change "theraputic" to --therapeutic--.

In Column 2 (page 13, item (56)) at Line 40, Under Other Publications, change "Thermondynamics" to --Thermodynamics--.

In Column 2 (page 13, item (56)) at Line 47, Under Other Publications, change "Molydenum" to --Molybdenum--.

In Column 2 (page 13, item (56)) at Line 50, Under Other Publications, change "Ploy(4 vinylpyridine)" to --Poly(4 vinylpyridine)--.

In Column 1 (page 15, item (56)) at Line 3, Under Other Publications, change "Isomeization" to --Isomerization--.

Sheet 11 of 14 (FIG. 14B) at Line 3 (approx.), Change "$(X_O, Y_O)$" to --$(X_0, Y_0)$--.

Sheet 11 of 14 (FIG. 14B) at Line 5 (approx.), Change "$X_O+$" to --$X_0+$--.

Sheet 11 of 14 (FIG. 14B) at Line 6 (approx.), Change "$Y_O+$" to --$Y_0+$--.

Sheet 12 of 14 (FIG. 14D) at Line 20 (approx.), Change "centoids" to --centroids--.

In Column 1 at Line 42, Change "motion." to --motion--.

In Column 3 at Line 36, Change "FIGS. 12 A" to --FIGS. 12A--.

In Column 5 at Line 11, Change "acquisition" to --acquisition.--.

In Column 10 at Line 33, Change "FIGS. 10 A" to --FIGS. 10A--.

In Column 13 at Line 2, Change "projection" to --projection.--.

CERTIFICATE OF CORRECTION (continued)
U.S. Pat. No. 9,779,502 B1

In Column 17 at Lines 35-47 (approx.), Change "

$$\begin{pmatrix} \frac{\partial \Sigma_{HD}}{\partial \varphi} & \frac{\partial \Sigma_{HD}}{\partial \theta} & \frac{\partial \Sigma_{HD}}{\partial \psi} & \frac{\partial \Sigma_{HD}}{\partial x} & \frac{\partial \Sigma_{HD}}{\partial y} & \frac{\partial \Sigma_{HD}}{\partial z} \\ \frac{\partial \Delta_{HD}}{\partial \varphi} & \frac{\partial \Delta_{HD}}{\partial \theta} & \frac{\partial \Delta_{HD}}{\partial \psi} & \frac{\partial \Delta_{HD}}{\partial x} & \frac{\partial \Delta_{HD}}{\partial y} & \frac{\partial \Delta_{HD}}{\partial z} \\ \frac{\partial \Sigma_{VD}}{\partial \varphi} & \frac{\partial \Sigma_{VD}}{\partial \theta} & \frac{\partial \Sigma_{VD}}{\partial \psi} & \frac{\partial \Sigma_{VD}}{\partial x} & \frac{\partial \Sigma_{VD}}{\partial y} & \frac{\partial \Sigma_{VD}}{\partial z} \\ \frac{\partial \Delta_{BL}}{\partial \varphi} & \frac{\partial \Delta_{BL}}{\partial \theta} & \frac{\partial \Delta_{BL}}{\partial \psi} & \frac{\partial \Delta_{BL}}{\partial x} & \frac{\partial \Delta_{BL}}{\partial y} & \frac{\partial \Delta_{BL}}{\partial z} \\ \frac{\partial \Sigma_{MT}}{\partial \varphi} & \frac{\partial \Sigma_{MT}}{\partial \theta} & \frac{\partial \Sigma_{MT}}{\partial \psi} & \frac{\partial \Sigma_{MT}}{\partial x} & \frac{\partial \Sigma_{MT}}{\partial y} & \frac{\partial \Sigma_{MT}}{\partial z} \\ \frac{\partial \Delta_{MT}}{\partial \varphi} & \frac{\partial \Delta_{MT}}{\partial \theta} & \frac{\partial \Delta_{MT}}{\partial \psi} & \frac{\partial \Delta_{MT}}{\partial x} & \frac{\partial \Delta_{MT}}{\partial y} & \frac{\partial \Delta_{MT}}{\partial z} \end{pmatrix}^{-1}$$

" to $$\begin{pmatrix} \frac{\partial \Sigma_{HD}}{\partial \varphi} & \frac{\partial \Sigma_{HD}}{\partial \theta} & \frac{\partial \Sigma_{HD}}{\partial \psi} & \frac{\partial \Sigma_{HD}}{\partial x} & \frac{\partial \Sigma_{HD}}{\partial y} & \frac{\partial \Sigma_{HD}}{\partial y} \\ \frac{\partial \Delta_{HD}}{\partial \varphi} & \frac{\partial \Delta_{HD}}{\partial \theta} & \frac{\partial \Delta_{HD}}{\partial \psi} & \frac{\partial \Delta_{HD}}{\partial x} & \frac{\partial \Delta_{HD}}{\partial y} & \frac{\partial \Delta_{HD}}{\partial z} \\ \frac{\partial \Sigma_{VD}}{\partial \varphi} & \frac{\partial \Sigma_{VD}}{\partial \theta} & \frac{\partial \Sigma_{VD}}{\partial \psi} & \frac{\partial \Sigma_{VD}}{\partial x} & \frac{\partial \Sigma_{VD}}{\partial y} & \frac{\partial \Sigma_{VD}}{\partial z} \\ \frac{\partial \Delta_{BL}}{\partial \varphi} & \frac{\partial \Delta_{BL}}{\partial \theta} & \frac{\partial \Delta_{BL}}{\partial \psi} & \frac{\partial \Delta_{BL}}{\partial x} & \frac{\partial \Delta_{BL}}{\partial y} & \frac{\partial \Delta_{BL}}{\partial z} \\ \frac{\partial \Sigma_{MT}}{\partial \varphi} & \frac{\partial \Sigma_{MT}}{\partial \theta} & \frac{\partial \Sigma_{MT}}{\partial \psi} & \frac{\partial \Sigma_{MT}}{\partial x} & \frac{\partial \Sigma_{MT}}{\partial y} & \frac{\partial \Sigma_{MT}}{\partial z} \\ \frac{\partial \Delta_{MT}}{\partial \varphi} & \frac{\partial \Delta_{MT}}{\partial \theta} & \frac{\partial \Delta_{MT}}{\partial \psi} & \frac{\partial \Delta_{MT}}{\partial x} & \frac{\partial \Delta_{MT}}{\partial y} & \frac{\partial \Delta_{MT}}{\partial z} \end{pmatrix}^{-1}$$

--.

In Column 29 at Line 11, Change "on-line" to --online--.

In Column 29 at Line 14, Change "an/or" to --and/or--.